(12) United States Patent
Tokiwa et al.

(10) Patent No.: US 10,791,262 B2
(45) Date of Patent: Sep. 29, 2020

(54) CAMERA AND DISPLAY CONTROL METHOD OF CAMERA

(71) Applicant: FUJIFILM Corporation, Tokyo (JP)

(72) Inventors: Kentaro Tokiwa, Saitama (JP); Hirofumi Horii, Saitama (JP); Yuichi Fujimura, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/359,646

(22) Filed: Mar. 20, 2019

(65) Prior Publication Data

US 2019/0220175 A1    Jul. 18, 2019

Related U.S. Application Data

(63) Continuation of application No. PCT/JP2017/031222, filed on Aug. 30, 2017.

(30) Foreign Application Priority Data

Sep. 21, 2016   (JP) ................................. 2016-184554

(51) Int. Cl.
  *H04N 5/232*   (2006.01)
  *G03B 17/02*   (2006.01)
  (Continued)

(52) U.S. Cl.
  CPC ......... *H04N 5/23216* (2013.01); *G03B 17/02* (2013.01); *G06F 3/0487* (2013.01);
  (Continued)

(58) Field of Classification Search
  CPC ............... H04N 5/2251; H04N 5/2252; H04N 5/22525; H04N 5/23216; H04N 5/23245;
  (Continued)

(56) References Cited

U.S. PATENT DOCUMENTS

| | | | |
|---|---|---|---|
| 5,745,809 A | 4/1998 | Kawahata | |
| 2006/0159444 A1* | 7/2006 | Mokunaka | H04N 5/23293 396/299 |

(Continued)

FOREIGN PATENT DOCUMENTS

| | | |
|---|---|---|
| CN | 104238068 A | 12/2014 |
| CN | 104396230 A | 3/2015 |

(Continued)

OTHER PUBLICATIONS

Japanese Notice of Reasons for Refusal for Japanese Application No. 2018-540941, dated Jan. 29, 2020, with an English translation.

(Continued)

*Primary Examiner* — Paul M Berardesca
(74) *Attorney, Agent, or Firm* — Birch Stewart Kolasch & Birch LLP

(57) ABSTRACT

Provided are a camera with good operability and a display control method of the camera. Contact of a finger with a rear command dial D1 is detected. In a case where the contact of the finger with the rear command dial D1 is not detected, only setting contents of the camera are displayed on a sub-display 16 provided near the rear command dial D1. In a case where the contact of the finger with the rear command dial D1 is detected, an image picture of the rear command dial D1 is displayed in a first size on the sub-display 16. In a case where the contact of the finger with the rear command dial D1 is continuously detected for a certain period of time or more, or in a case where the rear command dial D1 is operated, the image picture of the rear command dial D1 is enlarged and displayed in a second size.

19 Claims, 49 Drawing Sheets

(51) Int. Cl.
  *G06F 3/0487* (2013.01)
  *G06F 3/0484* (2013.01)
  *H04N 5/235* (2006.01)
  *G03B 17/18* (2006.01)
  *H04N 5/225* (2006.01)

(52) U.S. Cl.
  CPC .......... *G06F 3/04847* (2013.01); *G03B 17/18* (2013.01); *H04N 5/2251* (2013.01); *H04N 5/2352* (2013.01)

(58) Field of Classification Search
  CPC ......... H04N 5/23293; H04N 5/232933; H04N 5/232939; H04N 5/235; H04N 5/2352; H04N 5/2353; H04N 5/2354; H04N 5/238; H04N 5/243; G03B 7/00–06; G03B 17/02; G03B 17/18; G03B 17/20; G03B 2217/002; G03B 2217/18; G06F 3/048; G06F 3/04817; G06F 3/0484; G06F 3/04847
  See application file for complete search history.

(56) References Cited

U.S. PATENT DOCUMENTS

2013/0141624 A1* 6/2013 Tomizawa ........... H04N 5/2254
                                                    348/333.02
2014/0176773 A1* 6/2014 Sakuma ............. H04N 5/23293
                                                    348/333.02
2014/0368719 A1    12/2014 Kaneko et al.
2015/0109510 A1     4/2015 Fujita et al.
2019/0014248 A1*    1/2019 Takao .................... G03B 17/18

FOREIGN PATENT DOCUMENTS

| CN | 105094534 A | 11/2015 |
| JP | 7-191397 A | 7/1995 |
| JP | 2003-110882 A | 4/2003 |
| JP | 2006-60313 A | 3/2006 |
| JP | 2010-192223 A | 9/2010 |
| JP | 2015-154323 A | 8/2015 |
| WO | WO 2014/002659 A1 | 1/2014 |

OTHER PUBLICATIONS

International Preliminary Report on Patentability and Written Opinion of the International Searching Authority, dated Apr. 4, 2019, for International Application No. PCT/JP2017/031222, with an English translation of the Written Opinion.

International Search Report, dated Sep. 26, 2017, for International Application No. PCT/JP2017/031222, with an English translation.

Chinese Office Action and Search Report, dated May 26, 2020, for Chinese Application No. 201780058167.5, with an English translation.

* cited by examiner

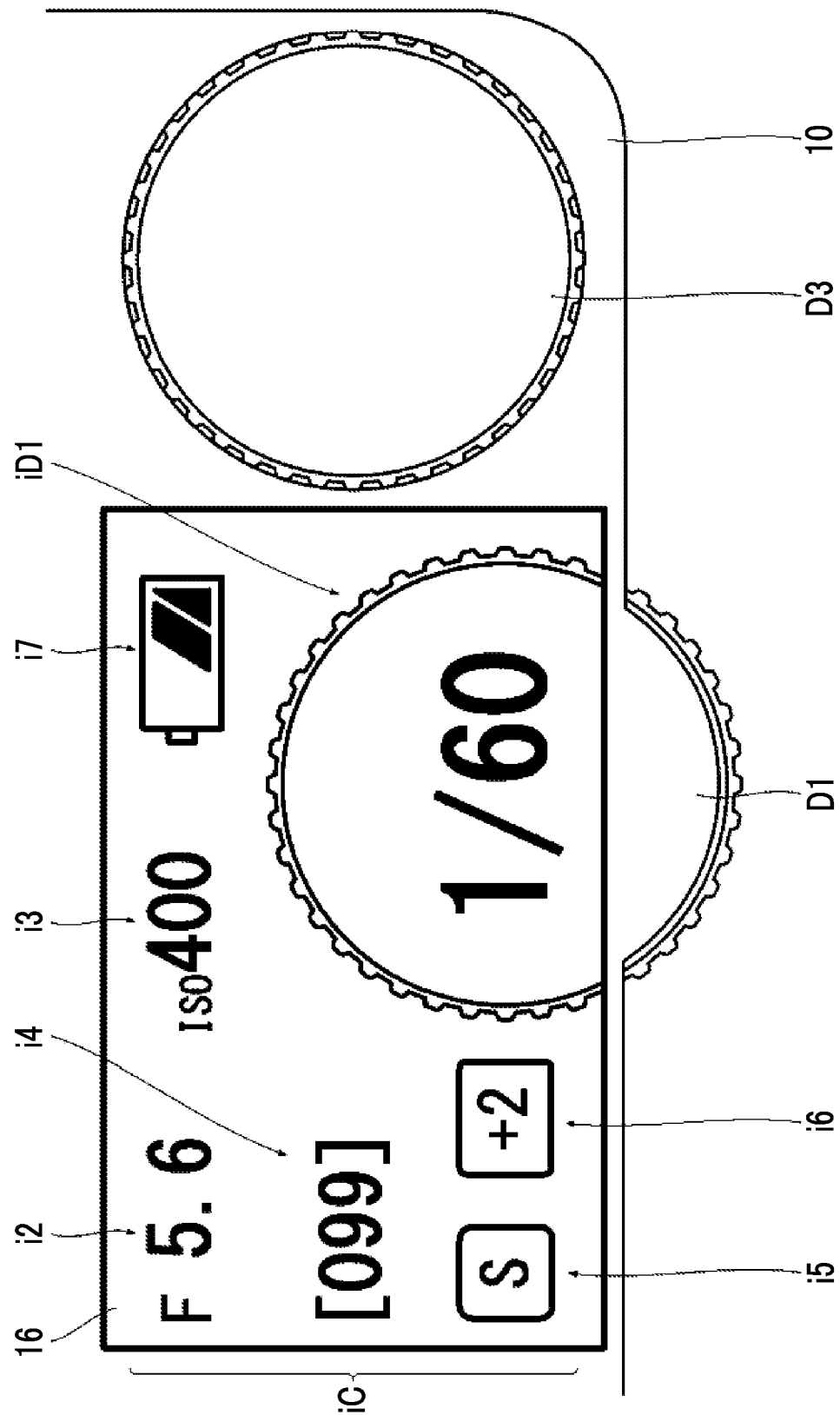

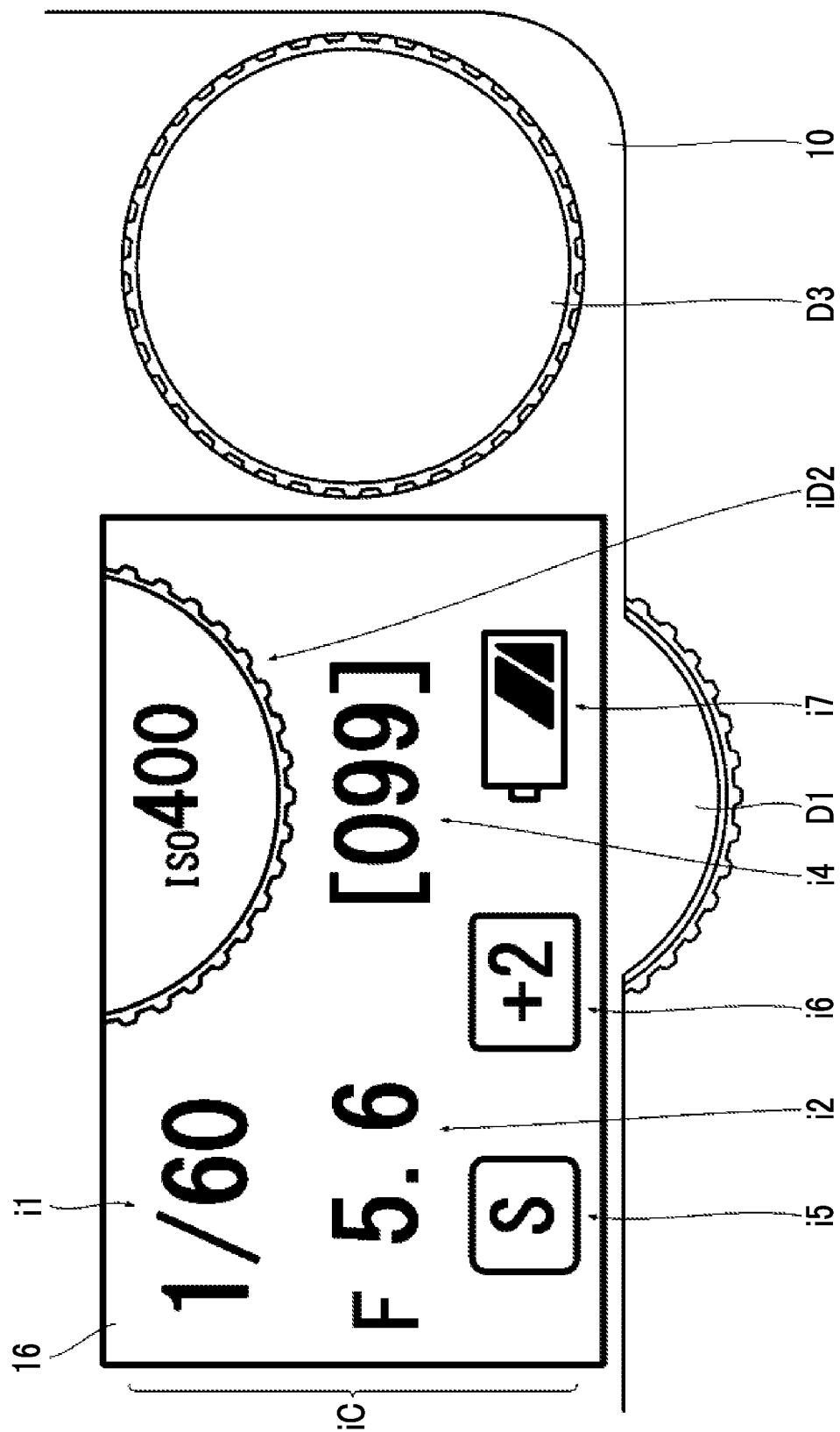

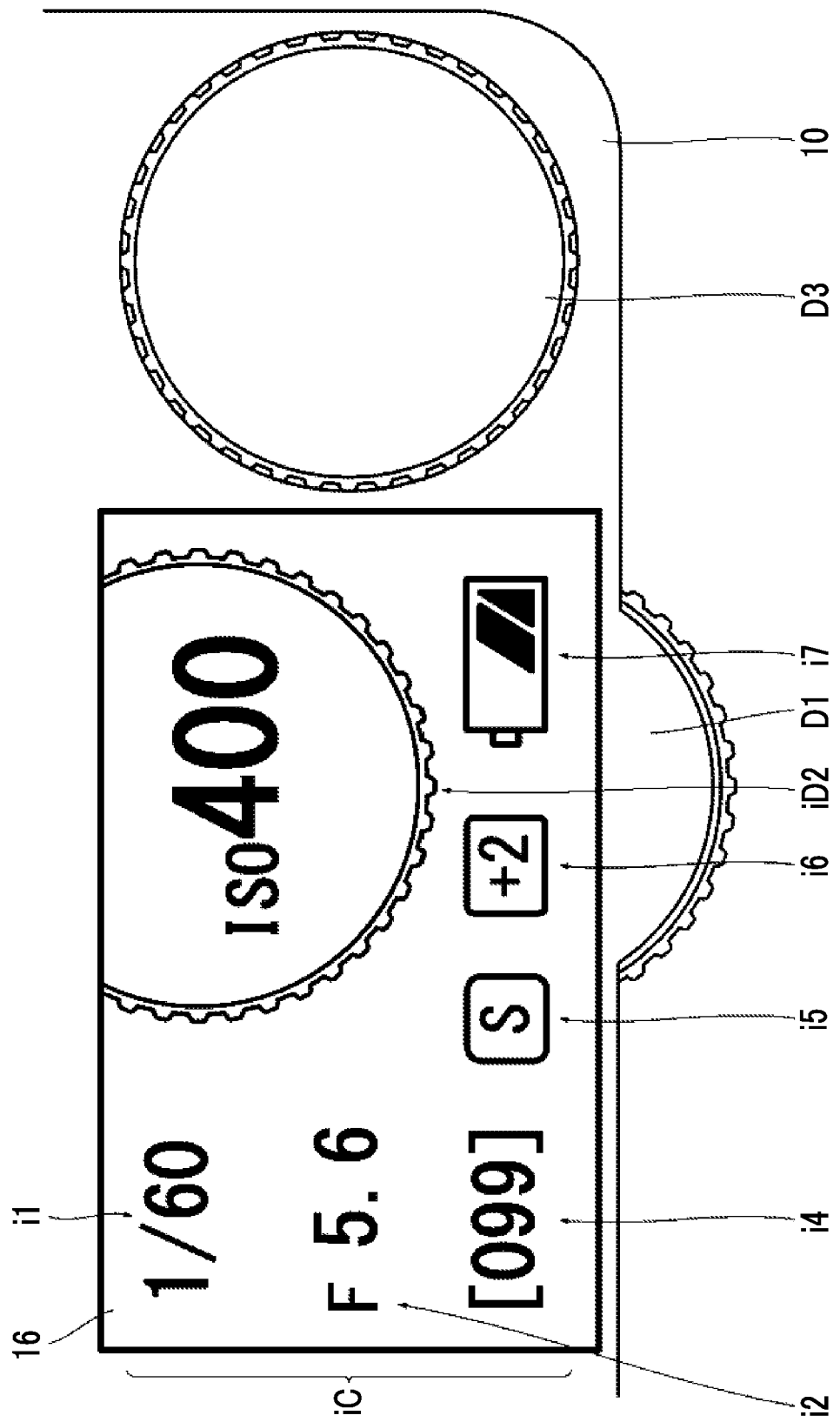

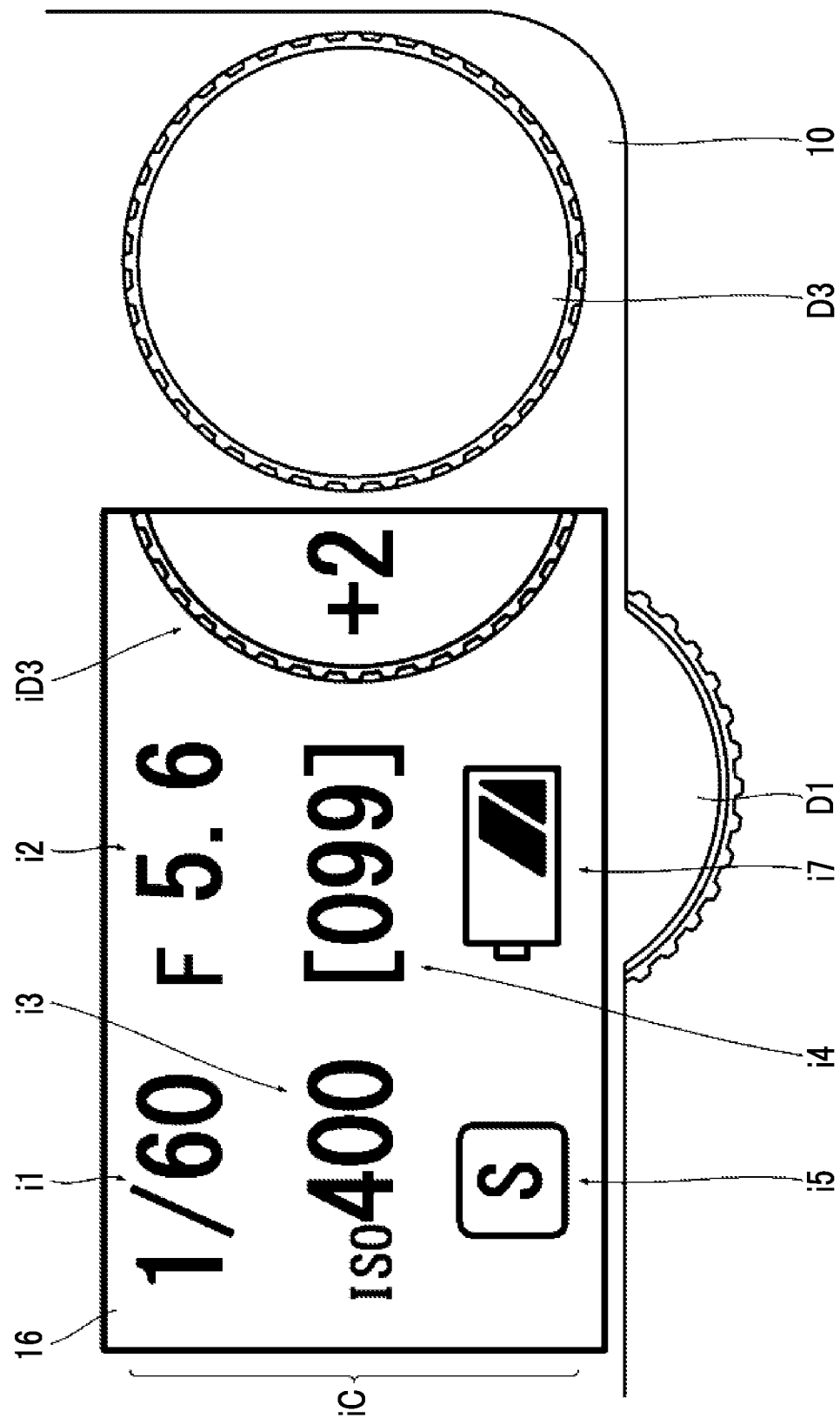

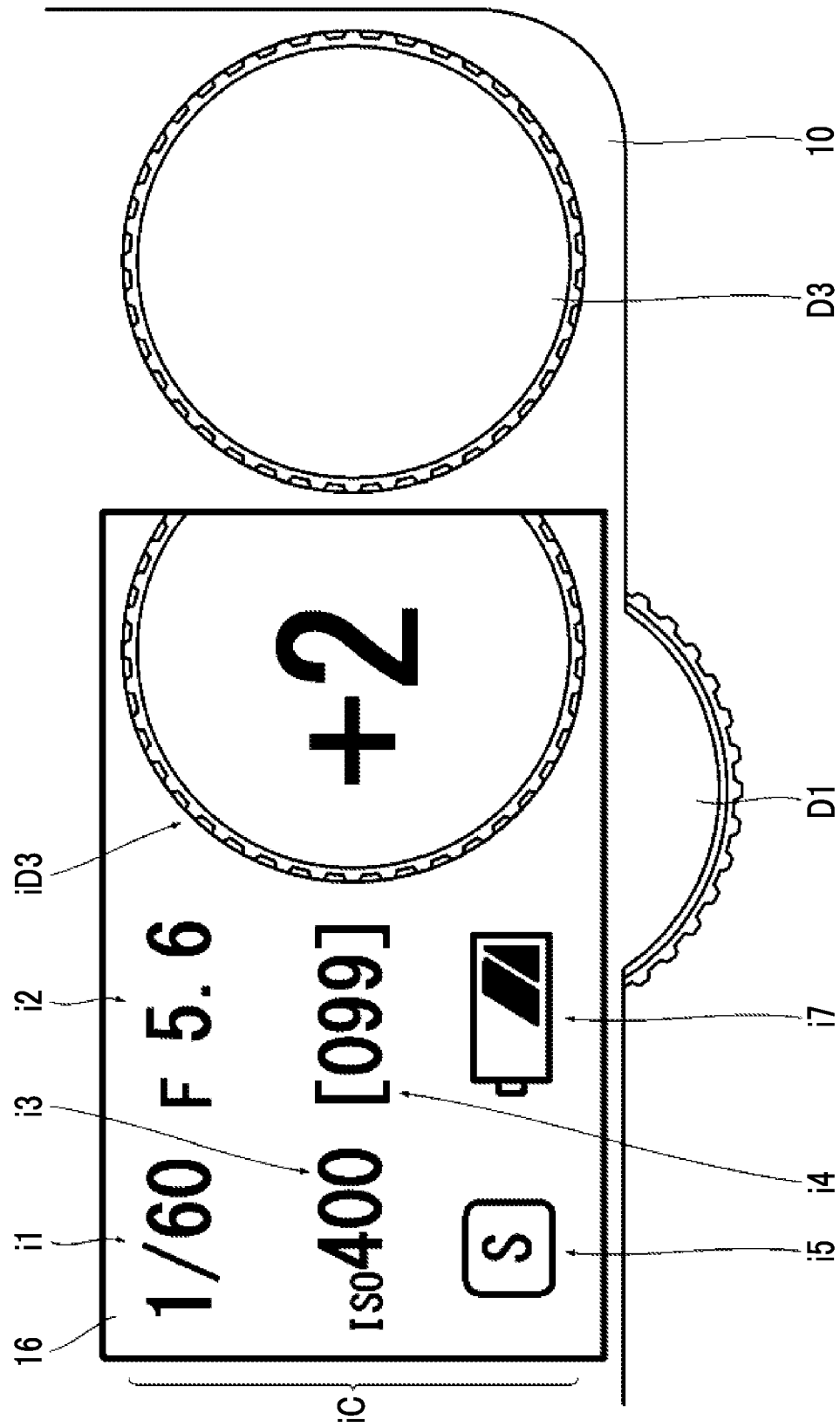

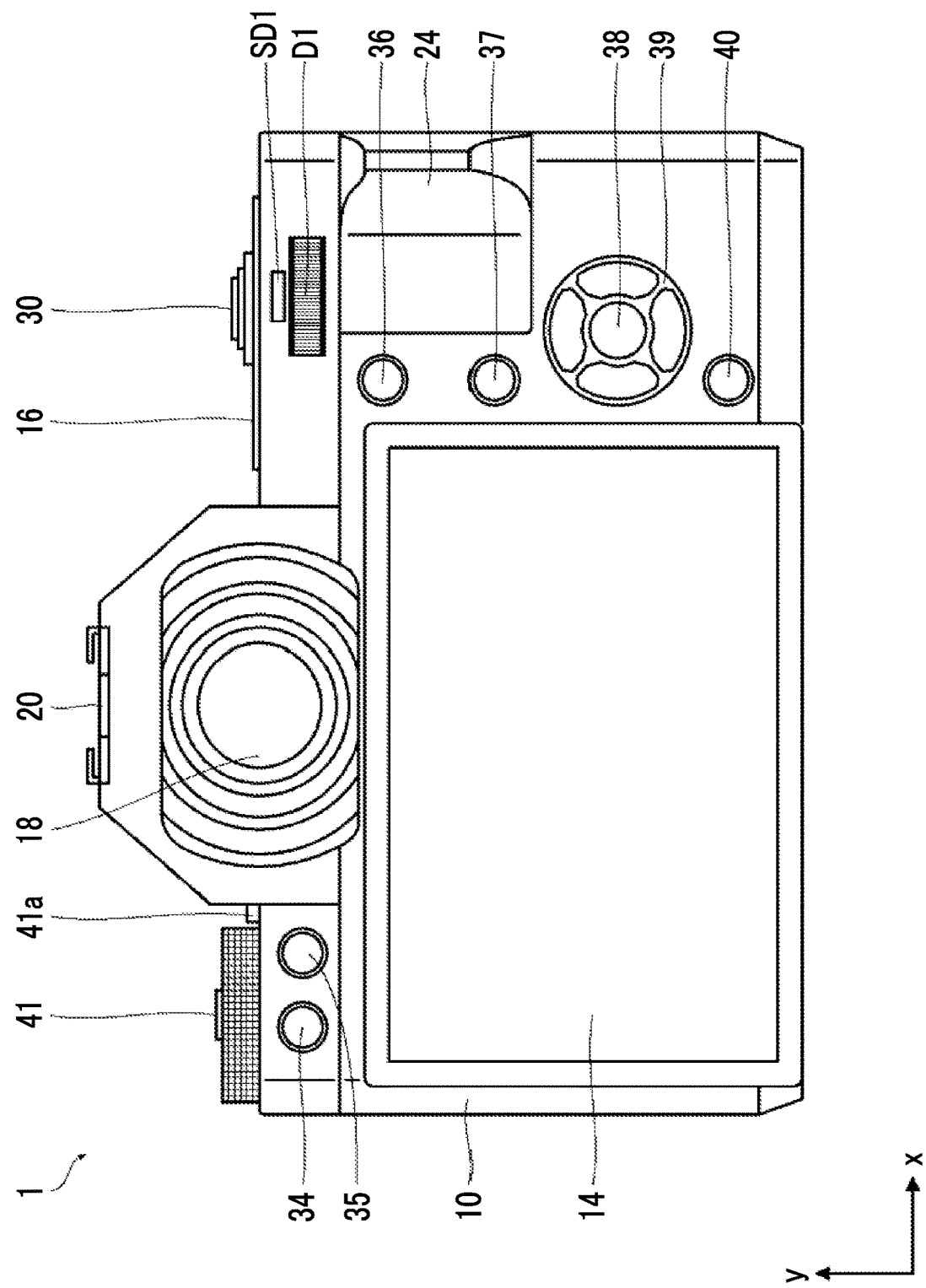

CAMERA AND DISPLAY CONTROL METHOD OF CAMERA

CROSS-REFERENCE TO RELATED APPLICATIONS

The present application is a Continuation of PCT International Application No. PCT/JP2017/031222 filed on Aug. 30, 2017 claiming priority under 35 U.S.C § 119(a) to Japanese Patent Application No. 2016-184554 filed on Sep. 21, 2016. Each of the above applications is hereby expressly incorporated by reference, in their entirety, into the present application.

BACKGROUND OF THE INVENTION

1. Field of the Invention

The present invention relates to a camera comprising a display section and an operation dial on a camera body and a display control method of the camera.

2. Description of the Related Art

A camera that comprises a display section on a top surface (so-called warship part) of a camera body and displays setting contents such as shutter speed and F-number on the display section is known.

Further, a camera that comprises a rotary operation dial on the camera body and performs various settings by the operation dial is known.

JP2003-110882A discloses a camera comprising a self-lighting type first display section and an external light reflection type second display section, and discloses that the first display section is disposed on a back surface of the camera body and the second display section is disposed on the top surface of the camera body. Further, JP2003-110882A discloses that the first display section displays a captured image and the second display section displays the setting contents of the camera, the same contents as contents of information displayed on the second display section is displayed on the first display section in a case where illumination provided on the second display section is turned on, and an image picture of the operation dial provided on the top surface of the camera body is displayed on the first display section.

Further, JP2015-154323A discloses a camera that comprises the operation dial on the top surface of the camera body and displays the image picture of the operation dial on the display section provided on the back surface of the camera body in a case where a lock of the operation dial is released.

Furthermore, WO2014/002659A discloses a camera that comprises the operation dial on the top surface of the camera body and displays the image picture of the operation dial on the display section provided on the back surface of the camera body in a case where contact with the operation dial is detected.

SUMMARY OF THE INVENTION

However, in the conventional configurations, since the image picture is displayed on the display section separate from the operation dial, there is a disadvantage that a movement of the line of sight for an operation increases and thus operability deteriorates. Further, there is also a disadvantage that a connection between the operation dial and the display section is weak and thus the operation is confusing.

The invention has been made in consideration of the above-mentioned circumstances, and an object of the invention is to provide a camera with good operability and a display control method of the camera.

Means for achieving the above-mentioned object are as follows.

(1) A camera comprising:
a display section;
a rotary operation dial provided near the display section;
a detection unit that detects contact or approach of a finger with the operation dial; and
a display control unit that controls a display on the display section,
wherein the display control unit displays setting contents of the camera on the display section,
causes an image picture of the operation dial to appear in a first size on the display section in a case where the contact or the approach of the finger with the operation dial is detected, and
enlarges the image picture of the operation dial made to appear on the display section to a second size and displays the enlarged image picture of the operation dial in a case where the contact or the approach of the finger with the operation dial is continuously detected for a certain period of time or more, or in a case where the operation dial is operated.

According to the embodiment, in the case where the finger touches or approaches the operation dial, the display on the display section can be switched. In a case where the finger does not touch or approach the operation dial, the setting contents of the camera are displayed on the display section. Accordingly, it is possible to confirm the setting situation of the camera from the display on the display section. In the case where the finger touches or approaches the operation dial, the image picture of the operation dial appears on the display section. Accordingly, it is possible to predict that the image picture of the operation dial may be displayed on the display section. In the case where the contact or the approach of the finger with the operation dial is continuously performed for the certain period of time or more, or in the case where the operation dial is operated, the image picture of the operation dial appearing on the display section is displayed in an enlarged manner. Accordingly, in the case where the operation dial is operated, it is possible to provide good operability.

(2) The camera according to (1),
wherein the display control unit displays a mark which is a base point on the display section in advance, and
enlarges the image picture of the operation dial with the mark as the base point and causes the enlarged image picture of the operation dial to appear in the first size on the display section in the case where the contact or the approach of the finger with the operation dial is detected.

According to the embodiment, the mark which is the base point in the case where the image picture of the operation dial appears is displayed on the display section in advance. In the case where the image picture of the operation dial appears, the image picture of the operation dial is enlarged with the mark as the base point and appears on the display section. Accordingly, it is possible to predict a position where the image picture of the operation dial is displayed and thus to provide better operability.

(3) A camera comprising:
a display section;
a rotary operation dial provided near the display section;
a detection unit that detects contact or approach of a finger with the operation dial;
a display control unit that controls a display on the display section; and
a lock unit that locks the operation dial,
wherein the display control unit displays setting contents of the camera on the display section,
causes an image picture of the operation dial to appear in a first size on the display section in a case where a lock of the operation dial is released, and
enlarges the image picture of the operation dial made to appear on the display section to a second size and displays the enlarged image picture of the operation dial in a case where the contact or the approach of the finger with the operation dial is detected in the state where the lock of the operation dial is released.

According to the embodiment, the display on the display section can be switched by an operation of locking the operation dial and an operation of releasing the lock of the operation dial. Further, in the case where the lock of the operation dial is released, the display on the display section can be switched by the contact or the approach of the finger with the operation dial. In the case where the operation dial is locked, the setting contents of the camera are displayed on the display section. Accordingly, it is possible to confirm the setting situation of the camera from the display on the display section. In the case where the lock of the operation dial is released, the image picture of the operation dial appears on the display section. Accordingly, it is possible to predict that the image picture of the operation dial may be displayed on the display section. In the case where the finger touches or approaches the operation dial whose lock is released, the image picture of the operation dial appearing on the display section is displayed in an enlarged manner. Accordingly, in the case where the operation dial is operated, it is possible to provide good operability.

(4) The camera according to (3),
wherein the display control unit displays a mark which is a base point on the display section in advance, and
enlarges the image picture of the operation dial with the mark as the base point and causes the enlarged image picture of the operation dial to appear in the first size on the display section in the case where the lock of the operation dial is released.

According to the embodiment, the mark which is the base point in the case where the image picture of the operation dial appears is displayed on the display section in advance. In the case where the image picture of the operation dial appears, the image picture of the operation dial is enlarged with the mark as the base point and appears on the display section. Accordingly, it is possible to predict a position where the image picture of the operation dial is displayed and thus to provide better operability.

(5) The camera according to any one of (1) to (4),
wherein the operation dial is built in a camera body, and a part of an outer periphery of the operation dial is disposed on an outer surface of the camera body in an exposed manner,
wherein the display section is disposed on the operation dial in an overlapped manner, and
wherein in the case where the image picture of the operation dial is enlarged to the second size and displayed, the image picture of the operation dial is formed of an image having an arc-like external shape obtained by extending the part of the outer periphery of the operation dial exposed from the camera body.

According to the embodiment, in the case where the image picture of the operation dial is enlarged to the second size, the image picture of the operation dial becomes an image having a predetermined external shape. That is, the image picture of the operation dial becomes the image having the arc-like external shape obtained by extending the part of the outer periphery of the operation dial exposed from the camera body. This image is an image as if a hidden portion of the operation dial is displayed. Accordingly, it is possible to strengthen a connection between the connection between the operation dial and the image picture displayed on the display section and thus to provide better operability.

(6) The camera according to any one of (1) to (5),
wherein the display control unit gradually enlarges and displays the image picture of the operation dial in the case where the image picture of the operation dial is enlarged to the second size and displayed, and
causes the display of the image picture of the operation dial to be deleted or gradually be reduced to the first size in a case where the contact or the approach of the finger with the operation dial is no longer detected during the enlargement.

According to the embodiment, the image picture of the operation dial is displayed in the second size while the image picture thereof is gradually enlarged. Accordingly, it is possible to further clarify a relationship between the image picture of the operation dial displayed on the display section and an actual operation dial. In the case where the contact or the approach of the finger with the operation dial is no longer detected during the enlargement, the display of the image picture of the operation dial on the display section is deleted. Alternatively, the image picture of the operation dial is gradually reduced to the first size.

(7) A camera comprising:
a display section;
a rotary operation dial provided near the display section;
a detection unit that detects contact or approach of a finger with the operation dial; and
a display control unit that controls a display on the display section,
wherein the display control unit displays setting contents of the camera on the display section,
causes an image picture of the operation dial to appear in a first display amount from an edge of the display section in a case where the contact or the approach of the finger with the operation dial is detected, and
displays the image picture of the operation dial made to appear in the first display amount from the edge of the display section in a second display amount larger than the first display amount in a case where the contact or the approach of the finger with the operation dial is continuously detected for a certain period of time or more, or in a case where the operation dial is operated.

According to the embodiment, in the case where the finger touches or approaches the operation dial, the display on the display section can be switched. In the case where the finger does not touch or approach the operation dial, the setting contents of the camera are displayed on the display section. Accordingly, it is possible to confirm the setting situation of the camera from the display on the display section. In the case where the finger touches or approaches the operation dial, the image picture of the operation dial appears from the edge of the display section. Accordingly, it is possible to predict that the image picture of the operation dial may be displayed on the display section. In the case where the contact or the approach of the finger with the operation dial is continuously detected for the certain period of time or more, or in the case where the operation dial is operated, the image picture of the operation dial appearing from the edge of the display section is displayed in a further large size. Accordingly, in the case where the operation dial is operated, it is possible to provide good operability.

(8) A camera comprising:
a display section;
a rotary operation dial provided near the display section;
a detection unit that detects contact or approach of a finger with the operation dial;
a display control unit that controls a display on the display section; and
a lock unit that locks the operation dial,
wherein the display control unit displays setting contents of the camera on the display section,
causes an image picture of the operation dial to appear in a first display amount from an edge of the display section in a case where a lock of the operation dial is released, and
displays the image picture of the operation dial made to appear in the first display amount from the edge of the display section in a second display amount larger than the first display amount in a case where the contact or the approach of the finger with the operation dial is detected in the state where the lock of the operation dial is released.

According to the embodiment, the display on the display section can be switched by the operation of locking the operation dial and the operation of releasing the lock of the operation dial. Further, in the case where the lock of the operation dial is released, the display on the display section can be switched by the contact or the approach of the finger with the operation dial. In the case where the operation dial is locked, the setting contents of the camera are displayed on the display section. Accordingly, it is possible to confirm the setting situation of the camera from the display on the display section. In the case where the lock of the operation dial is released, the image picture of the operation dial appears from the edge of the display section. Accordingly, it is possible to predict that the image picture of the operation dial may be displayed on the display section. In the case where the finger touches or approaches the operation dial whose lock is released, the image picture of the operation dial appearing from the edge of the display section is displayed in a further large size. Accordingly, in the case where the operation dial is operated, it is possible to provide good operability.

(9) The camera according to (7) or (8),
wherein the operation dial is built in a camera body, and a part of an outer periphery of the operation dial is disposed on an outer surface of the camera body in an exposed manner,
wherein the display section is disposed on the operation dial in an overlapped manner, and
wherein in the case where the image picture of the operation dial is displayed in the second display amount, the image picture of the operation dial is formed of an image having an arc-like external shape obtained by extending the part of the outer periphery of the operation dial exposed from the camera body.

According to the embodiment, in the case where the image picture of the operation dial is displayed in the second display amount, the image picture thereof becomes an image having a predetermined external shape. That is, the image picture of the operation dial becomes the image having the arc-like external shape obtained by extending the part of the outer periphery of the operation dial exposed from the camera body. This image is an image as if a hidden portion of the operation dial is displayed. Accordingly, it is possible to strengthen a connection between the connection between the operation dial and the image picture displayed on the display section and thus to provide better operability.

(10) The camera according to any one of (7) to (9),
wherein the display control unit gradually advances and displays the image picture of the operation dial from the edge of the display section in the case where the image picture of the operation dial is displayed in the second display amount, and
causes the display of the image picture of the operation dial to be deleted or gradually be retracted to the first display amount in a case where the contact or the approach of the finger with the operation dial is no longer detected during the advancement.

According to the embodiment, the image picture of the operation dial is displayed in the second display amount while the image picture thereof gradually advances from the edge of the display section. Accordingly, it is possible to further clarify a relationship between the image picture of the operation dial displayed on the display section and an actual operation dial. In the case where the contact or the approach of the finger with the operation dial is no longer detected during the advancement, the display of the image picture of the operation dial on the display section is deleted. Alternatively, the image picture of the operation dial is gradually retracted to the first display amount.

(11) The camera according to any one of (1) to (10),
wherein the setting contents of the camera include information on a setting value of an item to be set by the operation dial, and
wherein in the case where the image picture of the operation dial is displayed, the display control unit displays the setting contents of the camera on the display section excluding the information on the setting value of the item to be set by the operation dial.

According to the embodiment, the information displayed on the display section as the setting contents of the camera includes the information on the setting value of the item to be set by the operation dial. However, in the case where the image picture of the operation dial is displayed, the information as the setting contents of the camera is displayed on the display section excluding the information on the setting value of the item to be set by the operation dial. Since the setting value of the item to be set by the operation dial can be confirmed by the image picture of the operation dial, the display thereof is omitted. Accordingly, it is possible to eliminate a redundant display and thus to effectively utilize display space on the display section.

(12) The camera according to any one of (1) to (11),
wherein in the case where the image picture of the operation dial is displayed, the display control unit changes a display layout of the setting contents of the camera to avoid displaying the setting contents of the camera and the image picture of the operation dial in an overlapped manner.

According to the embodiment, in the case where the image picture of the operation dial is displayed on the display section, the display layout of the setting contents of the camera is adjusted so as not to overlap with the display of the image picture thereof. Accordingly, it is possible to make the display on the display section easier to view and thus to provide good operability.

(13) A camera comprising:
a display section;
a rotary operation dial provided near the display section;
a detection unit that detects contact or approach of a finger with the operation dial; and
a display control unit that controls a display on the display section,
wherein the display control unit displays setting contents of the camera and an image picture of the operation dial on the display section and switches a display form of the image picture of the operation dial according to a detection result of the detection unit.

According to the embodiment, the setting contents of the camera and the image picture of the operation dial are displayed on the display section. In the case where the finger touches or approaches the operation dial, the display form of the image picture of the operation dial can be switched. Accordingly, it is possible to improve the visibility of the image picture of the operation dial and thus to provide good operability.

(14) The camera according to (13),
wherein the operation dial is built in a camera body, and
a part of an outer periphery of the operation dial is disposed on an outer surface of the camera body in an exposed manner,
wherein the display section is disposed on the operation dial in an overlapped manner, and
wherein the image picture of the operation dial is formed of an image having an arc-like external shape obtained by extending the part of the outer periphery of the operation dial exposed from the camera body.

According to the embodiment, the image picture of the operation dial is formed of an image having a predetermined external shape. That is, the image picture of the operation dial is formed of the image having the arc-like external shape obtained by extending the part of the outer periphery of the operation dial exposed from the camera body. Accordingly, it is possible to strengthen the connection between the operation dial and the image picture displayed on the display section and thus to provide better operability.

(15) The camera according to (14),
wherein a display form in a case where the contact or the approach of the finger with the operation dial is not detected is a form in which a current setting value is displayed inside the image having the arc-like external shape, and
wherein a display form in a case where the contact or the approach of the finger with the operation dial is detected is a form in which selectable setting values are displayed at regular pitches on the same circumference inside the image having the arc-like external shape.

According to the embodiment, in the case where the finger does not touch or approach the operation dial, the current setting value is displayed inside the image having the arc-like external shape (dial plate portion). Accordingly, it is possible to easily confirm the current setting. On the other hand, in the case where the finger touches or approaches the operation dial, the selectable setting values are displayed at regular pitches on the same circumference inside the image having the arc-like external shape. Accordingly, it can be easily recognized that the setting change is possible by the operation of the operation dial.

(16) The camera according to (14),
wherein a display form in a case where the contact or the approach of the finger with the operation dial is not detected is a form in which a current setting value is displayed to be stationary inside the image having the arc-like external shape, and
wherein a display form in a case where the contact or the approach of the finger with the operation dial is detected is a form in which the current setting value is displayed to be turned on and off inside the image having the arc-like external shape.

According to the embodiment, in the case where the finger does not touch or approach the operation dial, the current setting value is displayed to be stationary inside the image having the arc-like external shape. Accordingly, it is possible to easily confirm the current setting. On the other hand, in the case where the finger touches or approaches the operation dial, the current setting value is displayed to be turned on and off inside the image having the arc-like external shape. Accordingly, it can be easily recognized that the setting change is possible by the operation of the operation dial.

(17) A camera comprising:
a display section;
a rotary operation dial provided near the display section; and
a display control unit that controls a display on the display section,
wherein the display control unit displays setting contents of the camera and an image picture of the operation dial on the display section and switches a display form of the image picture of the operation dial in response to an operation of the operation dial.

According to the embodiment, the setting contents of the camera and the image picture of the operation dial are displayed on the display section. In the case where the operation dial is operated, the display form of the image picture of the operation dial can be switched. Accordingly, it is possible to improve the visibility of the image picture of the operation dial and thus to provide good operability.

(18) The camera according to (17),
wherein the operation dial is built in a camera body, and
a part of an outer periphery of the operation dial is disposed on an outer surface of the camera body in an exposed manner,
wherein the display section is disposed on the operation dial in an overlapped manner, and
wherein the image picture of the operation dial is formed of an image having an arc-like external shape obtained by extending the part of the outer periphery of the operation dial exposed from the camera body.

According to the embodiment, the image picture of the operation dial is formed of an image having a predetermined external shape. That is, the image picture of the operation dial is formed of the image having the arc-like external shape obtained by extending the part of the outer periphery of the operation dial exposed from the camera body. Accordingly, it is possible to strengthen the connection between the operation dial and the image picture displayed on the display section and thus to provide better operability.

(19) The camera according to (18),
wherein a display form in a case where the operation dial is not operated is a form in which a current setting value is displayed inside the image having the arc-like external shape, and
wherein a display form in a case where the operation dial is operated is a form in which selectable setting values are displayed at regular pitches on the same circumference inside the image having the arc-like external shape.

According to the embodiment, in the case where the finger does not touch or approach the operation dial, the current setting value is displayed inside the image having the arc-like external shape. Accordingly, it is possible to easily confirm the current setting. On the other hand, in the case where the finger touches or approaches the operation dial, the selectable setting values are displayed at regular pitches on the same circumference inside the image having the arc-like external shape. Accordingly, it can be easily recognized that the setting change is possible by the operation of the operation dial.

(20) The camera according to (18),
wherein a display form in a case where the operation dial is not operated is a form in which a current setting value is displayed to be stationary inside the image having the arc-like external shape, and
wherein a display form in a case where the operation dial is operated is a form in which the current setting value is displayed to be turned on and off inside the image having the arc-like external shape.

According to the embodiment, in the case where the finger does not touch or approach the operation dial, the current setting value is displayed to be stationary inside the image having the arc-like external shape. Accordingly, it is possible to easily confirm the current setting. On the other hand, in the case where the finger touches or approaches the operation dial, the current setting value is displayed to be turned on and off inside the image having the arc-like external shape. Accordingly, it can be easily recognized that the setting change is possible by the operation of the operation dial.

(21) The camera according to any one of (1) to (20) comprising:
an operation target setting unit that sets an operation target of the operation dial,
wherein the display control unit displays an image picture according to the operation target set by the operation target setting unit on the display section.

According to the embodiment, the operation target of the operation dial can be set randomly. Accordingly, it is possible to operate various functions by the operation dial. In a case where the operation target is switched, an image picture corresponding to a newly set operation target is displayed on the display section.

(22) A display control method of a camera comprising:
displaying setting contents of the camera on the display section provided near an operation dial;
causing an image picture of the operation dial to appear in a first size on the display section in a case where the contact or the approach of the finger with the operation dial is detected; and
enlarging the image picture of the operation dial made to appear on the display section to a second size and displaying the enlarged image picture of the operation dial in a case where the contact or the approach of the finger with the operation dial is continuously detected for a certain period of time or more, or in a case where the operation dial is operated.

According to the embodiment, in the case where the finger touches or approaches the operation dial, the display on the display section can be switched. In the case where the finger does not touch or approach the operation dial, the setting contents of the camera are displayed on the display section. Accordingly, it is possible to confirm the setting situation of the camera from the display on the display section. In the case where the finger touches or approaches the operation dial, the image picture of the operation dial appears on the display section. Accordingly, it is possible to predict that the image picture of the operation dial may be displayed on the display section. In the case where the contact or the approach of the finger with the operation dial is continuously performed for the certain period of time or more, or in the case where the operation dial is operated, the image picture of the operation dial appearing on the display section is displayed in an enlarged manner. Accordingly, in the case where the operation dial is operated, it is possible to provide good operability.

(23) A display control method of a camera comprising:
displaying setting contents of the camera on the display section provided near an operation dial;
causing an image picture of the operation dial to appear in a first size on the display section in a case where a lock of the operation dial is released; and
enlarging the image picture of the operation dial made to appear on the display section to a second size and displaying the enlarged image picture of the operation dial in a case where the contact or the approach of the finger with the operation dial is detected in the state where the lock of the operation dial is released.

According to the embodiment, the display on the display section can be switched by the operation of locking the operation dial and the operation of releasing the lock of the operation dial. Further, in the case where the lock of the operation dial is released, the display on the display section can be switched by the contact or the approach of the finger with the operation dial. In the case where the operation dial is locked, the setting contents of the camera are displayed on the display section. Accordingly, it is possible to confirm the setting situation of the camera from the display on the display section. In the case where the lock of the operation dial is released, the image picture of the operation dial appears on the display section. Accordingly, it is possible to predict that the image picture of the operation dial may be displayed on the display section. In the case where the finger touches or approaches the operation dial whose lock is released, the image picture of the operation dial appearing on the display section is displayed in an enlarged manner. Accordingly, in the case where the operation dial is operated, it is possible to provide good operability.

(24) A display control method of a camera comprising:
displaying setting contents of the camera on the display section provided near an operation dial;
causing an image picture of the operation dial to appear in a first display amount from an edge of the display section in a case where the contact or the approach of the finger with the operation dial is detected; and
displaying the image picture of the operation dial made to appear in the first display amount from the edge of the display section in a second display amount larger than the first display amount in a case where the contact or the approach of the finger with the operation dial is continuously detected for a certain period of time or more, or in a case where the operation dial is operated.

According to the embodiment, in the case where the finger touches or approaches the operation dial, the display on the display section can be switched. In the case where the finger does not touch or approach the operation dial, the setting contents of the camera are displayed on the display section. Accordingly, it is possible to confirm the setting situation of the camera from the display on the display section. In the case where the finger touches or approaches the operation dial, the image picture of the operation dial appears from the edge of the display section. Accordingly, it is possible to predict that the image picture of the operation dial may be displayed on the display section. In the case where the contact or the approach of the finger with the operation dial is continuously detected for the certain period of time or more, or in the case where the operation dial is operated, the image picture of the operation dial appearing from the edge of the display section is displayed in a further large size. Accordingly, in the case where the operation dial is operated, it is possible to provide good operability.

(25) A display control method of a camera comprising:
displaying setting contents of the camera on the display section provided near an operation dial;
causing an image picture of the operation dial to appear in a first display amount from an edge of the display section in a case where a lock of the operation dial is released; and
displaying the image picture of the operation dial made to appear in the first display amount from the edge of the display section in a second display amount larger than the first display amount in a case where the contact or the approach of the finger with the operation dial is detected in the state where the lock of the operation dial is released.

According to the embodiment, the display on the display section can be switched by the operation of locking the operation dial and the operation of releasing the lock of the operation dial. Further, in the case where the lock of the operation dial is released, the display on the display section can be switched by the contact or the approach of the finger with the operation dial. In the case where the operation dial is locked, the setting contents of the camera are displayed on the display section. Accordingly, it is possible to confirm the setting situation of the camera from the display on the display section. In the case where the lock of the operation dial is released, the image picture of the operation dial appears from the edge of the display section. Accordingly, it is possible to predict that the image picture of the operation dial may be displayed on the display section. In the case where the finger touches or approaches the operation dial whose lock is released, the image picture of the operation dial appearing from the edge of the display section is displayed in a further large size. Accordingly, in the case where the operation dial is operated, it is possible to provide good operability.

(26) A display control method of a camera comprising:
displaying setting contents of the camera provided near an operation dial and an image picture of the operation dial on the display section;
detecting contact or approach of a finger with the operation dial; and
switching a display form of the image picture of the operation dial between a case where the contact or the approach of the finger with the operation dial is detected and a case where the contact or the approach of the finger with the operation dial is not detected.

According to the embodiment, the setting contents of the camera and the image picture of the operation dial are displayed on the display section. In the case where the finger touches or approaches the operation dial, the display form of the image picture of the operation dial can be switched. Accordingly, it is possible to improve the visibility of the image picture of the operation dial and thus to provide good operability.

(27) A display control method of a camera comprising:
displaying setting contents of the camera provided near an operation dial and an image picture of the operation dial on the display section; and
switching a display form of the image picture of the operation dial between a case where the operation dial is operated and a case where the operation dial is not operated.

According to the embodiment, the setting contents of the camera and the image picture of the operation dial are displayed on the display section. In the case where the operation dial is operated, the display form of the image picture of the operation dial can be switched. Accordingly, it is possible to improve the visibility of the image picture of the operation dial and thus to provide good operability.

According to the invention, it is possible to provide the camera with good operability.

BRIEF DESCRIPTION OF THE DRAWINGS

FIG. 47 is a plan view showing an example of the display on the sub-display in the case where the contact with the rear command dial is continuously detected for the certain period of time or more.

FIG. 48 is a plan view showing an example of the display on the sub-display in a case where the contact with a front command dial is detected.

FIG. 49 is a plan view showing an example of the display on the sub-display in a case where the contact with a front command dial is continuously detected for the certain period of time or more.

FIG. 50 is a plan view showing an example of the display on the sub-display in a case where the contact with the top surface command dial is detected.

FIG. 51 is a plan view showing an example of the display on the sub-display in a case where the contact with the top surface command dial is continuously detected for the certain period of time or more.

FIG. 52 is a back view of a digital camera comprising a sensor that detects approach of the finger with the rear command dial.

DESCRIPTION OF THE PREFERRED EMBODIMENTS

A preferred embodiment of the invention will be described in detail below with reference to accompanying drawings.

First Embodiment

[Appearance]

Figure 1:
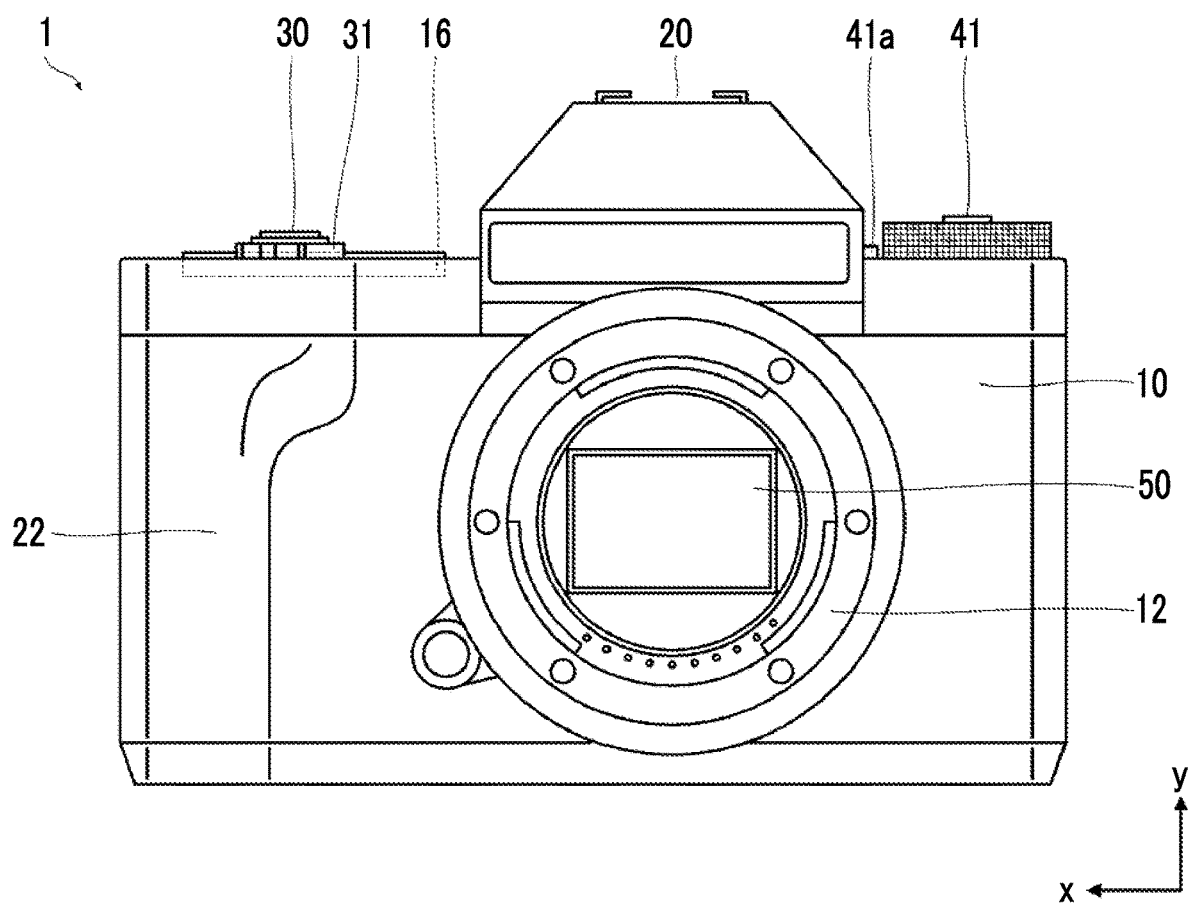
FIG. 1 is a front view of a digital camera.
Figure 2:
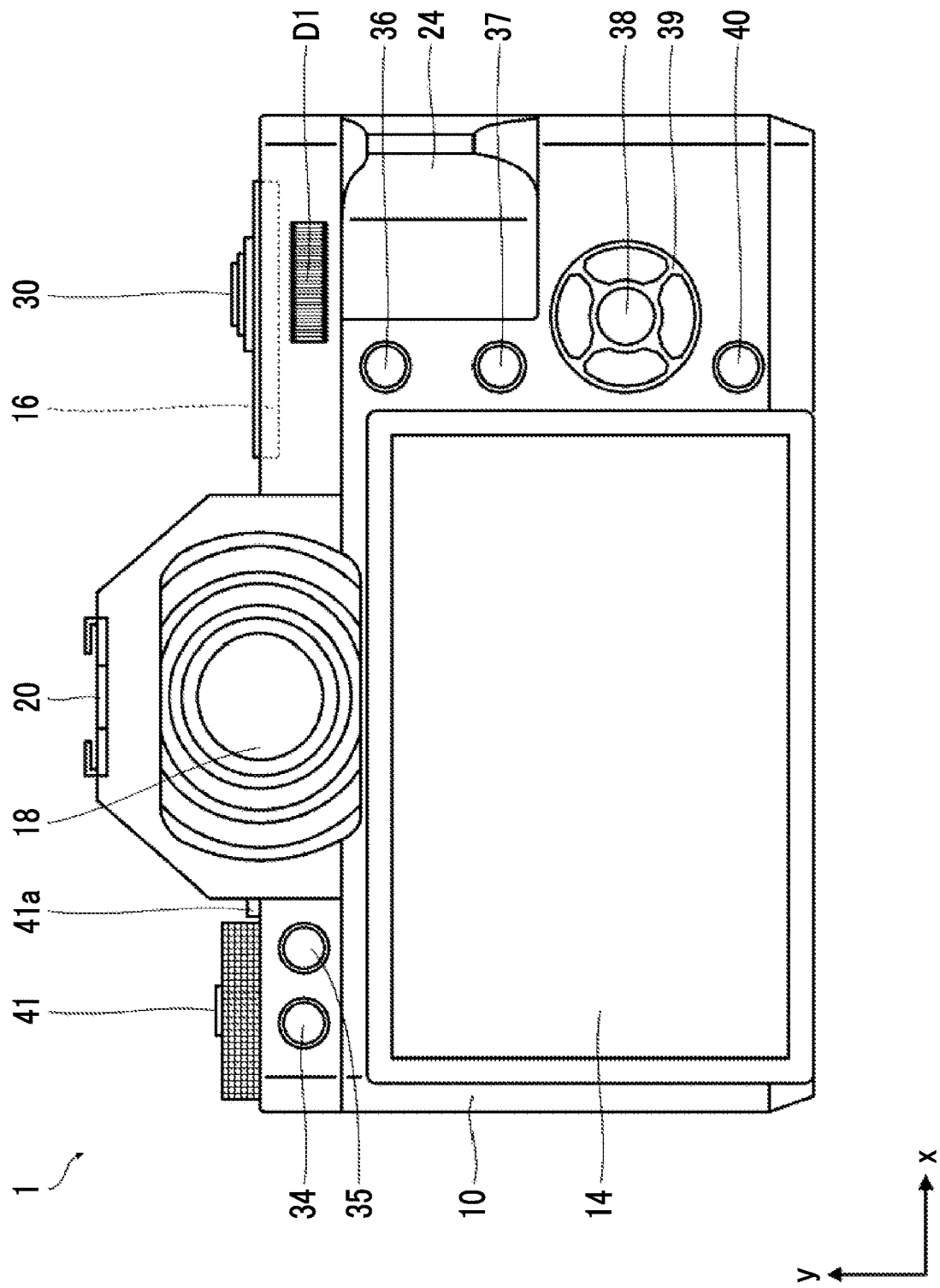
FIG. 2 is a back view of the digital camera.
Figure 3:
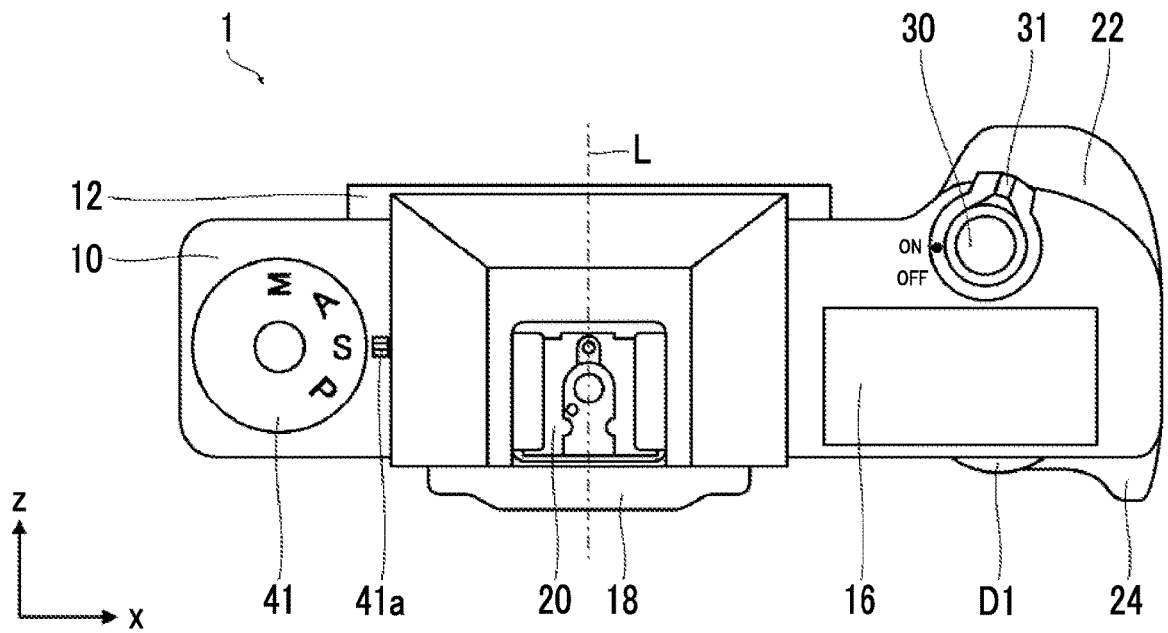
FIG. 3 is a plan view of the digital camera.
Figure 4:
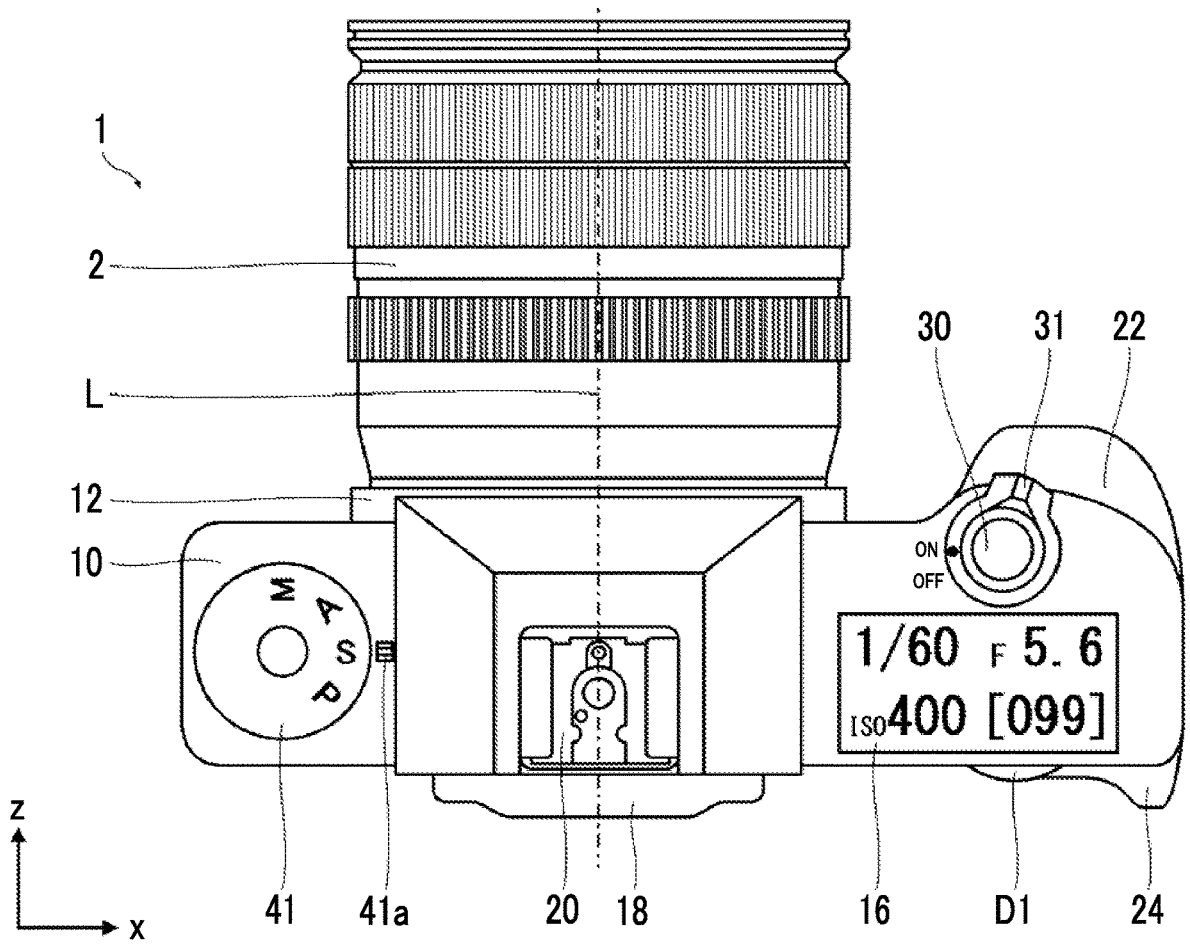
FIG. 4 is a plan view of the digital camera in a state where a lens is mounted.
Figure 5:
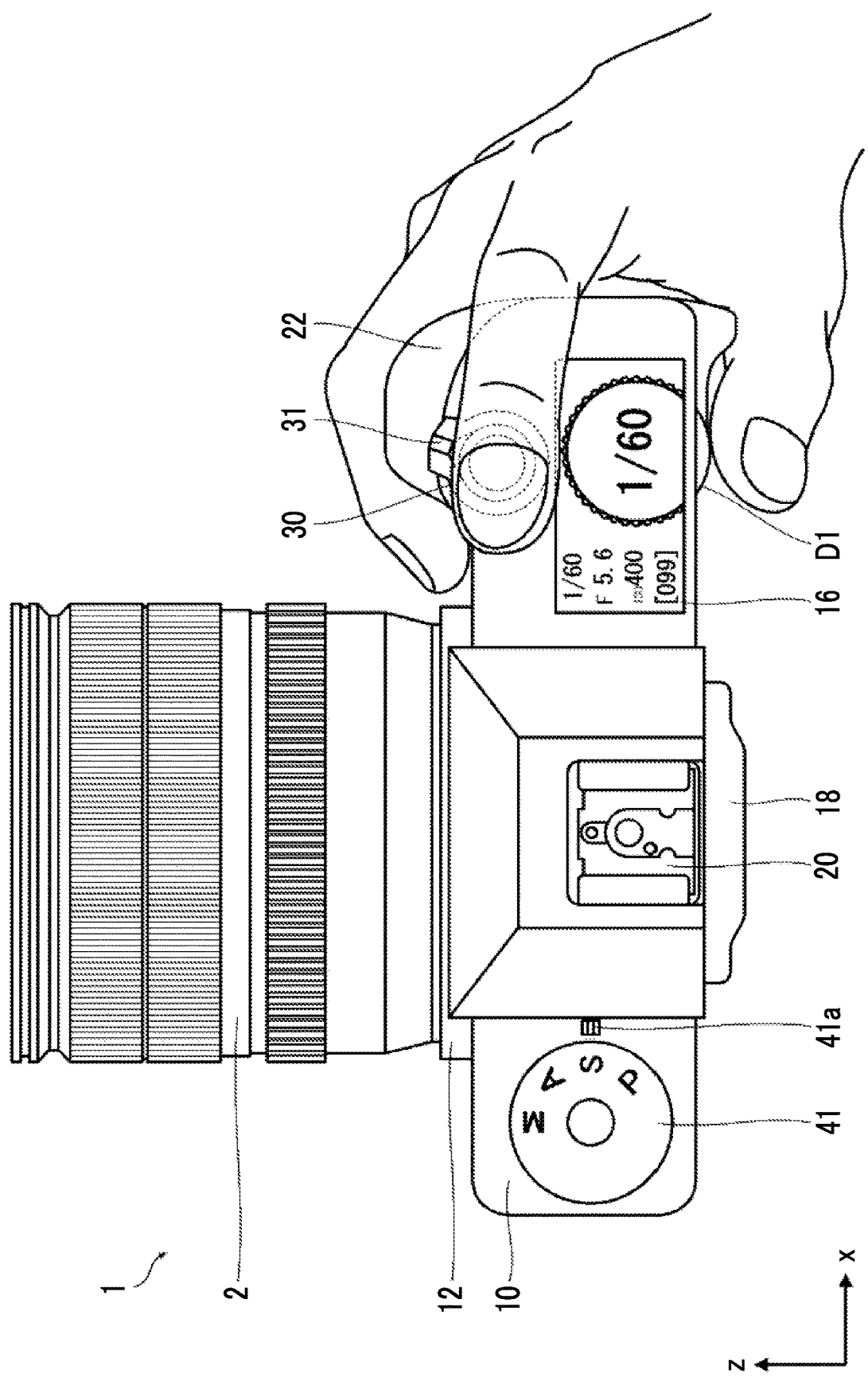
FIG. 5 is a plan view showing a use form at a time of imaging of the digital camera.

FIGS. 1, 2, and 3 are a front view, a back view, and a plan view, respectively, showing an example of a digital camera to which the invention is applied. Further, FIG. 4 is a plan view of the digital camera in a state where a lens is mounted. Further, FIG. 5 is a plan view showing a use form at a time of imaging of the digital camera.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical view finder and is also referred to as a mirrorless digital camera.

As shown in FIGS. 1 to 5, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a display button 40, a mode dial 41, a rear command dial D1, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion comprises a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-Display»

The main-display 14 is mainly used for the display of an image. As shown in FIG. 2, the main-display 14 is provided on the back surface of the camera body 10. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display 14 by performing the live view at the time of the imaging.

Further, the main-display 14 is also used as a graphical user interface (GUI). That is, in a case where various settings are performed, a setting screen is displayed on the main-display 14 and the various settings are performed on the setting screen.

«Sub-Display»

The sub-display 16 is an example of a display section. The sub-display 16 is mainly used for the display of setting contents of the camera. The sub-display 16 is formed of a display smaller than the main-display 14.

The sub-display 16 is provided on a top surface of the camera body 10 as shown in FIG. 3. In particular, in the digital camera 1 of the embodiment, the sub-display 16 is provided at an end portion on a grip portion side on the top surface of the camera body 10. A display surface of the sub-display 16 configures a part of the top surface of the camera body 10.

The display surface of sub-display 16 has a rectangular shape, and the short side thereof is disposed in parallel to the optical axis L. More specifically, the short side thereof is disposed along the front-rear direction (z direction), and the long side thereof is disposed along the lateral direction (x direction).

As described above, the sub-display 16 displays the setting contents of the digital camera 1. Specific display contents will be described below.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the display button 40, the mode dial 41, the rear command dial D1, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, respective pieces of processing such as AE, AF, and AWB are performed. Thereafter, in a case where the shutter button 30 is fully pressed, main imaging, that is, receiving of an image for recording is performed. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject. Further, the AWB is an abbreviation of automatic white balance and refers to a function that the camera automatically determines a light situation and reproduces an appropriate color state.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the last captured image is displayed on the main-display 14.

A function of switching from the playback mode to the imaging mode is assigned to the shutter button 30. In a case where the shutter button 30 is pressed in a state where the playback mode is set, the mode of the digital camera 1 is switched to the imaging mode.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. The menu button 38 is pressed to display the menu screen on the main-display 14. The setting screen for performing various setting can be called from the menu screen.

The menu button 38 functions also as an OK button. The OK button refers to a button for instructing OK for a selection item, a confirmation item, or the like.

<Selector Button>

The selector button 39 is formed of four buttons of up, down, left, and right disposed on the same circle with the menu button 38 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various setting screens are called on the main-display 14, the four buttons function as buttons that move a cursor in each direction on the screens.

<Display Button>

The display button 40 is a button that performs an instruction to switch the display on the main-display 14. The display button 40 is provided on the back surface of the camera body 10. In a case where the display button 40 is pressed in a state where the playback mode or the imaging mode is set, the display on the main-display 14 is switched. For example, in a case where the display button 40 is pressed in the state where the playback mode is set, an imaging condition, histogram, and the like of an image displayed on the main-display 14 are displayed on the image in an overlapped manner. For example, in a case where the display button 40 is pressed in the state where the imaging mode is set, various pieces of information such as the imaging condition or the histogram are displayed on the live view image in an overlapped manner.

The display button 40 functions as a BACK button. The BACK button is a button that performs an instruction to return the display on the main-display 14 to one previous state. For example, the display button 40 is pressed in a state where various setting screens are displayed on the main-display 14, the display on the main-display 14 is returned to one previous state. Accordingly, it is possible to cancel the selection item, the confirmation item, or the like.

<Mode Dial>

The mode dial 41 is a dial that sets the imaging mode. Each symbol of "P", "S", "A", and "M" is displayed on the same circumference at regular intervals on a dial plate portion on the top surface of the mode dial 41. The symbol "P" represents the program, the symbol "S" represents the shutter speed priority, the symbol "A" represents the aperture stop priority, and the symbol "M" represents the manual.

Here, the program refers to a mode in which a combination of the F-number and the shutter speed can be changed while the exposure is constantly maintained. The program is an imaging mode in which so-called program shift is possible.

The shutter speed priority refers to a mode in which the camera automatically decides an F-number such that the proper exposure is achieved for a shutter speed selected by the user.

The aperture stop priority refers to a mode in which the camera automatically decides a shutter speed such that the proper exposure is achieved for an F-number selected by the user.

The manual refers to a mode in which the user selects the shutter speed and the F-number.

The mode dial 41 is formed such that click-stop is possible at a position of each symbol with respect to an indicator 41a. In a case where the symbol "P" is set to the indicator 41a, the imaging mode is set to the program. In a case where the symbol "S" is set to the indicator 41a, the imaging mode is set to the shutter speed priority. In a case where the symbol "A" is set to the indicator 41a, the imaging mode is set to the aperture stop priority. In a case where the symbol "M" is set to the indicator 41a, the imaging mode is set to the manual.

FIG. 3 shows an example in the case where the imaging mode is set to the shutter speed priority. In this case, the symbol "S" is set to the indicator 41a.

<Rear Command Dial>

The rear command dial D1 is an example of the operation dial. The rear command dial D1 is built in the camera body 10, and a part of the outer periphery thereof is disposed on the surface of the camera body 10 in an exposed manner. In the digital camera 1 of the embodiment, the part of the outer periphery thereof is disposed on the back surface of the camera body 10 in an exposed manner. More specifically, the part of the outer periphery thereof is disposed in the upper right corner of the back surface. This position is a position where the operation is possible with the thumb of the right hand holding the grip portion of the camera body 10.

Figure 6:
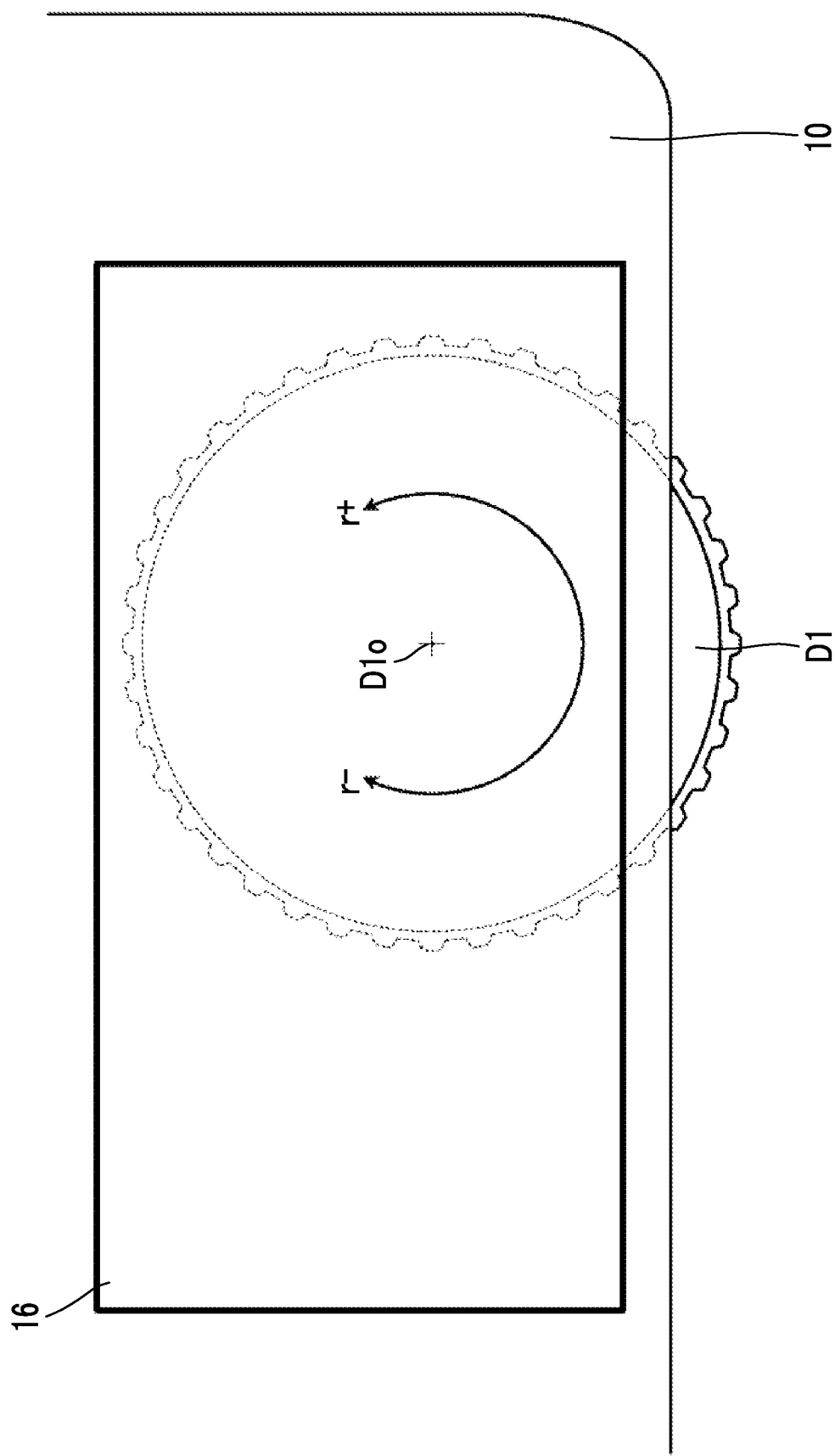
FIG. 6 is a plan view enlarging an installation part of a sub-display.

FIG. 6 is a plan view enlarging an installation part of a sub-display.

The rear command dial D1 is disposed under the sub-display 16 in a case where the camera body 10 is viewed in a plan view. In other words, the sub-display 16 is disposed on the rear command dial D1 in an overlapped manner. Further, a rotation axis D1o of the rear command dial D1 is disposed orthogonally to the display surface of the sub-display 16. In other words, the rear command dial D1 has the rotation axis D1o in a direction crossing the display surface of the sub-display 16. Furthermore, the rotation axis D1o of the rear command dial D1 is disposed within the display surface of the sub-display 16. In other words, the sub-display 16 is disposed on the axis of the rear command dial D1.

In the rear command dial D1 disposed as described above, a portion exposed from the outer surface of the camera body 10 is provided near the sub-display 16. The "near" refers to a distance relationship to the extent that the sub-display 16 and the rear command dial D1 are disposed adjacent to each other as shown in FIG. 6.

The rear command dial D1 has a disc shape, and unevenness for preventing slippage is periodically provided along the circumference direction on the outer periphery of the command dial CD.

The rear command dial D1 is provided such that the rotation operation is possible endlessly and in both directions. That is, the rear command dial D1 is provided such that the rotation operation is possible endlessly in a clockwise rotation direction r− with the rotation axis D1o as the center and in a counterclockwise rotation direction r+. The clockwise rotation direction r− is set as a minus rotation direction, and the counterclockwise rotation direction r+ is set as a plus rotation direction.

Further, the rear command dial D1 has a click mechanism and is formed such that the click-stop is possible at regular angle intervals. The click-stop refers to a function of stopping the rotation with a click feeling. Since this type of click mechanism is a publicly known technique, a description of specific configuration thereof is omitted.

Figure 8:
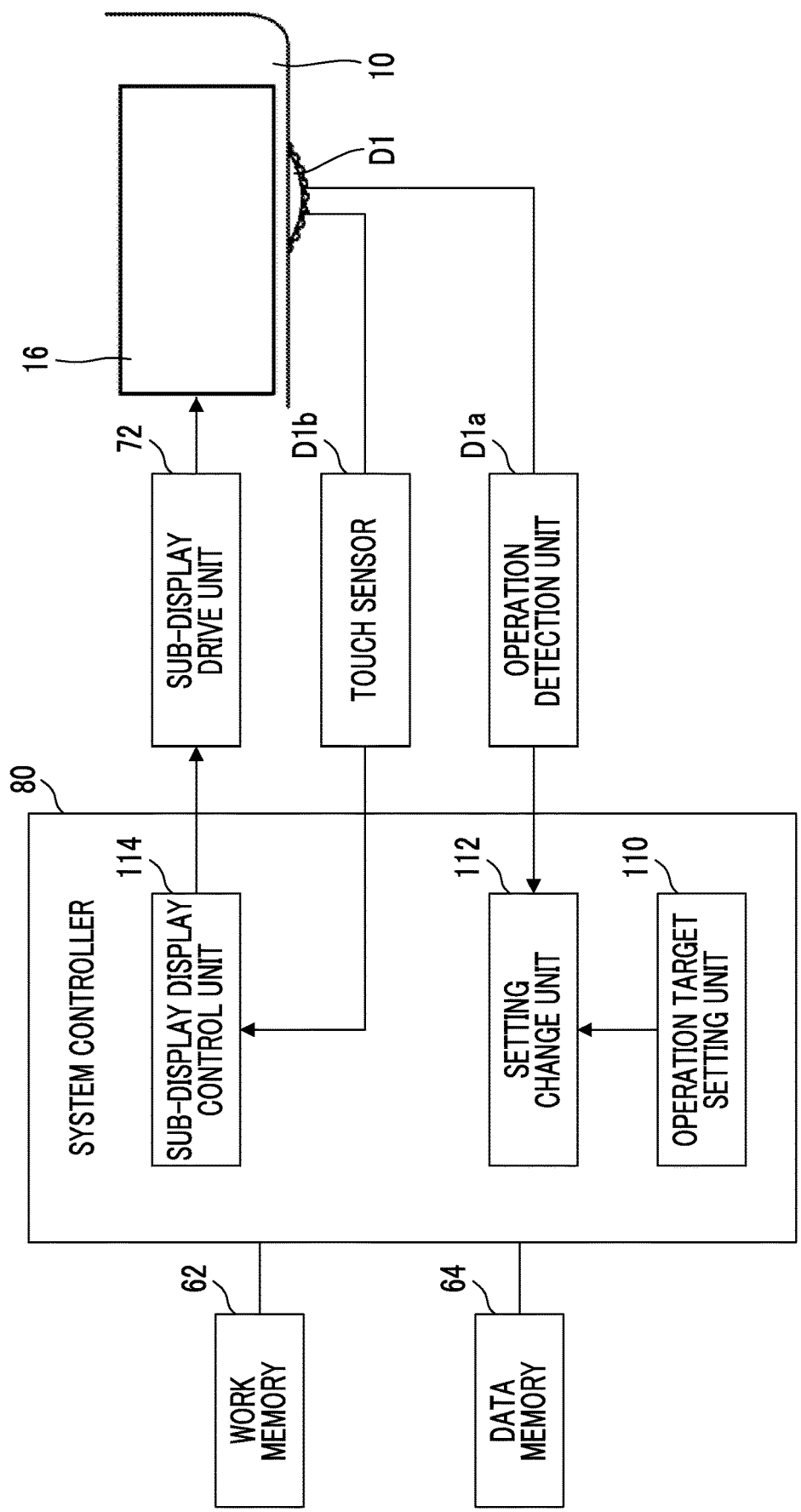
FIG. 8 is a block diagram showing a system configuration of an operation system by using a rear command dial.

The operation of the rear command dial D1 is detected by an operation detection unit D1a (refer to FIG. 8). The operation detection unit D1a detects an operation direction and an operation amount of the rear command dial D1 and outputs to a system controller 80. The operation detection unit D1a performs the detection, for example, with detection means such as a rotary encoder.

A target operated by the rear command dial D1 is automatically switched according to a state of the digital camera 1. For example, in a case where the imaging mode is set, a function of performing the program shift is assigned in a case where a program mode is selected. Further, in a case where the playback mode is set, a function of zooming an image during playback is assigned. Further, in a case where various settings are performed by using the main-display 14, a function of changing a setting value is assigned. This point will be described below in detail.

The rear command dial D1 is provided with a touch sensor D1b (refer to FIG. 8). The touch sensor D1b is an example of the detection unit. The touch sensor D1b detects the contact of the finger with the rear command dial D1 and outputs the information to the system controller 80.

[Entire Control System]

Figure 7:
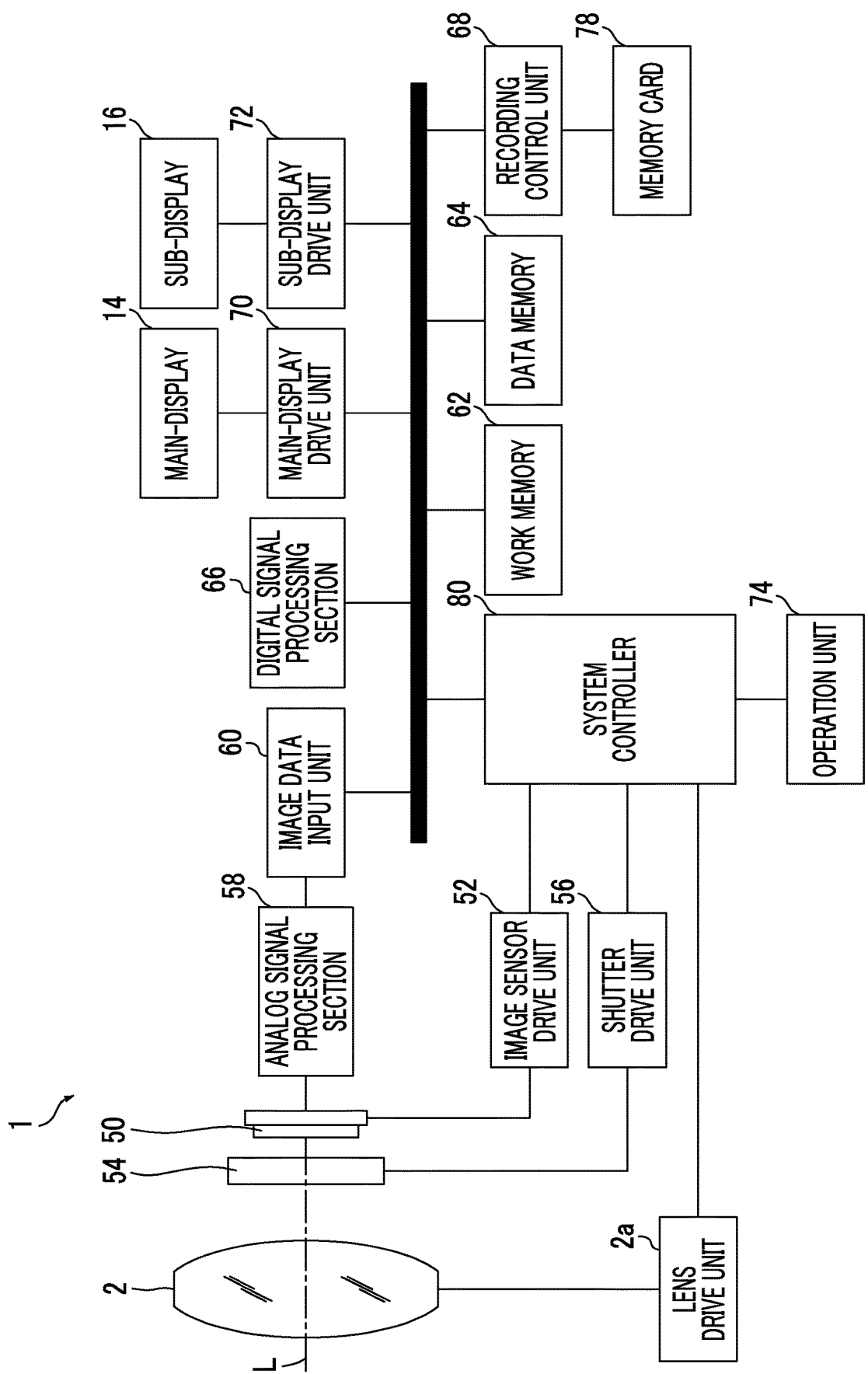
FIG. 7 is a block diagram showing a schematic configuration of the entire control system of the digital camera.

FIG. 7 is a block diagram showing the schematic configuration of the entire control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the display button 40, the mode dial 41, the rear command dial D1, and the like, and outputs a signal in response to the operation of each operation member to the system controller 80.

The system controller 80 is a control unit that controls the operation of each unit of the digital camera 1. The system controller 80 is formed of a microcomputer. That is, the microcomputer executes a predetermined control program to function as the system controller 80.

The system controller 80 also functions as a control unit for the lens 2. The system controller 80 controls the operation of the lens 2 through a lens drive unit 2a provided in the lens 2. The lens 2 comprises a stop, a focus lens, and the like. The lens drive unit 2a comprises a stop drive unit that drives the stop, a focus lens drive unit that drives the focus lens, and the like.

Pieces of processing from the imaging to the recording are roughly as follows.

First, the analog signal processing section 58 receives a signal output from the image sensor 50 by the full press of the shutter button 30. The signal is subjected to a predetermined analog signal processing to convert the signal to a digital signal and output in the analog signal processing section 58.

The work memory 62 receives the signal output from the analog signal processing section 58 through the image data input unit 60. Then, the signal is added to the digital signal processing section 66 from the work memory 62.

In the digital signal processing section 66, the added signal is subjected to a predetermined signal processing to generate image data for recording. The generated image data is temporarily stored in the work memory 62, then converted to a predetermined recording format, and stored in the memory card 78 through the recording control unit 68.

[Operation System by Using Rear Command Dial]

«Configuration»

FIG. 8 is a block diagram showing a system configuration of an operation system by using the rear command dial.

The operation system by using the rear command dial D1 is mainly formed of the operation detection unit D1a that detects the operation of the rear command dial D1, the touch sensor D1b that detects the contact with the rear command dial D1, an operation target setting unit 110 that sets an operation target of the rear command dial D1, a setting change unit 112 that changes a setting of an item set by the operation target setting unit 110 based on the operation of the rear command dial D1, and a sub-display display control unit 114 that controls the display on the sub-display 16.

<Operation Detection Unit>

The operation detection unit D1a detects the operation of the rear command dial D1. That is, the operation detection unit D1a detects the operation direction and the operation amount thereof. The operation amount is detected in units of one click. That is, the operation amount detects the rotation operation by one click as 1. Therefore, in a case where the rear command dial D1 is rotated by two clicks counterclockwise, the operation amount becomes +2. Further, in a case where the rear command dial D1 is rotated by two clicks clockwise, the operation amount becomes −2. The operation detection unit D1a is formed of, for example, the detection means such as the rotary encoder. In a case where the operation of the rear command dial D1 is detected, the operation detection unit D1a outputs the information, that is, the information on the operation direction and the operation amount of the rear command dial D1 to the system controller 80.

<Touch Sensor>

The touch sensor D1b is an example of the detection unit. The touch sensor D1b detects the contact with the rear command dial D1. In a case where the contact with the rear command dial D1 is detected, the touch sensor D1b outputs the information to the system controller 80.

<Operation Target Setting Unit>

The operation target setting unit 110 sets the operation target of the rear command dial D1. As described above, the target operated by the rear command dial D1 is automatically switched according to the state of the digital camera 1. The operation target setting unit 110 executes this switching processing.

In the case where the digital camera 1 is in the playback mode, the function of zooming the image during playback is assigned to the rear command dial D1. In this case, the image is enlarged in a case where the rear command dial D1 is rotated counterclockwise, and the image is reduced in a case where the rear command dial D1 is rotated clockwise.

Further, in the case where various settings are performed by using the main-display 14, the function of changing the setting value is assigned to the rear command dial D1. In this case, the setting value is advanced in the case where the rear command dial D1 is rotated in the counterclockwise direction, and the setting value is lowered in the case where the rear command dial D1 is rotated in the clockwise direction.

Furthermore, in the case where the digital camera 1 is in the imaging mode, the function according to the mode is assigned to the rear command dial D1.

Specifically, in the case of the program mode, the function of the program shift is assigned. That is, a function of changing the combination of the F-number and the shutter speed while the exposure is constantly maintained. In this case, the shutter speed is advanced (F-number is lowered) in the case where the rear command dial D1 is rotated counterclockwise, and the shutter speed is lowered (F-number is advanced) in the case where the rear command dial D1 is rotated in the clockwise direction.

Further, in the case of a shutter speed priority mode, a function of changing the setting of the shutter speed is assigned. In this case, the shutter speed is advanced in the case where the rear command dial D1 is rotated counterclockwise, and the shutter speed is lowered in the case where the rear command dial D1 is rotated in the clockwise direction.

Further, in the case of an aperture stop priority mode, a function of changing the setting of the F-number is assigned. In this case, the F-number is advanced in the case where the rear command dial D1 is rotated counterclockwise, and the F-number is lowered in the case where the rear command dial D1 is rotated in the clockwise direction.

Further, in the case of a manual mode, a function of changing the setting of the shutter speed or the F-number is assigned. Which item to be changed in the setting depends on the setting by the user.

The data memory 64 stores a table in which the function assigned according to the state of the digital camera 1 is defined. The operation target setting unit 110 sets the operation target of the rear command dial D1 with reference to this table.

The function of the operation target setting unit 110 is provided as one function of the system controller 80. That is, the microcomputer executes the predetermined control program to provide the function of the operation target setting unit 110 as one function of the system controller 80.

<Setting Change Unit>

The setting change unit 112 changes the setting of the operation target set by the operation target setting unit 110 based on the operation of the rear command dial D1. For example, in the case where the function of changing the setting of the shutter speed is assigned, the shutter speed is advanced according to a rotation amount (operation amount) of the rear command dial D1 in the case where the rear command dial D1 is rotated counterclockwise. Further, for example, in the case where the function of changing the setting of the F-number is assigned, the F-number is lowered according to the rotation amount (operation amount) of the rear command dial D1 in the case where the rear command dial D1 is rotated clockwise.

The function of the setting change unit 112 is provided as one function of the system controller 80. That is, the microcomputer executes the predetermined control program to provide the function of the setting change unit 112 as one function of the system controller 80.

<Sub-Display Display Control Unit>

The sub-display display control unit 114 is one example of the display control unit. The sub-display display control unit 114 controls the display on the sub-display 16 through the sub-display drive unit 72. The sub-display display control unit 114 switches the display on the sub-display 16 based on a detection result of the contact of the finger with the rear command dial D1 and the rotation operation of the rear command dial D1.

Specifically, in a case where the contact of the finger with the rear command dial D1 is not detected, the sub-display display control unit 114 displays only the setting contents of the camera on the sub-display 16.

In a case where the contact of the finger with the rear command dial D1 is detected, the sub-display display control unit 114 causes the image picture of the rear command dial D1 to appear on the sub-display 16. At this time, the sub-display display control unit 114 causes an image picture iD1 of the rear command dial D1 to appear at a predetermined position in a first size.

After the contact of the finger with the rear command dial D1 is detected, in a case where the contact is continuously detected as it is or the rear command dial D1 is rotationally operated, the sub-display display control unit 114 enlarges and displays the image picture iD1 of the rear command dial D1 made to appear on the sub-display 16.

(1) Display at Time of Non-Contact

Figure 9:
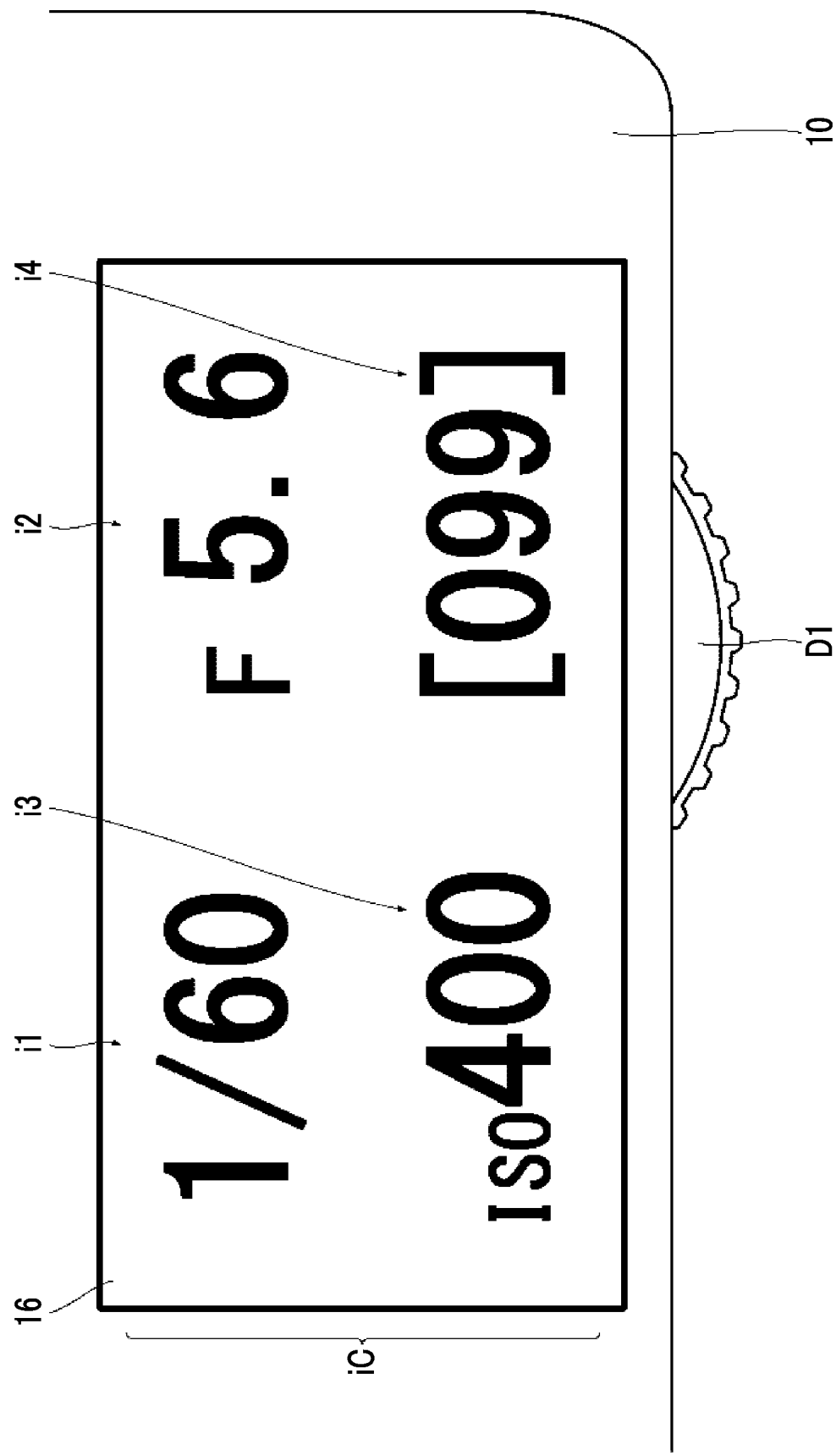
FIG. 9 is a plan view showing an example of a display on the sub-display in a case where contact with the rear command dial is not detected.

FIG. 9 is a plan view showing an example of the display on the sub-display in the case where the contact with the rear command dial is not detected.

As described above, in the case where the contact of the finger with the rear command dial D1 is not detected, the sub-display 16 displays only setting contents iC of the camera. A display form of the sub-display 16 in the case where the contact of the finger with the rear command dial D1 is not detected is referred to as "non-contact display form".

In the digital camera 1 of the embodiment, currently set shutter speed information i1, currently set F-number information i2, currently set international organization for standardization sensitivity (ISO) information i3, and the current number of capturable images information i4 are displayed as the information on the setting contents iC of the digital camera 1.

FIG. 9 shows an example in a case where the currently set shutter speed is 1/60 second, the F-number is F5.6, the ISO sensitivity is ISO400, and the number of capturable images is 99.

These pieces of information are displayed in a defined layout. That is, each piece of information is displayed in a predetermined size at a predetermined position. In this example, the screen is divided into four equal parts and each piece of information is displayed equally.

(2) Display at Time of Contact

Figure 10:
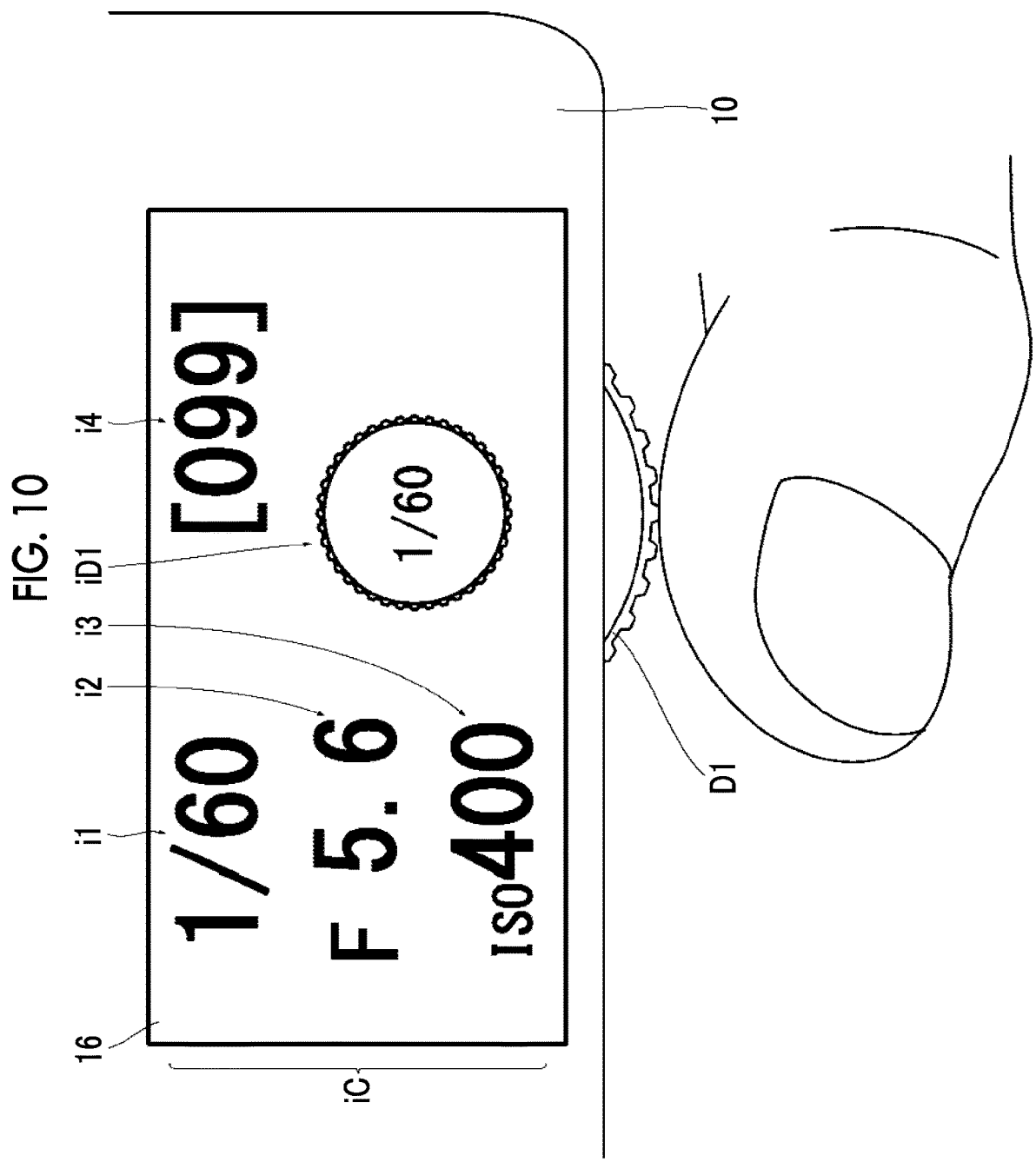
FIG. 10 is a plan view showing an example of the display on the sub-display in a case where the contact with the rear command dial is detected.

FIG. 10 is a plan view showing an example of the display on the sub-display in the case where the contact with the rear command dial is detected.

As described above, in the case where the contact of the finger with the rear command dial D1 is detected, the image picture iD1 of the rear command dial D1 appears on the sub-display 16. The display form of the sub-display 16 in the case where the contact of the finger with the rear command dial D1 is detected is referred to as "contact display form".

The image picture iD1 of the rear command dial D1 is formed of an image in which a common rotary operation dial is viewed in a plan view and of an image having a circular external shape. In the digital camera 1 of the embodiment, the unevenness is attached to the outer periphery part of the rear command dial D1 in order to be close to the appearance of the actual rear command dial D1. Further, in the digital camera 1 of the embodiment, a current setting value of an item to be changed in the setting by the rear command dial D1 is displayed inside (dial plate portion) thereof. FIG. 10 shows the case where the item to be changed in the setting by the rear command dial D1 is the shutter speed and the current setting value of the shutter speed is 1/60 second. In this case, the image picture iD1 displays 1/60 inside the image having the circular external shape as shown in FIG. 10.

The image picture iD1 of the rear command dial D1 is displayed at a predetermined position in the first size. In the digital camera 1 of the embodiment, the image picture iD1 thereof is displayed coaxially with the rotation axis D1o of the actual rear command dial D1 and displayed in a size smaller than an actual size of the rear command dial D1.

At this time the image picture iD1 of the rear command dial D1 appears, the sub-display display control unit 114 causes the image picture iD1 to appear while the diameter of the image picture iD1 is gradually increased with the rotation axis D1o of the actual rear command dial D1 as the base point. That is, a state where the image picture iD1 appears while the diameter thereof is gradually increased is displayed as a moving image. Accordingly, the attention of the user can be directed to the sub-display 16.

In a case where the image picture iD1 of the rear command dial D1 is displayed on the sub-display 16, a display layout of the setting contents iC of the camera is changed so as to avoid the display the display of the image picture iD1 thereof. That is, display positions and sizes of the setting contents iC of the camera are adjusted such that the information on each item is not displayed in an overlapped manner with the image picture iD1 of the rear command dial D1. Therefore, the setting contents iC of the camera are displayed in a margin region. At this time, the display positions and sizes of the setting contents iC of the camera are adjusted such that the information on each item is displayed as large as possible. Accordingly, it is possible to avoid displaying the setting contents iC of the camera and the image picture iD1 of the rear command dial D1 in an overlapped manner.

(3) Display at Time of Operation

Figure 11:
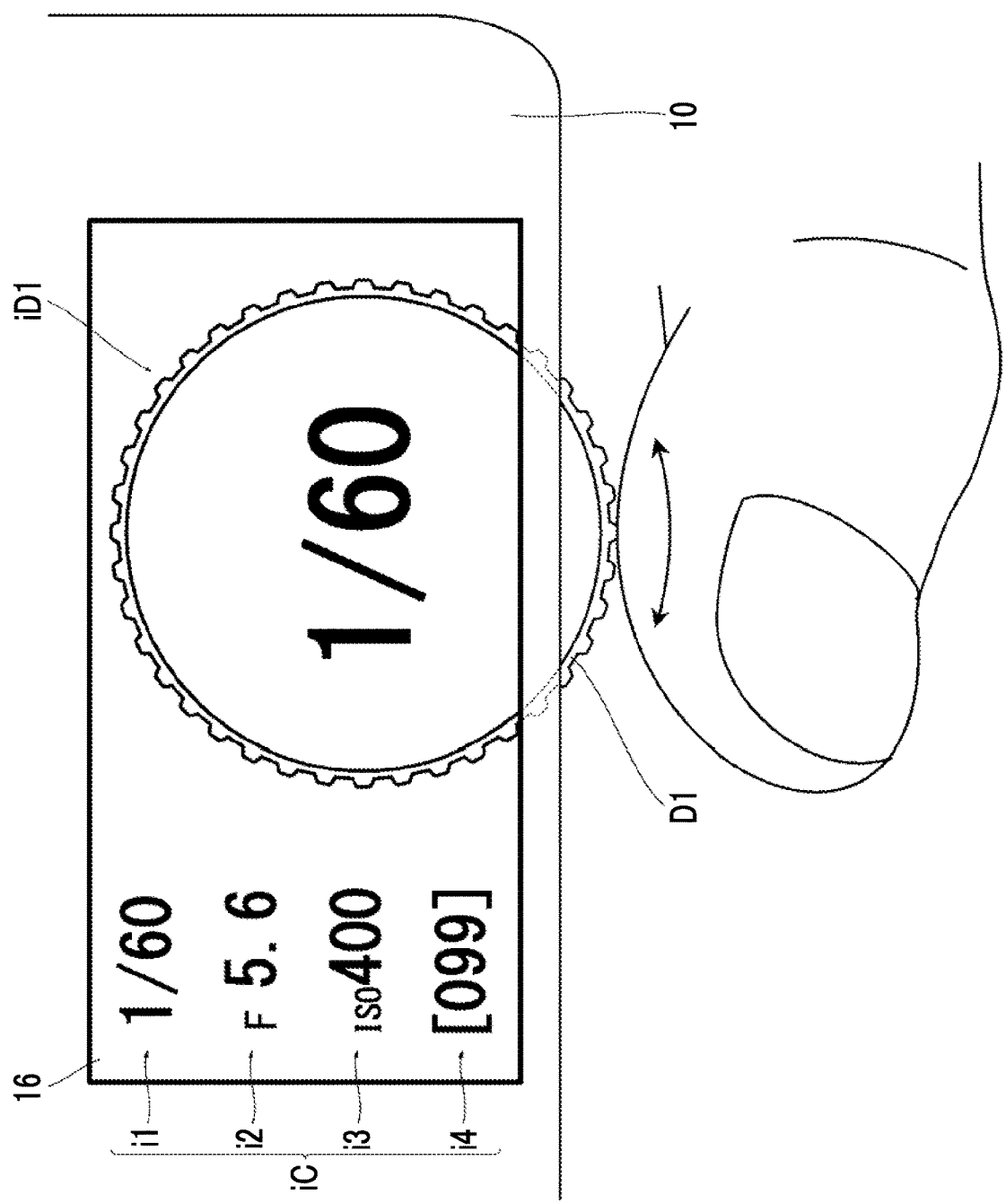
FIG. 11 is a plan view showing an example of the display on the sub-display in a case where the contact with the rear command dial is continuously detected for a certain period of time or more.

FIG. 11 is a plan view showing an example of the display on the sub-display in a case where the contact with the rear command dial is continuously detected for a certain period of time or more. The same display is made also in a case where the rear command dial D1 is rotationally operated. The display form of the sub-display 16 in the case where the contact with the rear command dial D1 is continuously detected for the certain period of time or more and in the case where the rear command dial D1 is rotationally operated is referred to as "operation display form".

After the contact of the finger with the rear command dial D1 is detected, in the case where the contact is continuously detected as it is or the rear command dial D1 is rotationally operated, the image picture iD1 of the rear command dial D1 displayed on the sub-display 16 is displayed in an enlarged manner.

The sub-display display control unit 114 enlarges the image picture iD1 of the rear command dial D1 made to appear on the sub-display 16 to a second size and displays the enlarged image picture. At this time, the sub-display display control unit 114 enlarges the image picture iD1 of the rear command dial D1 to the second size while the outer diameter of the image picture iD1 of the rear command dial D1 is gradually increased with the rotation axis D1o of the actual rear command dial D1 as the base point. That is, a state where the outer diameter of the image picture iD1 thereof is gradually increased is displayed as a moving image. Accordingly, the attention of the user can be directed to the sub-display 16. Accordingly, it is further possible to clarify the relationship between the image picture displayed on the sub-display 16 and the actual rear command dial D1.

The outer diameter of the image picture iD1 of the rear command dial D1 enlarged to the second size substantially matches the outer diameter of the actual rear command dial D1. Thus, the image displayed on the sub-display 16 has an arc-like external shape obtained by extending the part of the outer periphery of the rear command dial D1 exposed from the camera body 10 as shown in FIG. 11. This image is an image as if a hidden portion of the rear command dial D1 is displayed. Accordingly, it is possible to strengthen the connection between the rear command dial D1 and the image picture iD1 displayed on the sub-display 16 and thus to contribute to intuitive operability.

In a case where the contact with the rear command dial D1 is no longer detected during the enlargement, the enlargement of the image picture iD1 is stopped and the size of the image picture iD1 is returned to the first size. In this case, the size of the image picture iD1 is gradually reduced and returned to the first size. The display of the image picture itself may be deleted.

Further, in the case where the rear command dial D1 is rotationally operated, the image picture iD1 of the rear command dial D1 is also rotated. In this case, the uneven portion of the outer periphery is displayed in a rotated manner. Accordingly, it is possible to further clarify that the rear command dial D1 is operated.

In the case where the image picture iD1 of the rear command dial D1 is enlarged, the display layout of the setting contents iC of the camera is changed so as to avoid the display of the image picture iD1 thereof. That is, the display positions and sizes of the setting contents iC of the camera are adjusted such that the information on each item is not displayed in an overlapped manner with the image picture iD1 of the rear command dial D1. Therefore, the setting contents iC of the camera are displayed in the margin region. At this time, the display positions and sizes of the setting contents iC of the camera are adjusted such that the information on each item is displayed as large as possible. Accordingly, it is possible to avoid displaying the image picture iD1 of the rear command dial D1 and the setting contents iC of the camera in an overlapped manner.

The sub-display display control unit 114 switches the display on the sub-display 16 based on the detection result of the contact of the finger with the rear command dial D1 and the rotation operation of the rear command dial D1.

The sub-display display control unit 114 controls the display on the sub-display 16 based on an output from the touch sensor D1b and an output from the operation detection unit D1a provided in the rear command dial D1. Further, the sub-display display control unit 114 acquires information necessary for the display and controls the display on the sub-display 16 such that the acquired information is displayed in a defined layout.

The function of the sub-display display control unit 114 is provided as one function of the system controller 80. That is, the microcomputer executes the predetermined control program to provide the function of the sub-display display control unit 114 as one function of the system controller 80.

«Display Control Method of Sub-Display»

Figure 12:
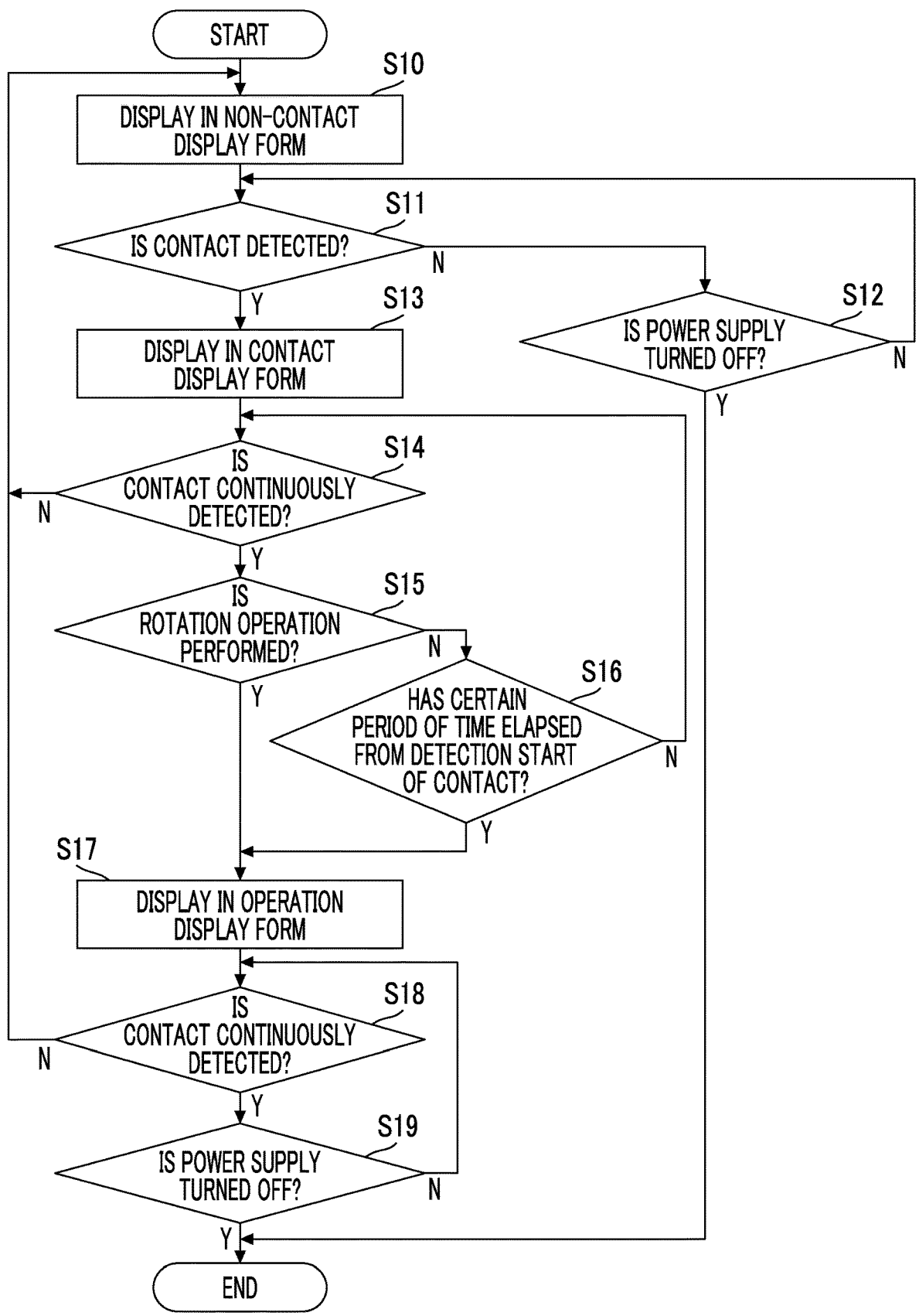
FIG. 12 is a flowchart showing a processing procedure of a display control of the sub-display.

FIG. 12 is a flowchart showing a processing procedure of a display control of the sub-display.

In the case where the power supply of the digital camera 1 is turned on, the sub-display display control unit 114 displays information in the non-contact display form on the sub-display 16 (step S10). That is, only the setting contents iC of the camera is displayed on the sub-display 16 as shown in FIG. 9.

Thereafter, the sub-display display control unit 114 determines whether the finger touches the rear command dial D1 based on the output of the touch sensor D1b. That is, the presence or absence of the detection of the contact with the rear command dial D1 is determined (step S11).

In a case where it is determined that the contact with the rear command dial D1 is not detected, the sub-display display control unit 114 determines whether the power supply of the digital camera 1 is turned off (step S12). In a case where it is determined that the power supply of the digital camera 1 is turned off, the processing ends. On the other hand, in a case where it is determined that the power supply of the digital camera 1 is not turned off, the processing returns to the processing of step S11 to determine the presence or absence of the detection of the contact with the rear command dial D1 (step S11). In this case, the display on the sub-display 16 continues to be displayed in the non-contact display form.

On the other hand, in a case where it is determined that the contact with the rear command dial D1 is detected in step S11, the sub-display display control unit 114 displays the information in the contact display form on the sub-display 16 (step S13). That is, the image picture iD1 of the rear command dial D1 appears on the sub-display 16 as shown in FIG. 10. In the case where the image picture iD1 of the rear command dial D1 appears, the image picture iD1 thereof is displayed in a predetermined size (first size) while the diameter of the image picture iD1 thereof is gradually increased from a state of a point.

Thereafter, the sub-display display control unit 114 determines whether the finger continuously touches the rear command dial D1 based on the output of the touch sensor D1b. That is, it is determined whether the contact with the rear command dial D1 is continuously detected (step S14).

In a case where it is determined that the contact is not continuously detected, the processing returns to the processing of step S10 to switch the display on the sub-display 16 to the display in the non-contact display form. In this case, the image picture iD1 of the rear command dial D1 is deleted while the image picture iD1 thereof is gradually reduced.

On the other hand, in a case where it is determined that the contact is continuously detected, the sub-display display control unit 114 next determines whether the rear command dial D1 is rotationally operated based on the output from the operation detection unit D1a (step S15).

In a case where it is determined that the rear command dial D1 is rotationally operated, the sub-display display control unit 114 displays the information in the operation display form on the sub-display 16 (step S17). That is, the image picture iD1 of the rear command dial D1 made to appear on the sub-display 16 is enlarged as shown in FIG. 11. At this time, the image picture iD1 thereof is enlarged to a predetermined size (second size) while the diameter of the image picture iD1 thereof is gradually increased.

On the other hand, in a case where it is determined that the rear command dial D1 is not rotationally operated, the sub-display display control unit 114 next determines whether the certain period of time elapses from a contact detection start (step S16). That is, it is determined whether the contact with the rear command dial D1 is continuously detected for the certain period of time or more. The "certain period of time" which is the reference of the determination is a time defined in advance, for example, two seconds. The sub-display display control unit 114 counts an elapsed time from the contact detection start.

In a case where it is determined that the certain period of time does not elapse from the contact detection start, the processing returns to the processing of step S14 to determine whether the contact with the rear command dial D1 is continuously detected. In this case, the display on the sub-display 16 continues to be displayed in the contact display form.

On the other hand, in a case where it is determined that the certain period of time elapses from the contact detection start, the sub-display display control unit 114 displays the information in the operation display form on the sub-display 16 (step S17). That is, the image picture iD1 of the rear command dial D1 made to appear on the sub-display 16 is enlarged as shown in FIG. 11. At this time, the image picture iD1 thereof is enlarged to a predetermined size (second size) while the diameter of the image picture iD1 thereof is gradually increased. In a case where the contact with the rear command dial D1 is no longer detected during the enlargement, the enlargement of the image picture iD1 is stopped. In this case, the image picture iD1 is gradually reduced and returned to the first size.

Thereafter, the sub-display display control unit 114 determines whether the contact with the rear command dial D1 is continuously detected based on the output of the touch sensor D1b (step S18).

In the case where it is determined that the contact is not continuously detected, the processing returns to the processing of step S10 to switch the display on the sub-display 16 to the display in the non-contact display form. In this case, the display form may be switched, but the display form may be switched after the certain period of time elapses. That is, the contact display form may be maintained for the certain period of time even though the contact is no longer detected and then the display on the sub-display 16 may be switched to the display in the non-contact display form. Further, in the case where the display form is switched to the non-contact display form, the image picture iD1 of the rear command dial D1 may be deleted while the image picture iD1 thereof is gradually reduced.

On the other hand, in the case where it is determined that the contact is continuously detected, the sub-display display control unit 114 determines whether the power supply of the digital camera 1 is turned off (step S19). In the case where it is determined that the power supply of the digital camera 1 is turned off, the processing ends. On the other hand, in the case where it is determined that the power supply of the digital camera 1 is not turned off, the processing returns to the processing of step S18 to determine whether the contact with the rear command dial D1 is continuously detected (step S18). In this case, the display on the sub-display 16 continues to be displayed in the operation display form.

In this manner, in the digital camera 1 of the embodiment, the display on the sub-display 16 can be switched based on the detection result of the contact of the finger with the rear command dial D1 and the rotation operation of the rear command dial D1. Since only the setting contents iC of the camera are displayed on the sub-display 16 in a case where the rear command dial D1 is not operated, it is possible to display the information on each item in a large size and then to ensure good visibility. Accordingly, it is possible to provide good operability. On the other hand, since the image picture iD1 of the rear command dial D1 is displayed on the sub-display 16 in a case where the rear command dial D1 is operated, it is possible to easily perform the setting by using the rear command dial D1. Further, since the image picture iD1 of the rear command dial D1 is displayed in a predetermined form on the sub-display 16 at a stage where the rear command dial D1 is touched in the case where the rear command dial D1 is operated, it is possible to easily direct the attention to the sub-display 16 and then to perform the operation without confusion even a user who uses the rear command dial D1 for the first time. Furthermore, since the image picture iD1 displayed on the sub-display 16 is formed of the image having the arc-like external shape obtained by extending the part of the outer periphery of the rear command dial D1 exposed from the camera body 10, it is possible to grasp at a glance the connection between the display on the sub-display 16 and the actual rear command dial D1. Accordingly, it is possible to provide good operability.

Modification Example

Modification Example of Setting Contents of Camera

The pieces of information of the shutter speed, the F-number, the ISO sensitivity, and the number of capturable images are displayed as the information on the setting contents of the camera, information in the above-described embodiment. However, the information to be displayed as the information on the setting contents of the camera is not limited thereto. In addition, for example, flash setting information, flash dimming correction amount information, macro mode setting information, consecutive imaging mode setting information, white balance setting information, AF mode setting information, image size setting information, image quality setting information, camera shake correction setting information, and the like may be displayed as the information on the setting contents of the camera.

It is preferable that the setting contents of the camera to be displayed on the sub-display 16 include at least information on the setting value of the item to be set by the rear command dial D1.

Further, in a case where the item to be set by the rear command dial D1 is automatically switched according to the imaging mode, it is preferable that the setting contents of the camera include the information on the setting value of the item that may be set by the rear command dial D1. For example, in a case where the program mode, the shutter speed priority mode, the aperture stop priority mode, and the manual mode are prepared as selectable imaging modes, a function of the program shift is assigned in the case of the program mode, a function of setting the shutter speed is assigned in the case of the shutter speed priority mode, a function of setting the F-number is assigned in the case of the aperture stop priority mode, and a function of setting the shutter speed is assigned in the case of the manual mode. In this case, the setting contents of the camera displayed on the sub-display 16 include at least the pieces of information on the shutter speed and the F-number.

Modification Example of Display of Setting Contents of Camera

In a case where the information on the setting value of the item to be set by the rear command dial D1 is included in the information to be displayed as the setting contents of the camera, the information on the setting value of the item to be set by the rear command dial D1 may be excluded from the information to be displayed as the setting contents of the camera in the case where the image picture iD1 of the rear command dial D1 is displayed.

For example, in the case where the pieces of information of the shutter speed, the F-number, the ISO sensitivity, and the number of capturable images are displayed as the setting contents of the camera, it is assumed that the item to be set by the rear command dial D1 is the shutter speed. In this case, the shutter speed information is excluded from the information to be displayed as the setting contents of the camera in the case where the image picture iD1 of the rear command dial D1 is displayed on the sub-display 16. That is, the pieces of information of the F-number, the ISO sensitivity, and the number of capturable images are displayed as the information on the setting contents of the camera.

Figure 13:
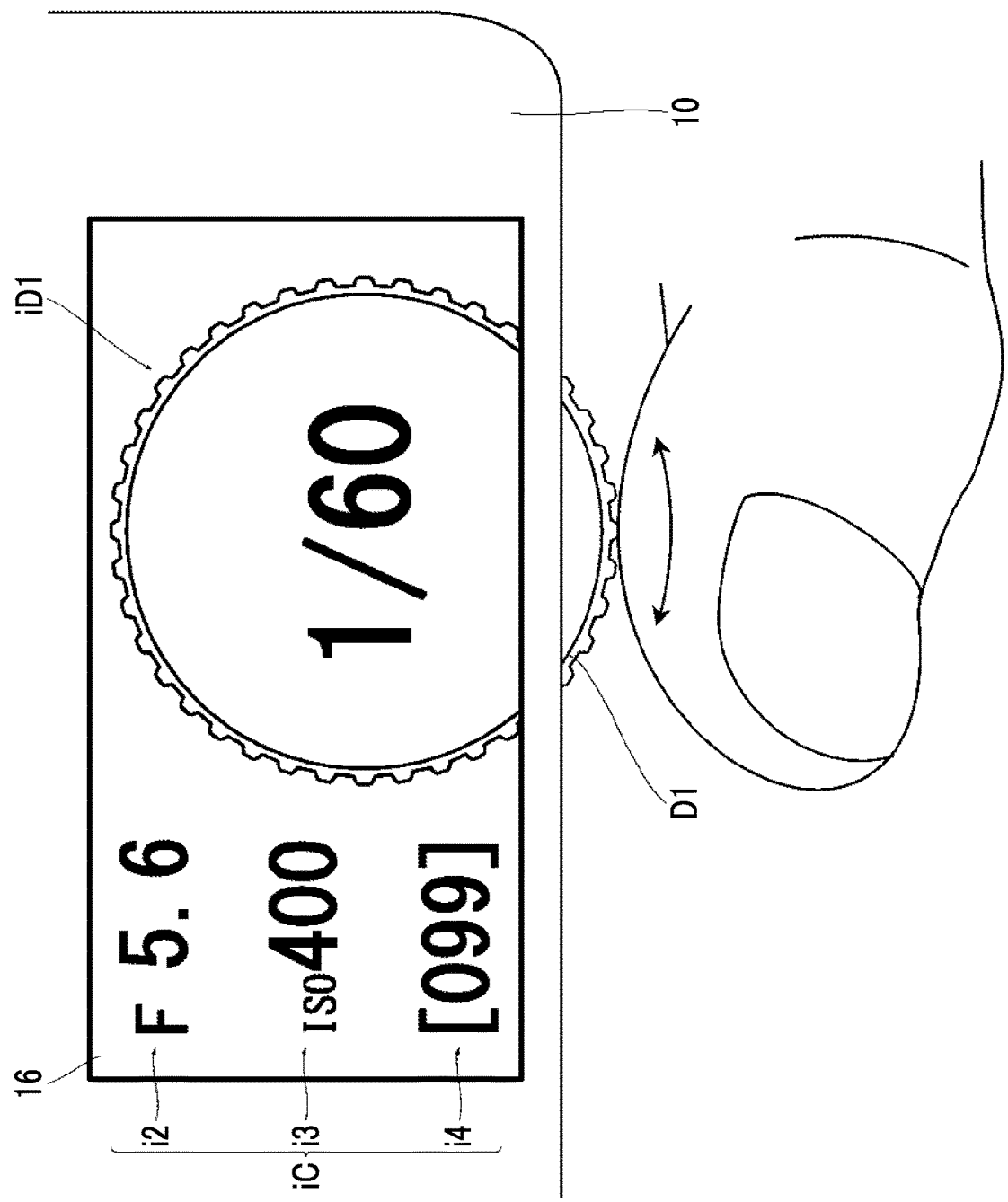
FIG. 13 is a plan view showing an example of the display on the sub-display in the case where the contact with the rear command dial is continuously detected for the certain period of time or more.

FIG. 13 is a plan view showing an example of the display on the sub-display in the case where the contact with the rear command dial is continuously detected for the certain period of time or more. FIG. 13 shows an example of the case where the item to be set by the rear command dial D1 is the shutter speed.

As shown in FIG. 13, in the case where the item to be set by the rear command dial D1 is the shutter speed, the information on the setting value of the shutter speed is excluded from the setting contents iC of the camera in the case where the image picture iD1 of the rear command dial D1 is displayed on the sub-display 16. That is, only the information i2 on the setting value of the F-number, the information i3 on the setting value of the ISO sensitivity, and the information i4 on the number of capturable images are displayed as the setting contents iC of the camera.

Accordingly, it is possible to eliminate a redundant display and thus to effectively utilize display space on the sub-display 16. That is, it is possible to display the information on the setting contents iC of the camera in a large size and thus to ensure good visibility.

In a case where the image picture iD1 of the rear command dial D1 is not displayed, the setting contents iC of the camera are displayed on the sub-display 16 including the information on the setting value of the shutter speed (refer to FIG. 9).

Modification Example of Non-Contact Display Form

In the case where the contact of the finger with the rear command dial D1 is not detected, only the setting contents iC of the camera are displayed on the sub-display 16 in the above-described embodiment. However, a mark which is the base point in the case where the image picture iD1 of the rear command dial D1 appears may also be displayed.

Figure 14:
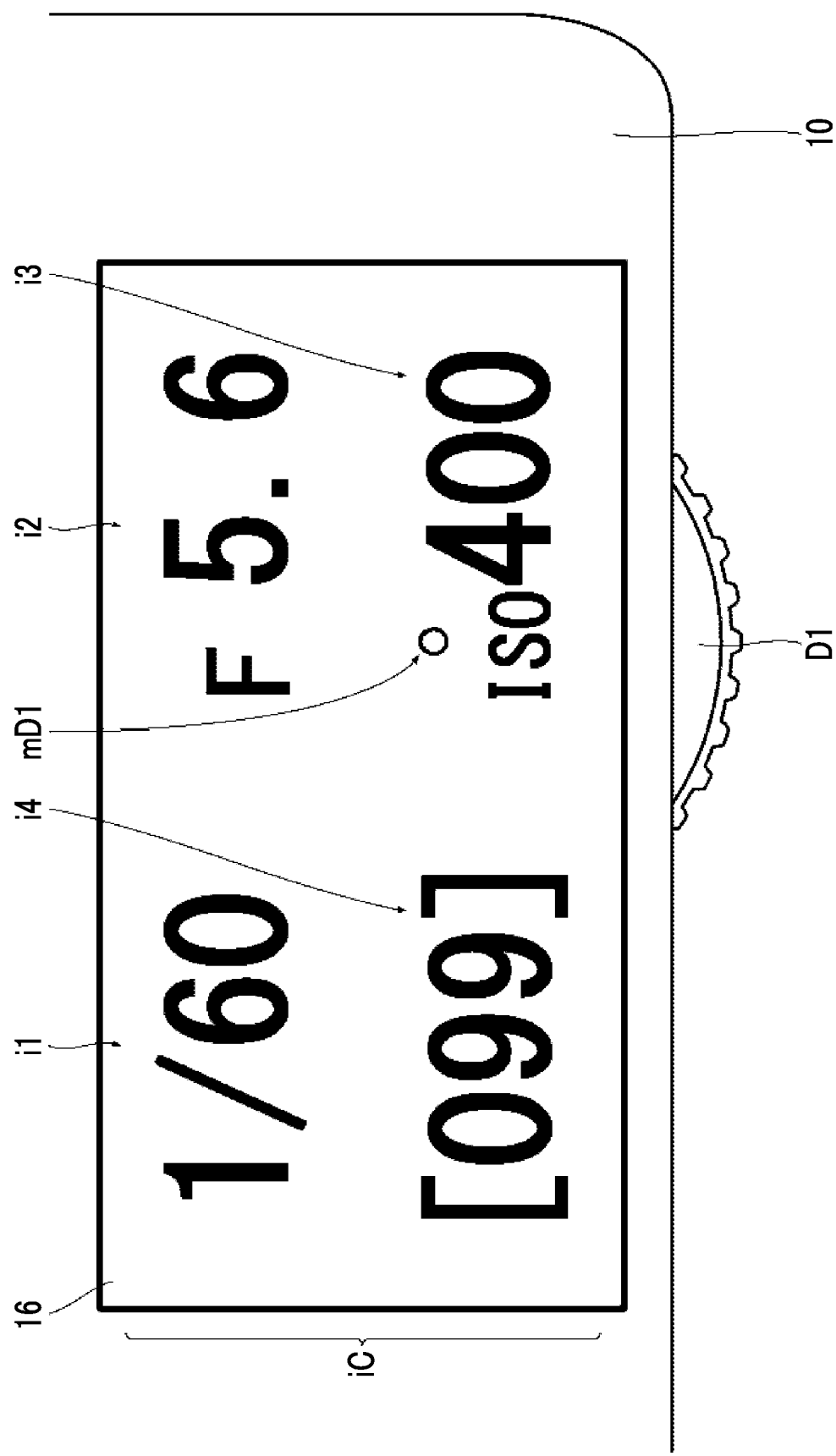
FIG. 14 is a plan view showing a modification example of the display on the sub-display in the case where the contact with the rear command dial is not detected.

FIG. 14 is a plan view showing a modification example of the display on the sub-display in the case where the contact with the rear command dial is not detected.

As shown in FIG. 14, a mark mD1 which is the base point in the case where the image picture iD1 of the rear command dial D1 appears is displayed in advance. In the example, the mark mD1 is formed of a figure obtained by reducing the image picture iD1 of the rear command dial D1. In this case, the mark mD1 is formed of a substantially circular figure.

In the case where the image picture iD1 of the rear command dial D1 appears, the appearance is made while image picture iD1 is gradually enlarged with the mark mD1 as the base point. Accordingly, it is possible to grasp in advance the possibility of the display of the image picture iD1 of the rear command dial D1 and the display position of the image picture iD1 thereof, and thus to provide good operability. Further, since the mark mD1 is displayed in a small size, the visibility of the display of the setting contents iC of the camera does not deteriorate.

Modification Example of Image Picture of Rear Command Dial

In the above-described embodiment, the image to be displayed as the image picture iD1 of the rear command dial D1 is formed of the image having the circular external shape, and the current setting value of the item to be changed in the setting by the rear command dial D1 is displayed inside the image having the circular external shape. However, the image form to be displayed as the image picture iD1 of the rear command dial D1 is not limited thereto.

Figure 15:
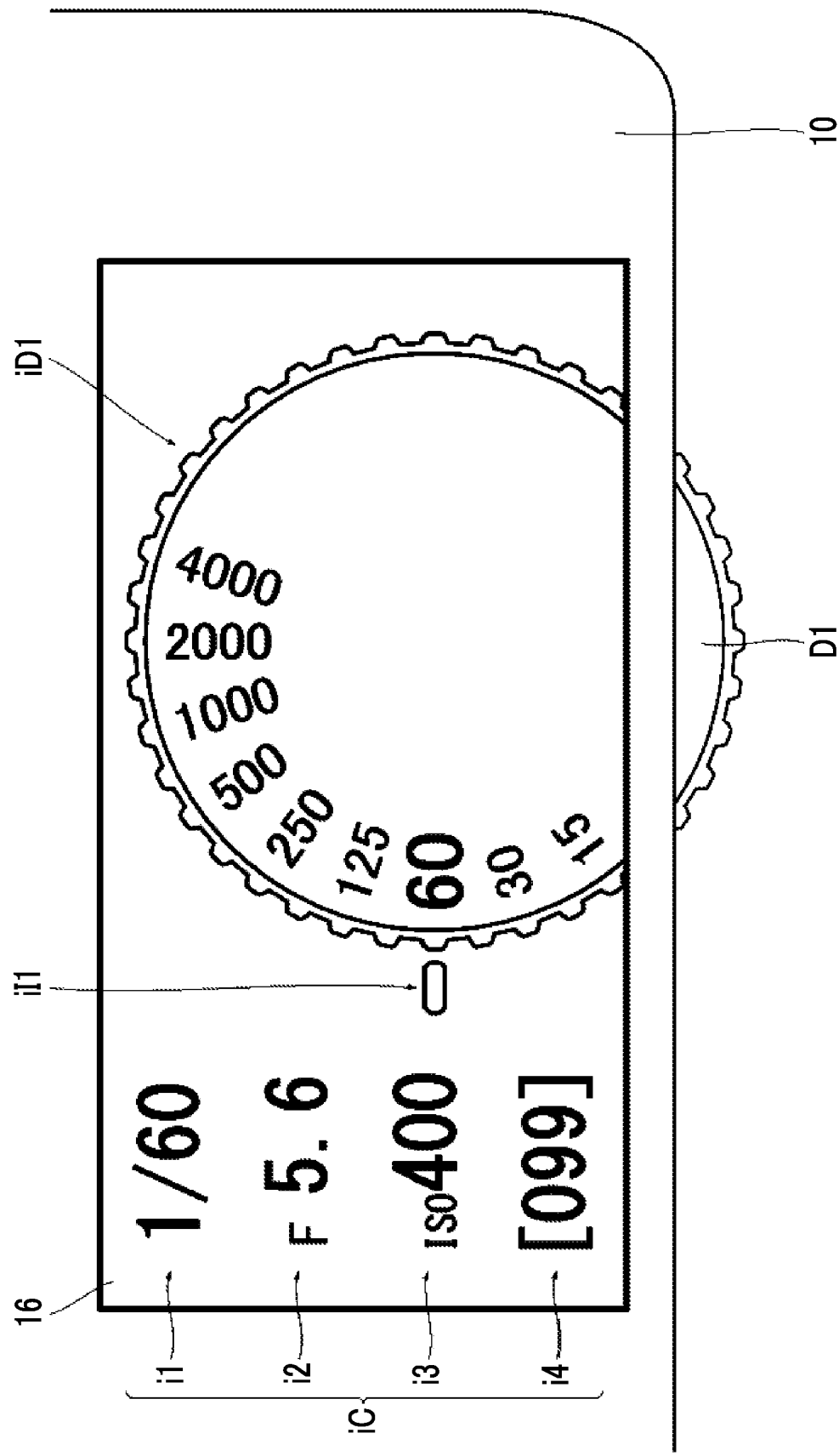
FIG. 15 is a plan view showing an example of the display on the sub-display in the case where the contact with the rear command dial is continuously detected for the certain period of time or more.

FIG. 15 is a plan view showing an example of the display on the sub-display in the case where the contact with the rear command dial is continuously detected for the certain period of time or more. FIG. 15 shows another example of the image picture iD1 of the rear command dial D1. In particular, FIG. 15 shows an example of the case where the item to be set by the rear command dial D1 is the shutter speed.

Figure 16:
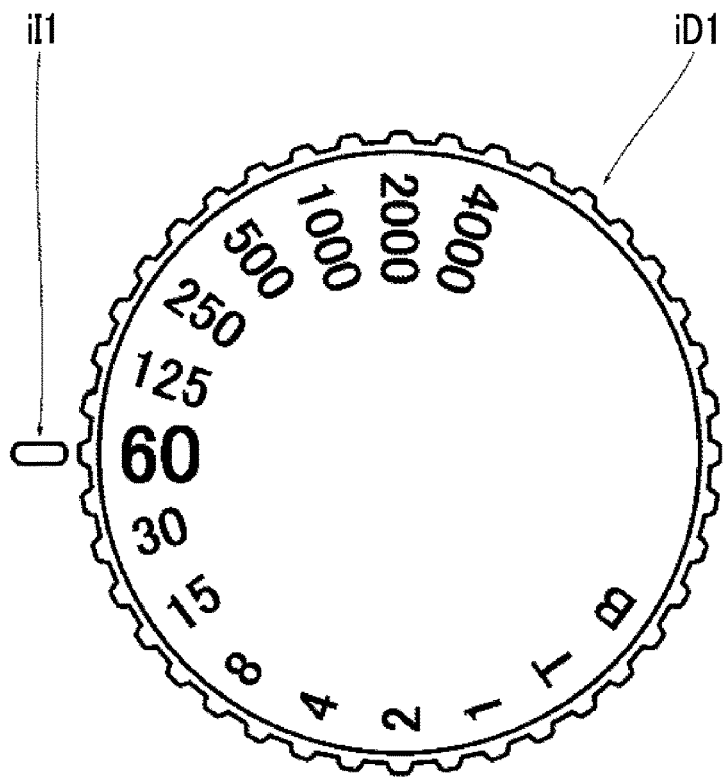
FIG. 16 is a diagram showing an example of an image picture in a case where an item set by the rear command dial is a shutter speed.

FIG. 16 is a diagram showing an example of an image picture in the case where the item set by the rear command dial is the shutter speed.

In the case where the item to be set by the rear command dial D1 is the shutter speed, the image picture iD1 thereof can be formed of an image obtained by imitating a common shutter speed dial. In the example shown in FIG. 16, the image picture iD1 is formed of an image in which the common shutter speed dial is viewed in a plan view. The common shutter speed dial refers to a dial in which selectable shutter speeds are displayed at regular pitches on the same circumference on the dial plate portion of the top surface.

In this manner, in the case where the image picture iD1 is formed of the image obtained by imitating the common shutter speed dial, an image picture iI1 of the indicator is also displayed. In the example shown in FIG. 16, the image picture iI1 of the indicator is displayed at a position of nine o'clock. In this case, the current setting is 1/60 second. In the example shown in FIG. 16, the current setting value is indicated by the indicator and displayed in a highlighted manner. That is, the current setting is displayed in a size larger than other numbers.

Figure 17:
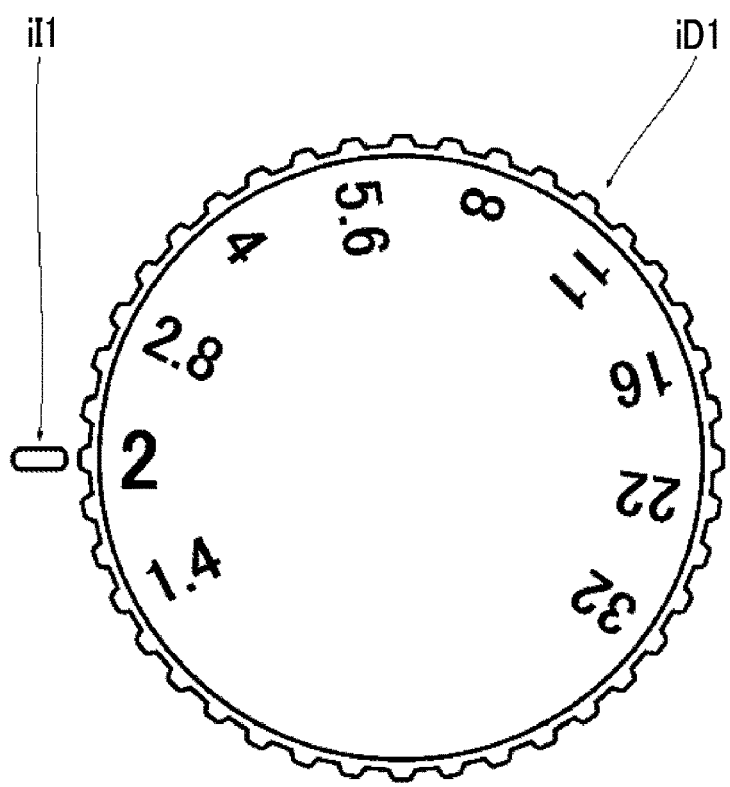
FIG. 17 is a diagram showing an example of an image picture in a case where the item set by the rear command dial is an F-number.

FIG. 17 is a diagram showing an example of an image picture in a case where the item set by the rear command dial is the F-number.

In a case where the item to be set by the rear command dial D1 is the F-number, the image picture iD1 thereof is formed of an image obtained by imitating a common F-number setting dial. In the example shown in FIG. 17, the image picture iD1 is formed of an image in which the common F-number setting dial is viewed in a plan view. The common F-number setting dial refers to a dial in which selectable F-numbers are displayed at regular pitches on the same circumference on the dial plate portion of the top surface.

Figure 18:
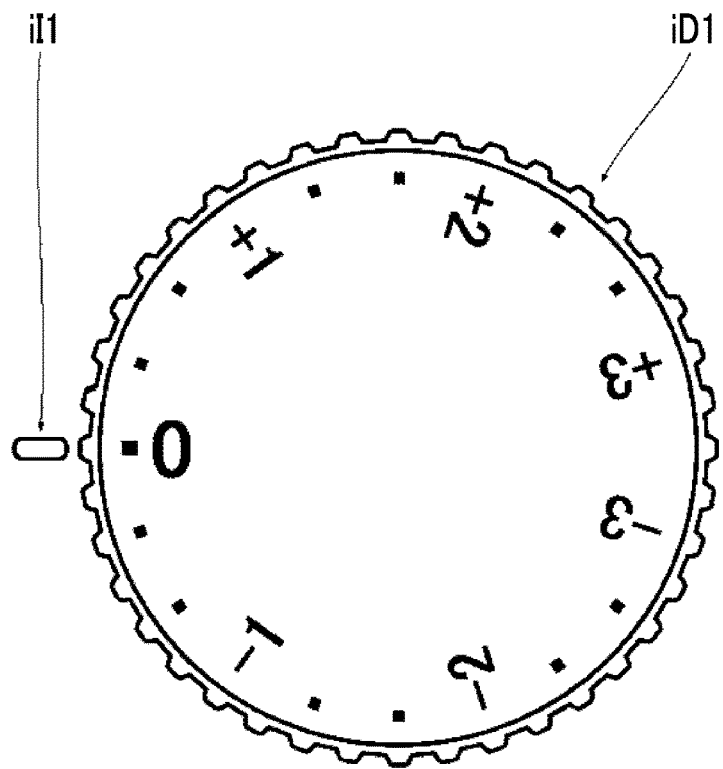
FIG. 18 is a diagram showing an example of an image picture in a case where the item set by the rear command dial is an exposure correction amount.

FIG. 18 is a diagram showing an example of an image picture in a case where the item set by the rear command dial is the exposure correction amount.

In a case where the item to be set by the rear command dial D1 is the exposure correction amount, the image picture iD1 thereof is formed of an image obtained by imitating a common exposure correction dial. In the example shown in FIG. 18, the image picture iD1 is formed of an image in which the common exposure correction dial is viewed in a plan view. The common exposure correction dial refers to a dial in which selectable exposure correction amounts are displayed at regular pitches on the same circumference on the dial plate portion of the top surface.

Figure 19:
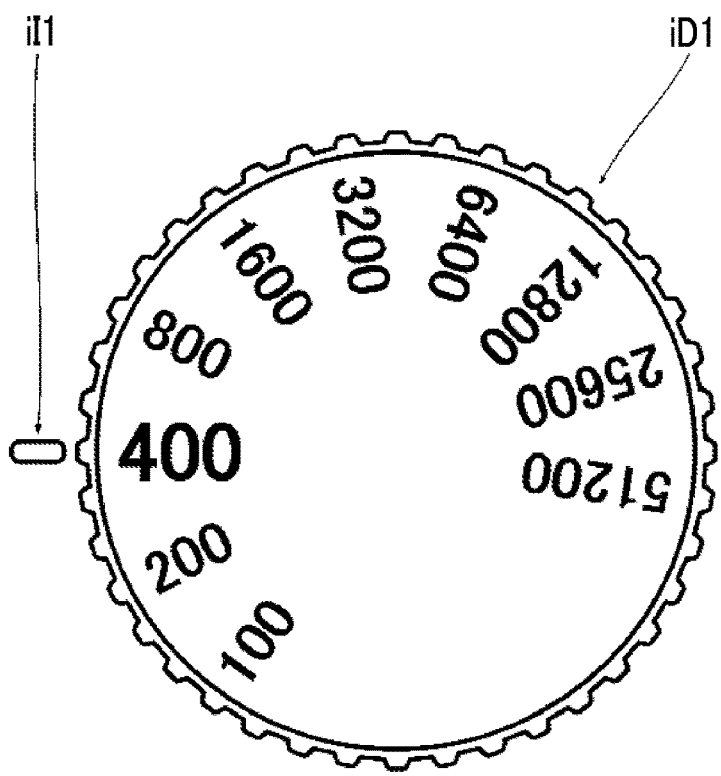
FIG. 19 is a diagram showing an example of an image picture in a case where the item set by the rear command dial is ISO sensitivity.

FIG. 19 is a diagram showing an example of an image picture in a case where the item set by the rear command dial is the ISO sensitivity.

In a case where the item to be set by the rear command dial D1 is the ISO sensitivity, the image picture iD1 thereof is formed of an image obtained by imitating a common ISO sensitivity dial. In the example shown in FIG. 19, the image picture iD1 is formed of an image in which the common ISO sensitivity dial is viewed in a plan view. The common ISO sensitivity dial refers to a dial in which selectable pieces of ISO sensitivity are displayed at regular pitches on the same circumference on the dial plate portion of the top surface.

Second Embodiment

In a digital camera of an embodiment, in the case where the finger touches the rear command dial D1, the image picture iD1 of the rear command dial D1 appears from an edge of the sub-display 16. In a case where the finger continuously touches the rear command dial D1 for the certain period of time or more, or the rear command dial D1 is rotationally operated, the image picture iD1 of the rear command dial D1 appearing from the edge further advances from the edge and is displayed in a large size.

The configuration of the digital camera itself is the same as the configuration of the digital camera in the first embodiment except that a display manner on the sub-display 16 is different. Therefore, only the display manner (display control method) on the sub-display 16 will be described herein.

[Display on Sub-Display]

The display on the sub-display 16 is controlled by the sub-display display control unit 114. The sub-display display control unit 114 switches the display on the sub-display 16 based on the detection result of the contact of the finger with the rear command dial D1 and the rotation operation of the rear command dial D1.

(1) Display at Time of Non-Contact

As described above, in the case where the contact with the rear command dial D1 is not detected, the display on the sub-display 16 is the same as that of the digital camera of the first embodiment. That is, only the setting contents iC of the camera are displayed on the sub-display 16 as shown in FIG. 9. The display form of the sub-display 16 in the case where the contact of the finger with the rear command dial D1 is not detected is referred to as "non-contact display form".

(2) Display at Time of Contact

Figure 20:
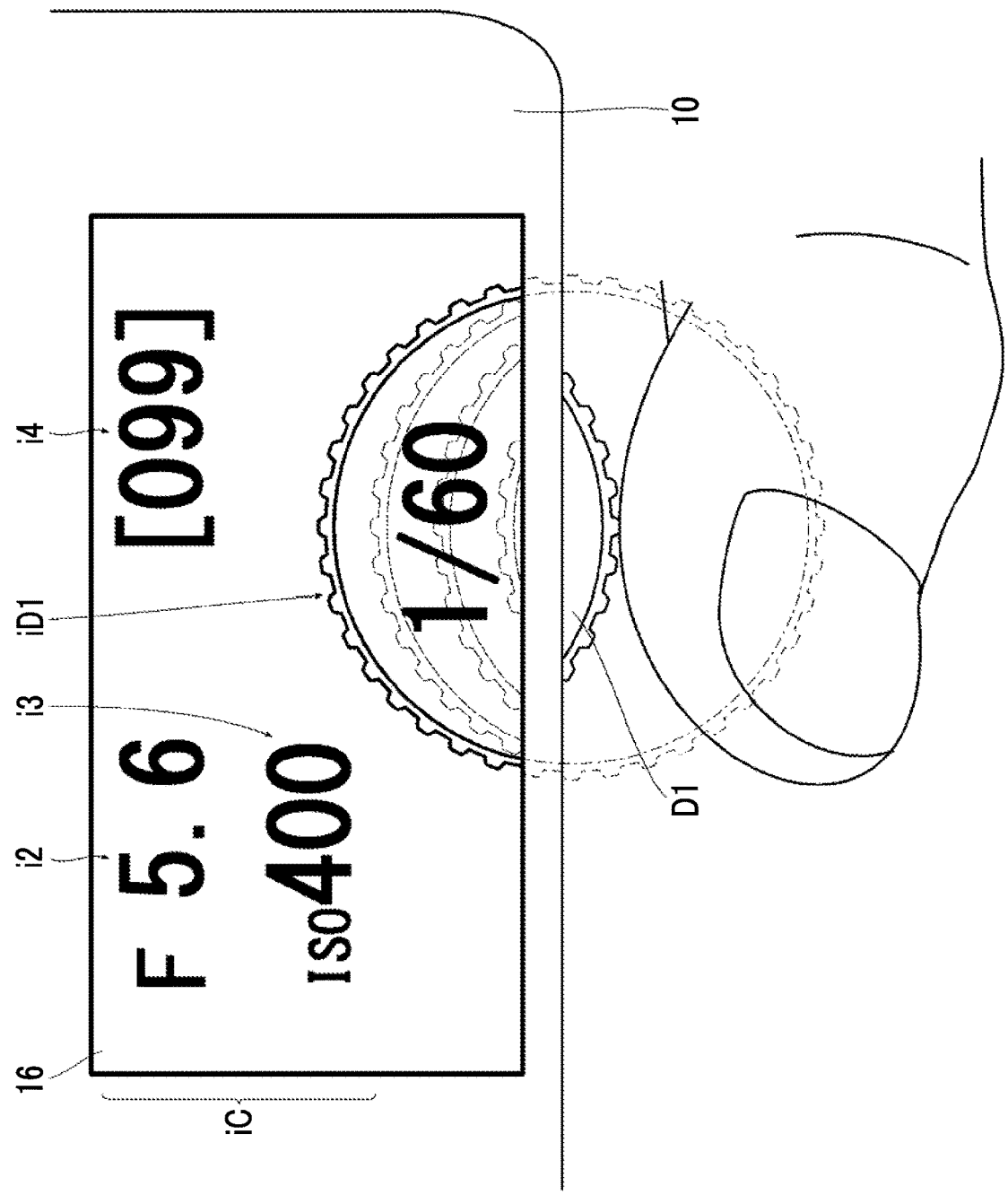
FIG. 20 is a plan view showing an example of the display on the sub-display in the case where the contact with the rear command dial is detected.

FIG. 20 is a plan view showing an example of the display on the sub-display in the case where the contact with the rear command dial is detected.

As shown in FIG. 20, in the case where the contact of the finger with the rear command dial D1 is detected, a part of the image picture iD1 of the rear command dial D1 appears from the edge of the sub-display 16. The display form of the sub-display 16 in the case where the contact of the finger with the rear command dial D1 is detected is referred to as "contact display form".

The image picture iD1 of the rear command dial D1 is formed of a circular image having the same size as the actual rear command dial D1, and the setting value of the item to be set by the rear command dial D1 is displayed inside the circular image. FIG. 20 shows an example of the case where the item to be set by the rear command dial D1 is the shutter speed and the current setting value is 1/60 second. A portion indicated by one-dotted broken line is a portion appearing outside the display region in FIG. 20. That is, only a part of the entire image picture iD1 of the rear command dial D1 is displayed on the sub-display 16.

The image picture iD1 of the rear command dial D1 appears from the edge of a side closest to an installation position of the rear command dial D1. Since the rear command dial D1 is provided on the back surface of the digital camera of the embodiment, a side of the back surface of the sub-display 16 is the side closest to the rear command dial D1. Therefore, in the digital camera of the embodiment, the rear command dial D1 appears from the edge of the side of the back surface of four sides configuring the edge of the sub-display 16.

In the case where the image picture iD1 of the rear command dial D1 appears from the edge, the appearance is made while the image picture iD1 thereof gradually advances from the edge. The state is displayed as a moving image. Arcs indicated by the broken lines in FIG. 20 show a state where the image picture iD1 of the rear command dial D1 appears.

A direction (advancing direction) in which the image picture iD1 of the rear command dial D1 appears is a direction orthogonal to the edge from which the image picture iD1 of the rear command dial D1 appears. In the digital camera of the embodiment, the image picture iD1 of the rear command dial D1 appears from the edge of the side of the back surface. Therefore, the image picture iD1 of the rear command dial D1 gradually appears while the image picture iD1 thereof moves (advances) in the front direction along the optical axis. At this time, in the digital camera of the embodiment, the image picture iD1 of the rear command dial D1 moves along a straight line orthogonal to the side of the back surface passing through a rotation center of the actual rear command dial D1 and appears from the edge.

As described above, a part of the image picture iD1 of the rear command dial D1 appears from the edge. Therefore, in a case where the image picture iD1 gradually appearing from the edge while moving in the front direction is displayed for a certain amount, the movement thereof stops. In the digital camera 1 of the embodiment, the movement of the image picture iD1 stops in a case where approximately ⅓ of the entire image picture iD1 is displayed as shown in FIG. 20. A display amount at this time is set as a first display amount. In other words, the display amount refers to a ratio of the image picture iD1 actually displayed on the display surface of the sub-display 16 among the entire image picture iD1.

In this manner, in the case where the rear command dial D1 is touched, the image picture iD1 of the rear command dial D1 gradually appears from the edge and displayed. Accordingly, the attention of the user can be directed to the sub-display 16.

In the case where the image picture iD1 of the rear command dial D1 is deleted, the deletion is made while the image picture iD1 thereof is gradually retracted from the edge.

In the case where the image picture iD1 of the rear command dial D1 is displayed on the sub-display 16, the display layout of the setting contents iC of the camera is changed so as to avoid the display of the image picture iD1 thereof. That is, the display positions and sizes of the setting contents iC of the camera are adjusted such that the information on each item is not displayed in an overlapped manner with the image picture iD1 of the rear command dial D1. Therefore, the setting contents iC of the camera are displayed in the margin region. At this time, the display positions and sizes of the setting contents iC of the camera are adjusted such that the information on each item is displayed as large as possible. Accordingly, it is possible to avoid displaying the image picture iD1 of the rear command dial D1 and the setting contents iC of the camera in an overlapped manner.

In the example, the information on the item to be set by the rear command dial D1 is deleted from the information on the setting contents iC of the camera in order to avoid the redundant display. That is, the information on the setting value of the shutter speed is deleted from the setting contents iC of the camera and displayed.

(3) Display at Time of Operation

Figure 21:
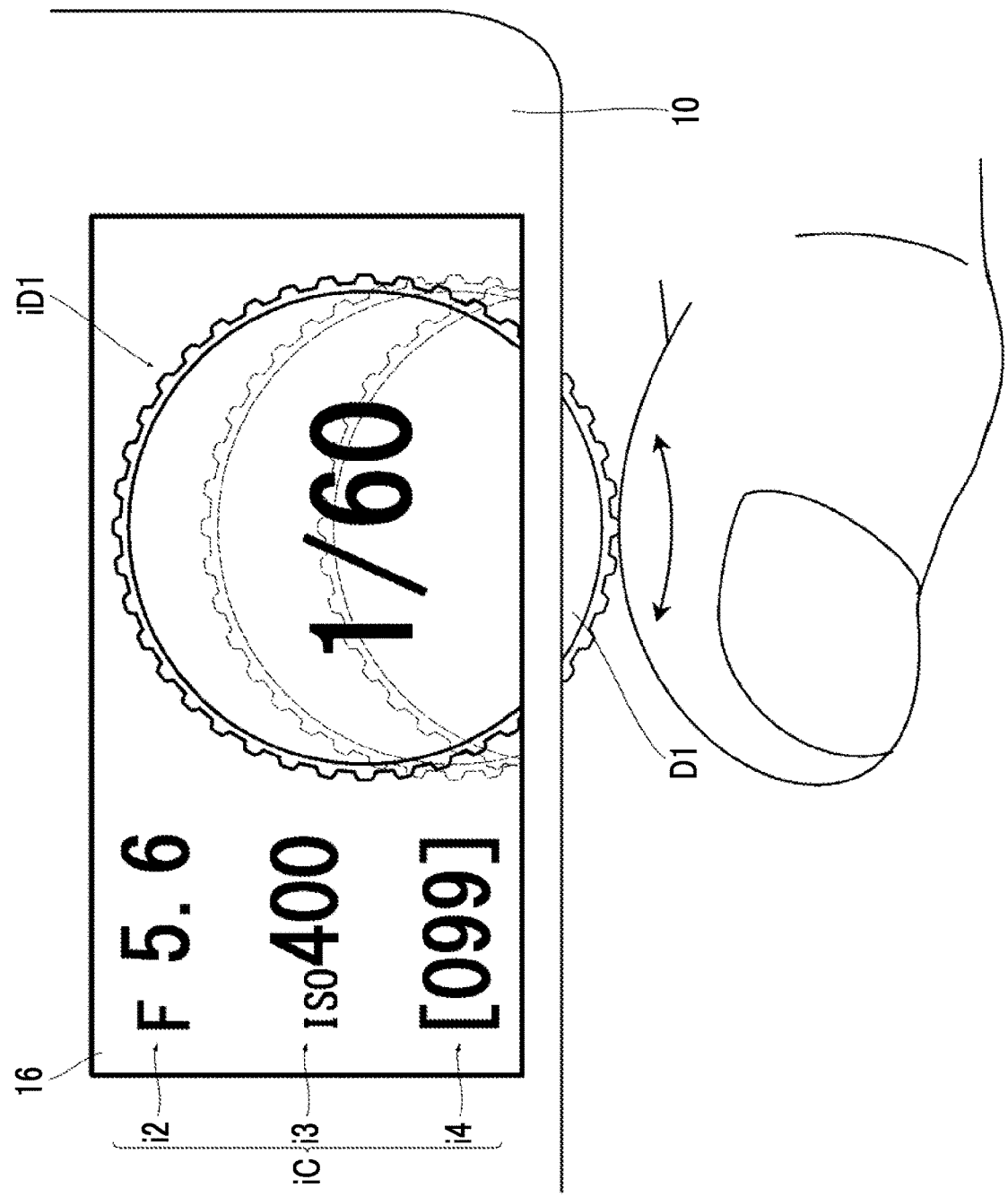
FIG. 21 is a plan view showing an example of the display on the sub-display in the case where the contact with the rear command dial is continuously detected for the certain period of time or more.

FIG. 21 is a plan view showing an example of the display on the sub-display in the case where the contact with the rear command dial is continuously detected for the certain period of time or more. The same display is made also in the case where the rear command dial D1 is rotationally operated. The display form of the sub-display 16 in the case where the contact with the rear command dial D1 is continuously detected for the certain period of time or more and in the case where the rear command dial D1 is rotationally operated is referred to as "operation display form".

After the contact of the finger with the rear command dial D1 is detected, in the case where the contact is continuously detected as it is or the rear command dial D1 is rotationally operated, the image picture iD1 of the rear command dial D1 appearing on the sub-display 16 further advances in the front direction and is displayed in a large size. Arcs indicated by the broken lines in FIG. 21 show a state where the image picture iD1 of the rear command dial D1 moves.

The sub-display display control unit 114 causes the image picture iD1 of the rear command dial D1 made to appear on the sub-display 16 to further advance in the front direction and to stop at a predetermined position. This position is a position where the image picture iD1 thereof is displayed coaxially with the actual rear command dial D1.

The image picture iD1 of the rear command dial D1 is displayed coaxially with the actual rear command dial D1 and thus is displayed on the sub-display 16 with a second display amount larger than the first display amount.

As described above, since the image picture iD1 of the rear command dial D1 is formed of the image having the same size as that of the actual rear command dial D1, the image becomes the image having the arc-like external shape obtained by extending the part of the outer periphery of the rear command dial D1 exposed from the camera body 10 by being displayed coaxially with the actual rear command dial D1.

In a case where the image picture iD1 of the rear command dial D1 is displayed at the edge or is displayed further advanced from the edge, the display layout of the setting contents iC of the camera is changed so as to avoid the display of the image picture iD1 thereof. That is, the display positions and sizes of the setting contents iC of the camera are adjusted such that the information on each item is not displayed in an overlapped manner with the image picture iD1 of the rear command dial D1. Therefore, the setting contents iC of the camera are displayed in the margin region. At this time, the display positions and sizes of the setting contents iC of the camera are adjusted such that the information on each item is displayed as large as possible. Accordingly, it is possible to avoid displaying the image picture iD1 of the rear command dial D1 and the setting contents iC of the camera in an overlapped manner.

In a case where the contact with the rear command dial D1 is no longer detected during the advancement, the advancement of the image picture iD1 is stopped and the display amount is returned to the first display amount. In this case, the display amount is gradually retracted and returned to the first display amount. The display of the image picture itself may be deleted instead of returning to the first display amount.

In this manner, in the digital camera of the embodiment, the image picture iD1 of the rear command dial D1 is displayed from the edge of the sub-display 16 in the case where the contact with the rear command dial D1 is detected. In this case, it is possible to ensure good visibility regarding the setting contents iC of the camera and thus to provide good operability similarly to the digital camera of the first embodiment.

In the case where the image picture iD1 of the rear command dial D1 is displayed, the image picture iD1 of the rear command dial D1 is rotated in the case where the rear command dial D1 is rotationally operated. Accordingly, it is possible to further clarify that the rear command dial D1 is operated.

Further, in the case where the image picture iD1 of the rear command dial D1 is deleted, the deletion is made while the image picture iD1 thereof is gradually retracted from the edge.

Modification Example

Each modification example described in the digital camera of the first embodiment may be applied to the digital camera of the embodiment.

Modification Example of Non-Contact Display Form

In the above-described embodiment, in the case where the contact of the finger with the rear command dial D1 is not detected, only the setting contents iC of the camera are displayed on the sub-display 16 in the above-described embodiment. However, the part of the outer periphery of the image picture iD1 of the rear command dial D1 may also be displayed at a position where the image picture iD1 of the rear command dial D1 appears.

Figure 22:
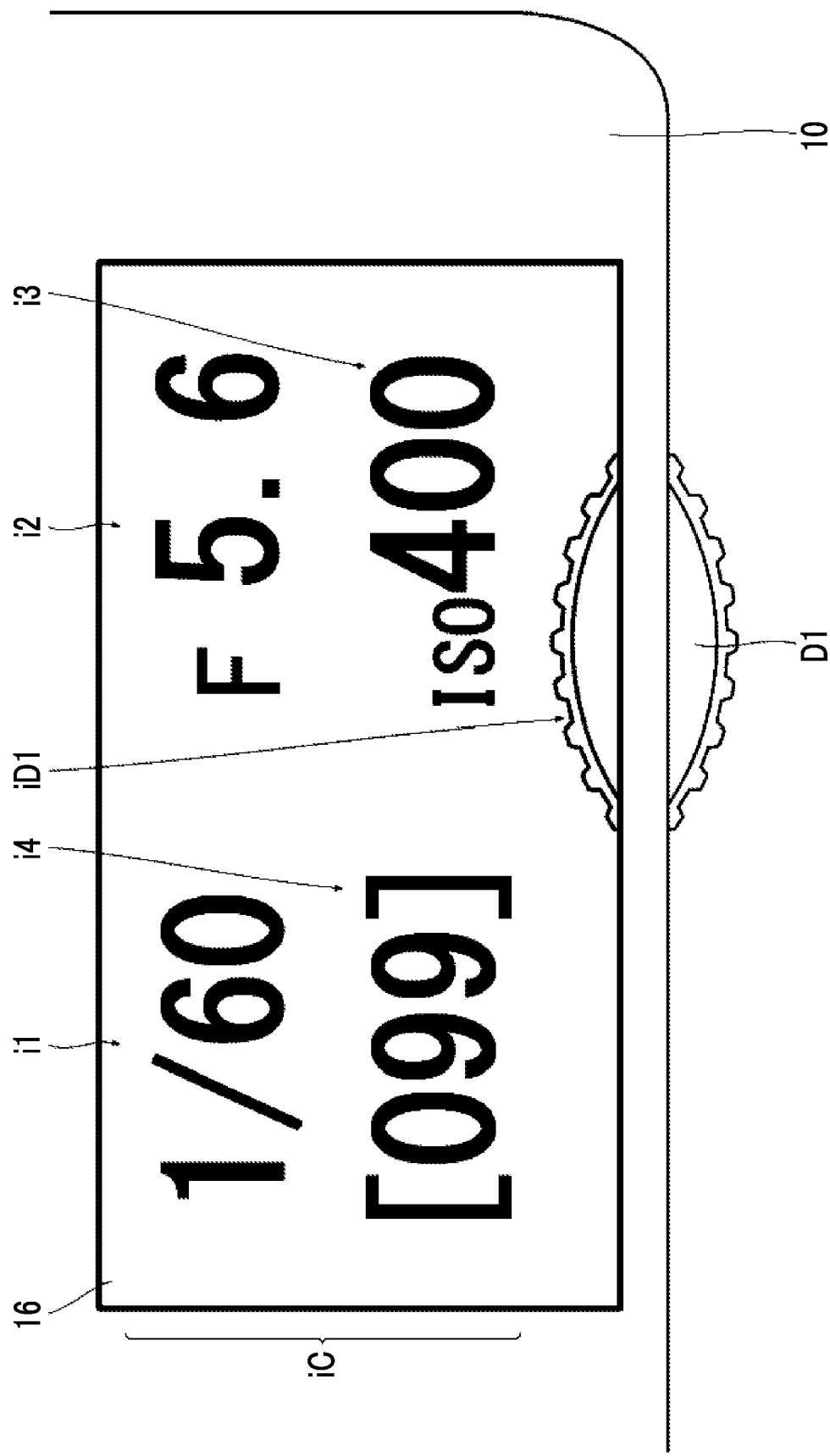
FIG. 22 is a plan view showing a modification example of the display on the sub-display in the case where the contact with the rear command dial is not detected.

FIG. 22 is a plan view showing a modification example of the display on the sub-display in the case where the contact with the rear command dial is not detected.

As shown in FIG. 22, the part of the outer periphery of the image picture iD1 of the rear command dial D1 is displayed at the position where the image picture iD1 of the rear command dial D1 appears. Accordingly, it is possible to grasp in advance the possibility of the display of the image picture iD1 of the rear command dial D1 and the appearing position of the image picture iD1 thereof, and thus to provide good operability. Further, since only the part of the outer periphery of the image picture is displayed, the visibility of the display of the setting contents iC of the camera does not deteriorate.

Third Embodiment

A digital camera of an embodiment comprises a lock unit that locks the rear command dial D1, and the display on the sub-display 16 can be switched according to a lock state of the lock unit.

[Configuration]

Figure 23:
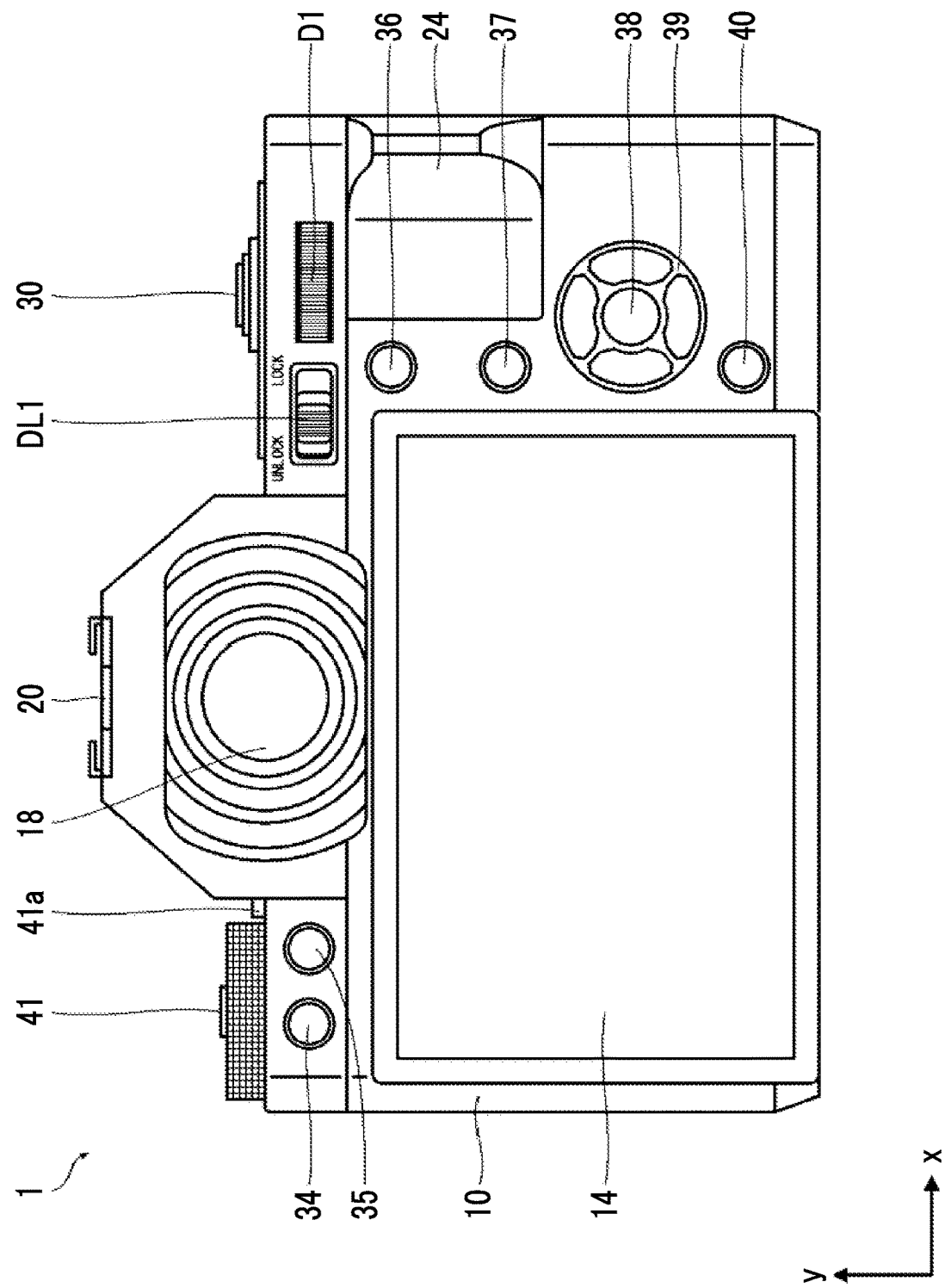
FIG. 23 is a back view of a third embodiment of a digital camera.
Figure 24:
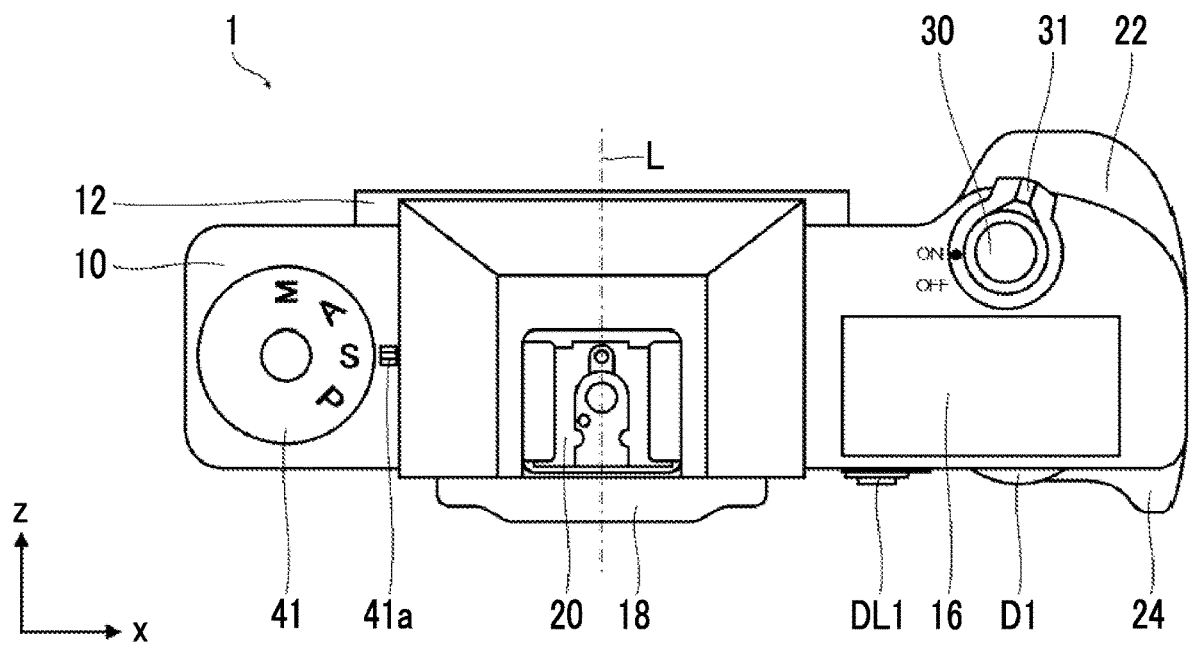
FIG. 24 is a plan view of the third embodiment of the digital camera.

FIGS. 23 and 24 are a back view and a plan view, respectively, of a third embodiment of a digital camera to which the invention is applied.

As shown in FIGS. 23 and 24, the digital camera 1 is provided with a rear command dial lock switch DL1 that locks the rear command dial D1.

The rear command dial lock switch DL1 is an example of the lock unit. The rear command dial lock switch DL1 is provided near the rear command dial D1. In the digital camera 1 of the embodiment, the rear command dial lock switch DL1 is provided on the back surface of the camera body 10 in parallel with the rear command dial D1.

The rear command dial lock switch DL1 is formed of a slide type switch. The rear command dial lock switch DL1 is provided slidably between a lock position and an unlock position. In a case where the rear command dial lock switch DL1 is set to the lock position, a lock of the rear command dial D1 is instructed to the system controller 80. On the other hand, in a case where the rear command dial lock switch DL1 is set to the unlock position, a lock release of the rear command dial D1 is instructed to the system controller 80.

In the case where the lock of the rear command dial D1 is instructed, the system controller 80 electronically locks the rear command dial D1. That is, the operation of the rear command dial D1 is invalidated even in the case where the rear command dial D1 is rotationally operated. In this case, the rear command dial D1 performs an idle rotation.

In the electronically locked rear command dial D1, the rear command dial lock switch DL1 is set to the unlock position to release the lock.

[Display on Sub-Display]

In a case where the rear command dial D1 is locked, the sub-display 16 displays only the setting contents iC of the camera.

In a case where the lock of the rear command dial D1 is released, the image picture iD1 of the rear command dial D1 appears on the sub-display 16. At this time, the image picture iD1 is displayed in the small first size.

In the case where the contact of the finger with the rear command dial D1 is detected in the state where the lock of the rear command dial D1 is released, the image picture iD1 of the rear command dial D1 displayed on the sub-display 16 is displayed in an enlarged manner.

Hereinafter, the cases will be specifically described separately.

(1) Display at Time of Lock

Figure 25:
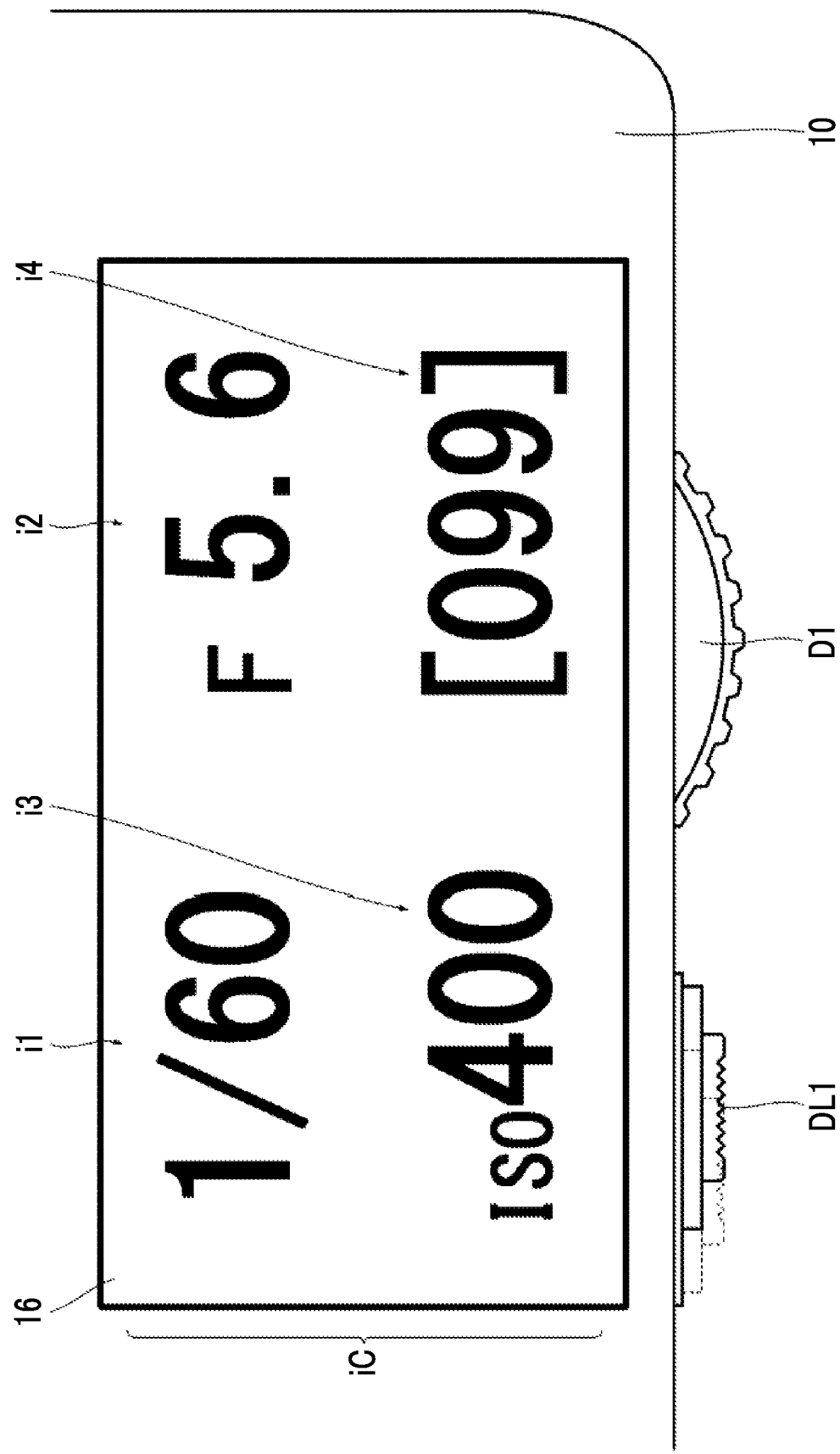
FIG. 25 is a plan view showing an example of the display on the sub-display in a case where the rear command dial is locked.

FIG. 25 is a plan view showing an example of the display on the sub-display in the case where the rear command dial is locked.

In the case where the rear command dial D1 is locked, the sub-display 16 displays only the setting contents iC of the camera. A display form of the sub-display 16 in the case where the rear command dial D1 is locked is referred to as "lock display form".

In the digital camera 1 of the embodiment, the currently set shutter speed information i1, the currently set F-number information i2, the currently set ISO sensitivity information i3, and the current number of capturable images information i4 are displayed as the information on the setting contents iC of the digital camera 1.

FIG. 25 shows an example in a case where the currently set shutter speed is 1/60 second, the F-number is F5.6, the ISO sensitivity is ISO400, and the number of capturable images is 99.

These pieces of information are displayed in a defined layout. That is, each piece of information is displayed in a predetermined size at a predetermined position. In this example, the screen is divided into four equal parts and each piece of information is displayed equally.

(2) Display at Time of Lock Release

Figure 26:
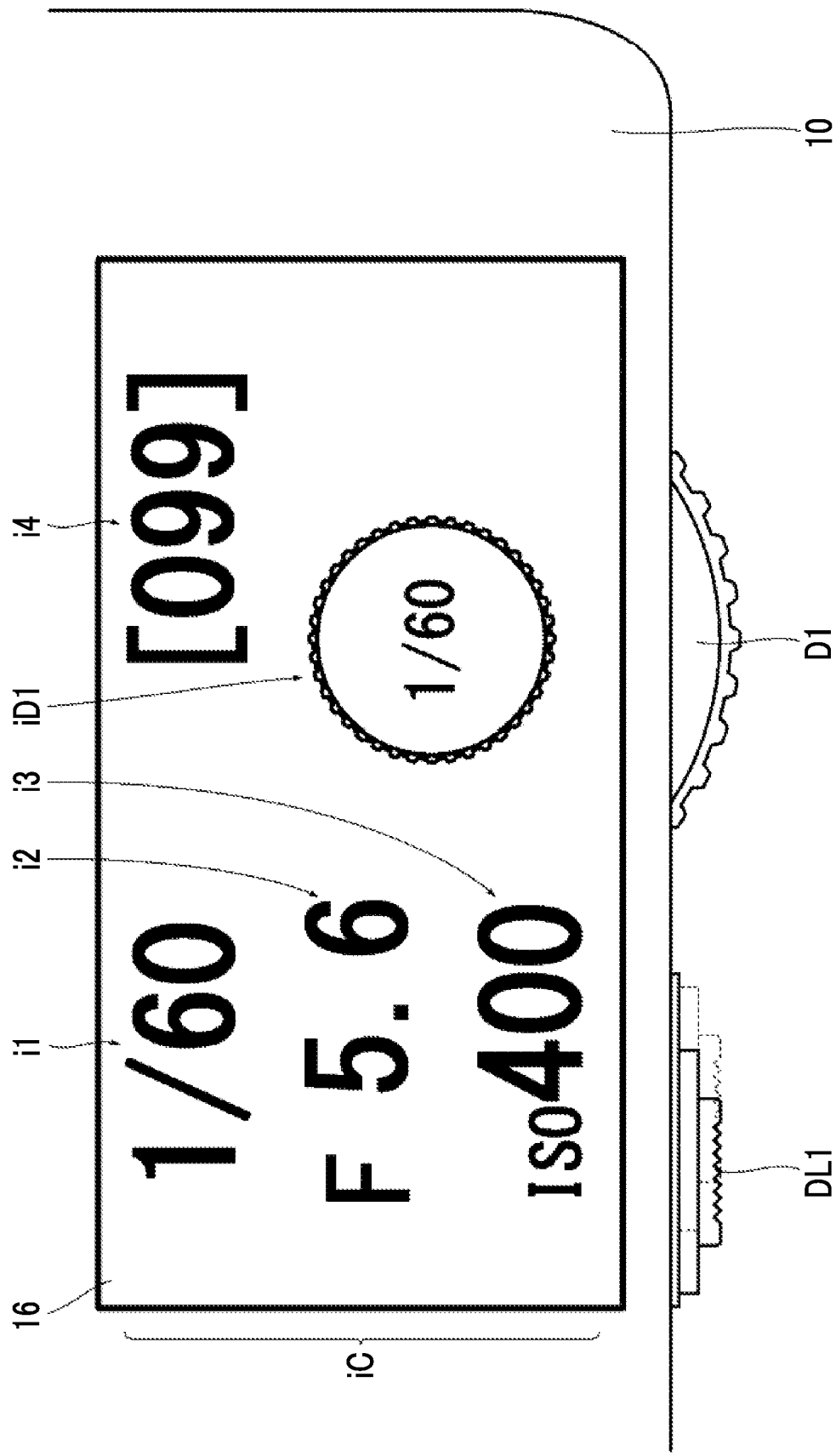
FIG. 26 is a plan view showing an example of the display on the sub-display in a case where the lock of the rear command dial is released.

FIG. 26 is a plan view showing an example of the display on the sub-display in the case where the lock of the rear command dial is released.

In the case where the lock of the rear command dial D1 is released, the image picture iD1 of the rear command dial D1 appears on the sub-display 16. A display form of the sub-display 16 in the case where the lock of the rear command dial D1 is released is referred to as "lock release display form".

The lock release display form is the same as the display form of the sub-display 16 in the case where the contact with the rear command dial D1 is detected in the digital camera of the first embodiment. That is, the image picture iD1 of the rear command dial D1 is displayed coaxially with the rotation axis D1o of the actual rear command dial D1 in the first size.

(3) Display at Time of Contact

Figure 27:
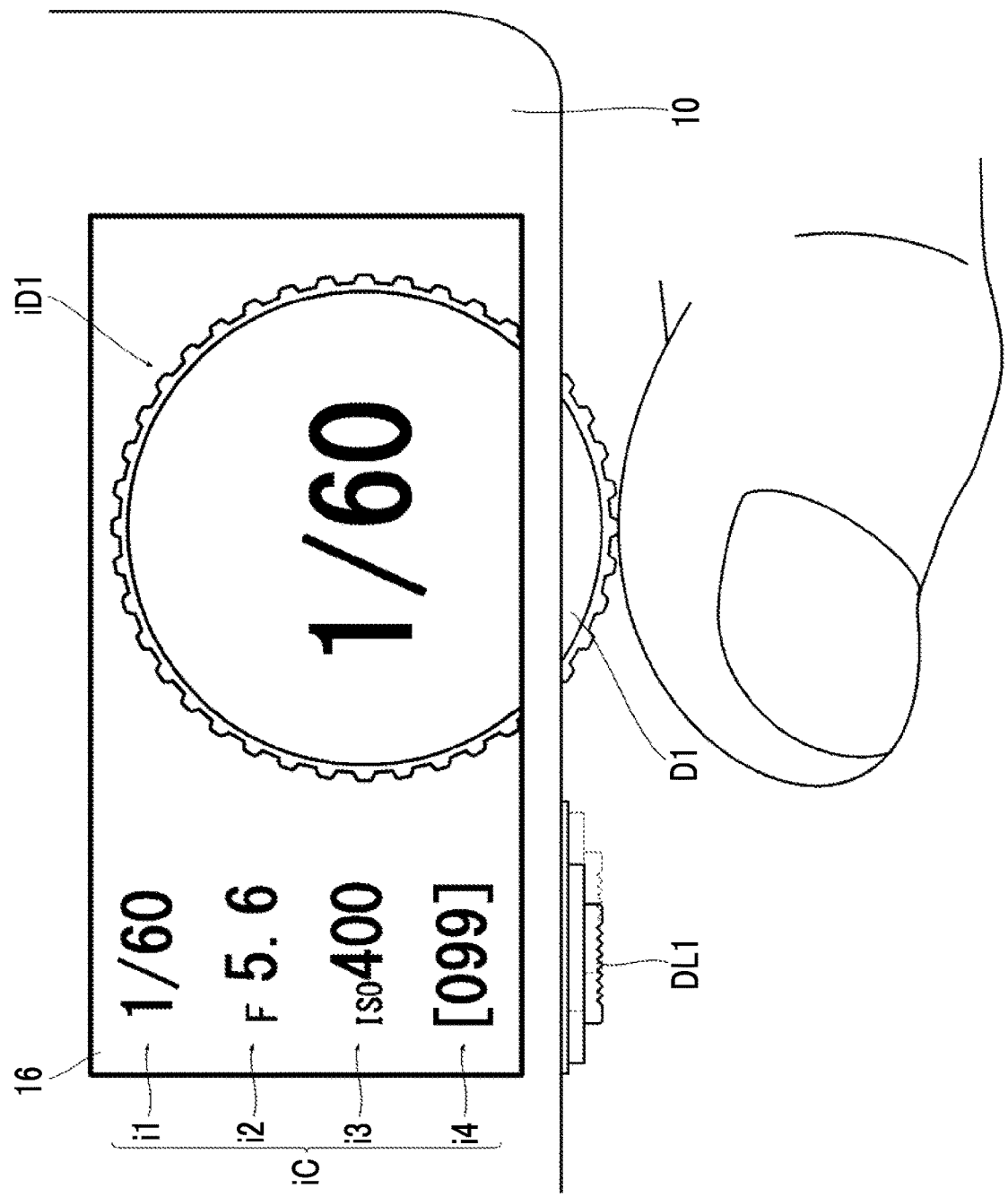
FIG. 27 is a plan view showing an example of the display on the sub-display in the case where the contact with the rear command dial is detected in the state where the lock of the rear command dial is released.

FIG. 27 is a plan view showing an example of the display on the sub-display in the case where the contact with the rear command dial is detected in the state where the lock of the rear command dial is released.

As shown in Fig. FIG. 27, in the case where the contact of the finger with the rear command dial D1 is detected in the state where the lock of the rear command dial D1 is released, the image picture iD1 of the rear command dial D1 displayed on the sub-display 16 is displayed in an enlarged manner. A display form of the sub-display 16 in the case where the contact of the finger with the rear command dial D1 is detected in the state where the lock of the rear command dial D1 is released is referred to as "lock release and contact display form".

The lock release and contact display form is the same as the display form of the sub-display 16 in the case where the rear command dial D1 is rotationally operated in the digital camera of the first embodiment. That is, the lock release and contact display form is formed of the image having the arc-like external shape obtained by extending the part of the outer periphery of the rear command dial D1 exposed from the camera body 10.

In the case where the rear command dial D1 is rotationally operated, the image picture iD1 of the rear command dial D1 is rotated. Accordingly, it is possible to further clarify that the rear command dial D1 is operated.

«Display Control Method of Sub-Display»

Figure 28:
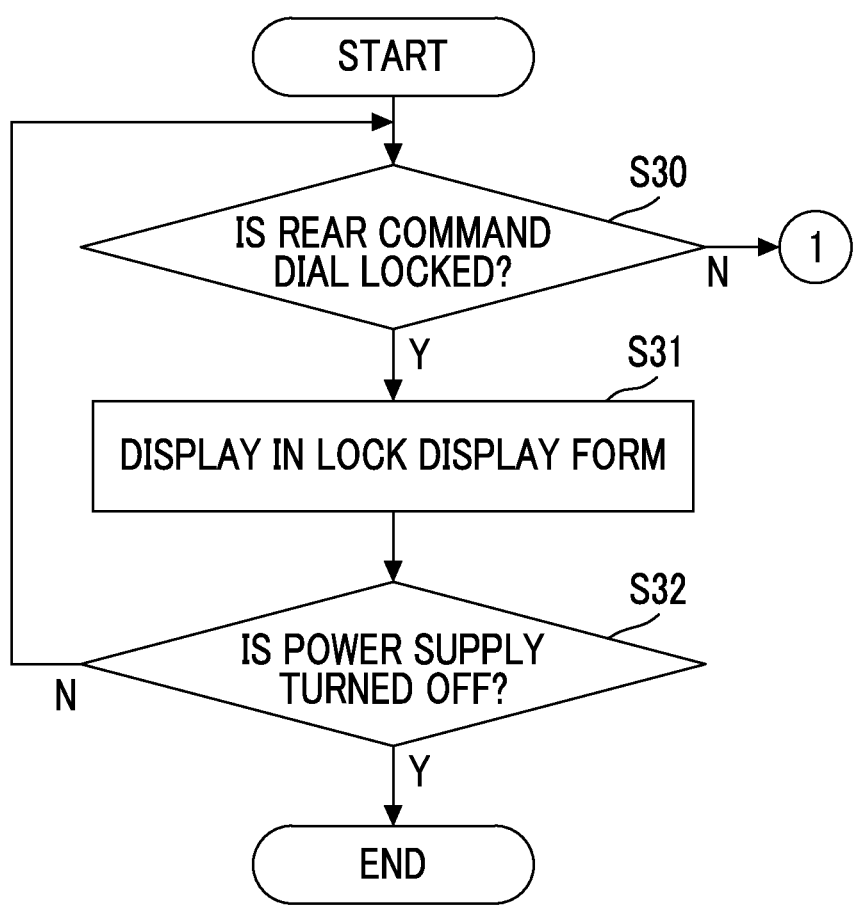
FIG. 28 is a flowchart showing the processing procedure of the display control of the sub-display.
Figure 29:
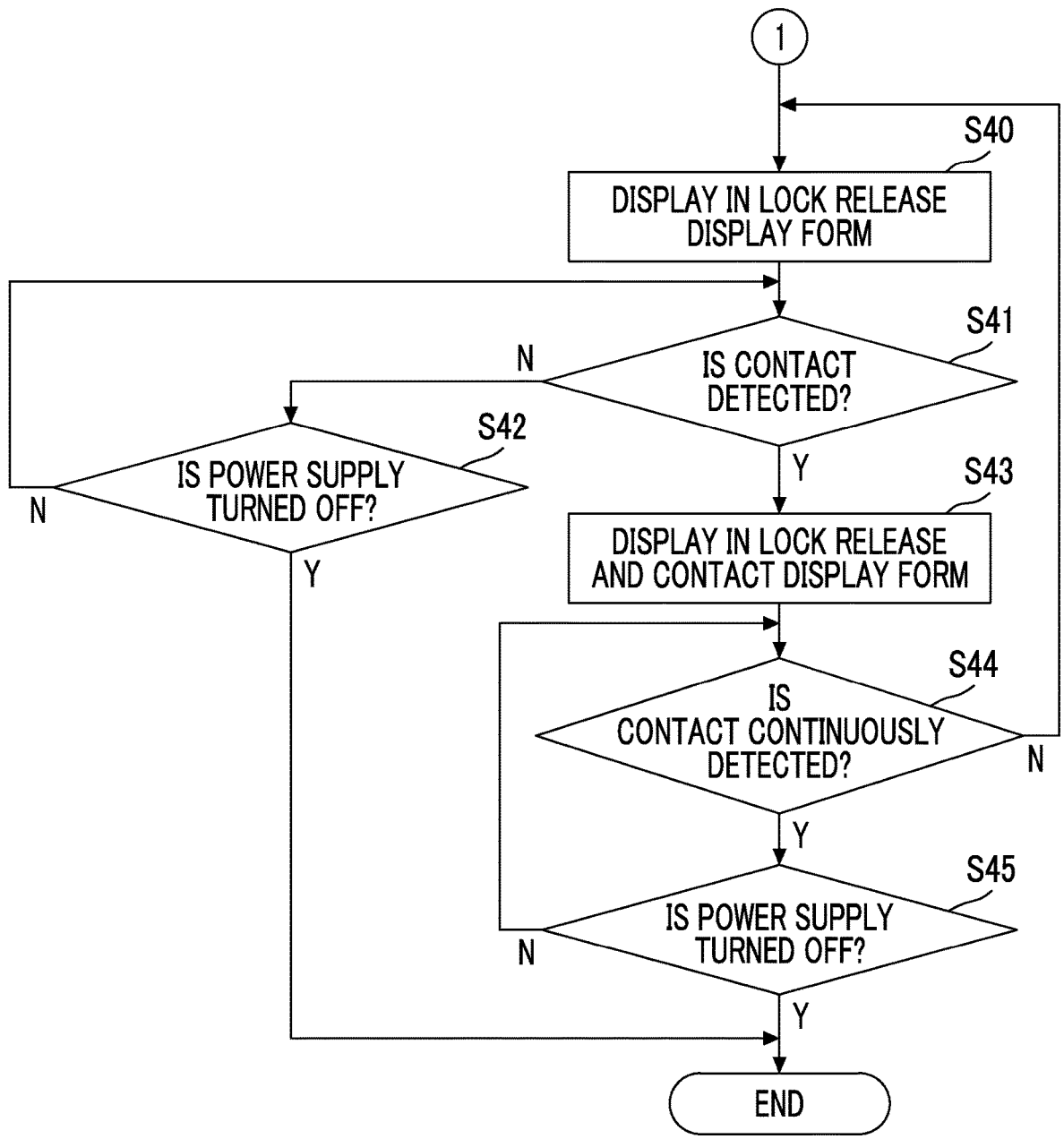
FIG. 29 a flowchart showing the processing procedure of the display control of the sub-display.

FIGS. 28 and 29 are flowcharts showing the processing procedure of the display control of the sub-display.

In the case where the power supply of the digital camera 1 is turned on, the sub-display display control unit 114 determines whether the rear command dial D1 is locked (step S30).

In a case where it is determined that the rear command dial D1 is locked, the sub-display display control unit 114 displays the information in the lock display form on the sub-display 16 (step S31). That is, only the setting contents iC of the camera is displayed on the sub-display 16 as shown in FIG. 25. Thereafter, the sub-display display control unit 114 determines whether the power supply of the digital camera 1 is turned off (step S32). In the case where it is determined that the power supply of the digital camera 1 is turned off, the processing ends. On the other hand, in the case where it is determined that the power supply of the digital camera 1 is not turned off, the processing returns to the processing of step S30 to determine whether the rear command dial D1 is locked.

In a case where it is determined that the rear command dial D1 is not locked in step S30, the sub-display display control unit 114 displays the information in the lock release display form on the sub-display 16 (step S40). That is, the image picture iD1 of the rear command dial D1 appears on the sub-display 16 as shown in FIG. 26. Thereafter, the sub-display display control unit 114 determines the presence or absence of the detection of the contact of the finger with the rear command dial D1 based on the output of the touch sensor D1b (step S41).

In a case where it is determined that the contact of the finger with the rear command dial D1 is not detected, the sub-display display control unit 114 determines whether the power supply of the digital camera 1 is turned off (step S42). In the case where it is determined that the power supply of the digital camera 1 is turned off, the processing ends. On the other hand, in the case where it is determined that the power supply of the digital camera 1 is not turned off, the processing returns to the processing of step S41 to determine the presence or absence of the detection of the contact of the finger with the rear command dial D1 (step S41).

In a case where it is determined that the contact of the finger with the rear command dial D1 is detected in step S41, the sub-display display control unit 114 displays the information in the lock release and contact display form on the sub-display 16 (step S43). That is, the image picture iD1 of the rear command dial D1 made to appear on the sub-display 16 is enlarged, and the image picture iD1 of the rear command dial D1 is displayed in the second size as shown in FIG. 27.

Thereafter, the sub-display display control unit 114 determines whether the contact with the rear command dial D1 is continuously detected (step S44).

In the case where it is determined that the contact is continuously detected, the sub-display display control unit 114 determines whether the power supply of the digital camera 1 is turned off (step S45). In the case where it is determined that the power supply of the digital camera 1 is turned off, the processing ends. On the other hand, in the case where it is determined that the power supply of the digital camera 1 is not turned off, the processing returns to the processing of step S44 to determine whether the contact with the rear command dial D1 is continuously detected (step S44).

In a case where it is determined that the contact with the rear command dial D1 is not continuously detected in step S44, the processing returns to step S40 and the sub-display display control unit 114 switches the display on the sub-display 16 to the lock release display form (step S40).

In this manner, in the digital camera 1 of the embodiment, the display on the sub-display 16 can be switched according to the lock state of the lock of the rear command dial D1. Further, in the case where the lock of the rear command dial D1 is released, the display on the sub-display 16 can be switched based on the detection result of the contact of the finger with the rear command dial D1. The case where the rear command dial D1 is locked means that there is no intention of the user to use the rear command dial D1. Therefore, in this case, it is possible to satisfactorily ensure the visibility of the setting contents iC of the camera displayed on the sub-display 16 by eliminating the display of the image picture iD1 of the rear command dial D1 from the sub-display 16. On the other hand, since the image picture iD1 of the rear command dial D1 is displayed on the sub-display 16 in the case where the lock of the rear command dial D1 is released, it is possible to provide good operability in a case where the operation is performed by the rear command dial D1. Further, since the image picture iD1 of the rear command dial D1 is displayed in a small size in the case where the rear command dial D1 is not touched, the visibility of the setting contents iC of the camera is not disturbed.

Modification Example

Each modification example described in the digital camera of the first or second embodiment may be applied to the digital camera of the embodiment.

Modification Example of Display on Sub-Display at Time of Lock Release

In the case where the lock of the rear command dial D1 is released, a predetermined mark may appear. This mark is a mark which is the base point in the case where the image picture iD1 of the rear command dial D1 appears. In this case, in the case where the contact of the finger with the rear command dial D1 is detected, the image picture iD1 of the rear command dial D1 appears with the mark as the base point. Further, in this case, the image picture iD1 of the rear command dial D1 may appear in the first size. In the case where the image picture iD1 of the rear command dial D1 appears in the first size in the case where the contact is detected, the image picture iD1 of the rear command dial D1 is displayed in an enlarged manner to the second size in the case where the contact is further continuously detected for the certain period of time or more, or the rear command dial D1 is rotationally operated. Hereinafter, in this case, display examples of the sub-display 16 will be described based on FIGS. 30 to 32.

Figure 30:
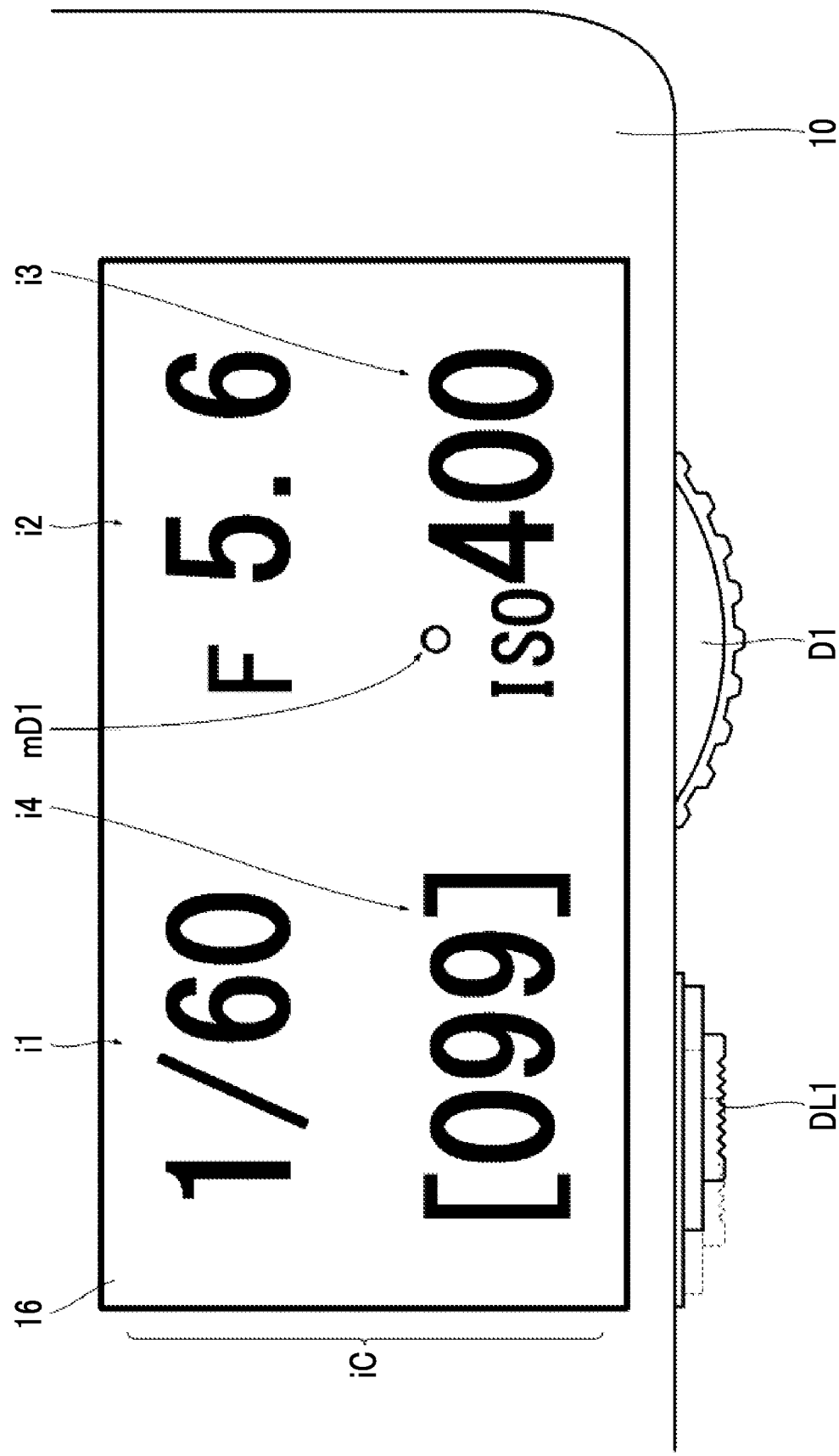
FIG. 30 is a plan view showing an example of the display on the sub-display in a case where a mark appears in the case where the lock of the rear command dial is released.

FIG. 30 is a plan view showing an example of the display on the sub-display in a case where a mark appears in the case where the lock of the rear command dial is released.

In the example, the mark mD1 is formed of a figure obtained by reducing the image picture iD1 of the rear command dial D1. Since the mark mD1 is small, the visibility of the setting contents iC of the camera does not deteriorate.

Figure 31:
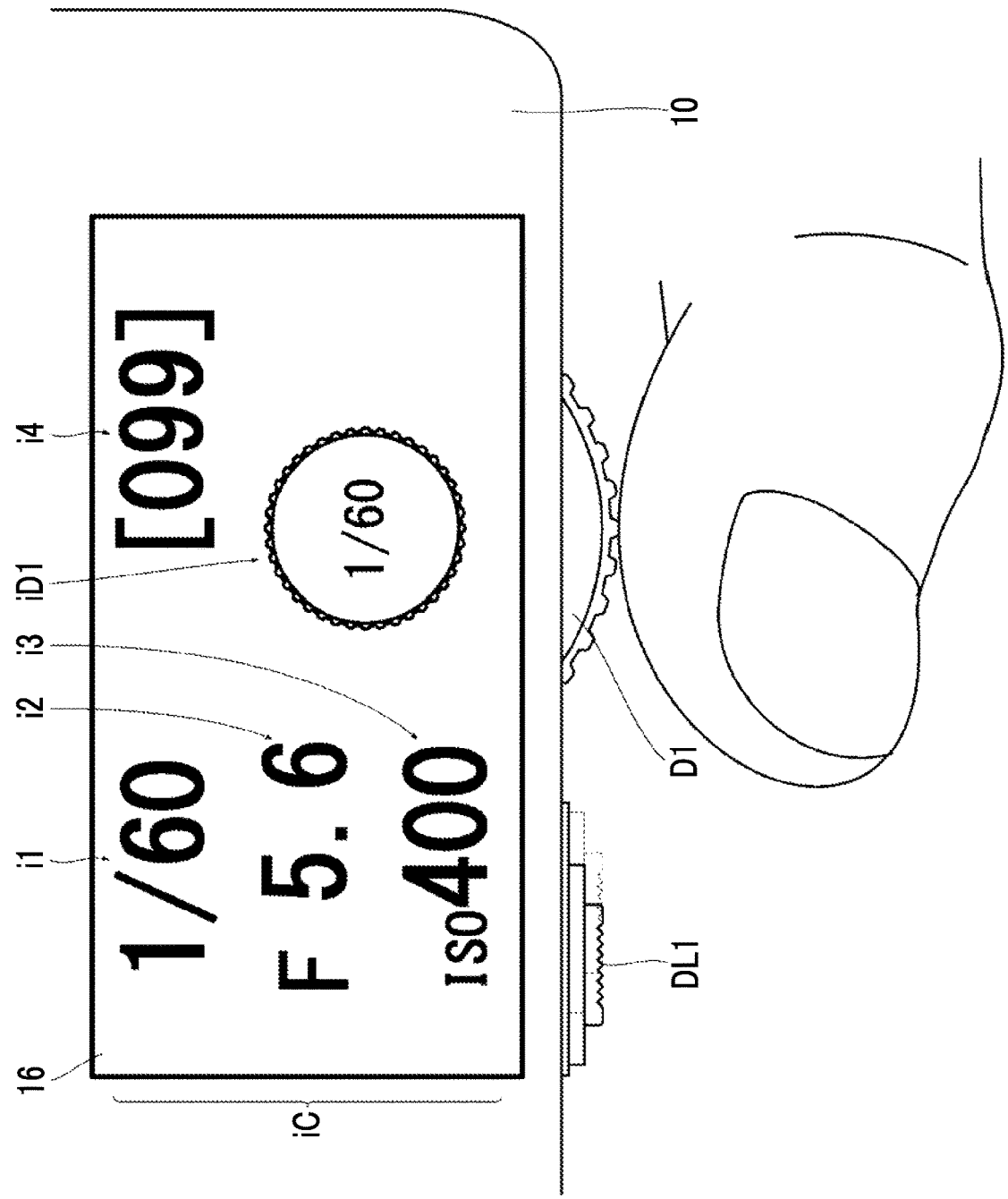
FIG. 31 is a plan view showing an example of the display on the sub-display in a case where the contact of the finger with the rear command dial is detected.

FIG. 31 is a plan view showing an example of the display on the sub-display in the case where the contact of the finger with the rear command dial is detected.

As shown in FIG. 31, in the case where the contact is detected, the image picture iD1 appears with the mark mD1 as the base point. At this time, the image picture iD1 of the rear command dial D1 appears while the outer diameter of the image picture iD1 thereof is gradually increased with the mark mD1 as the base point. The image picture iD1 thereof is finally displayed in the first size.

Figure 32:
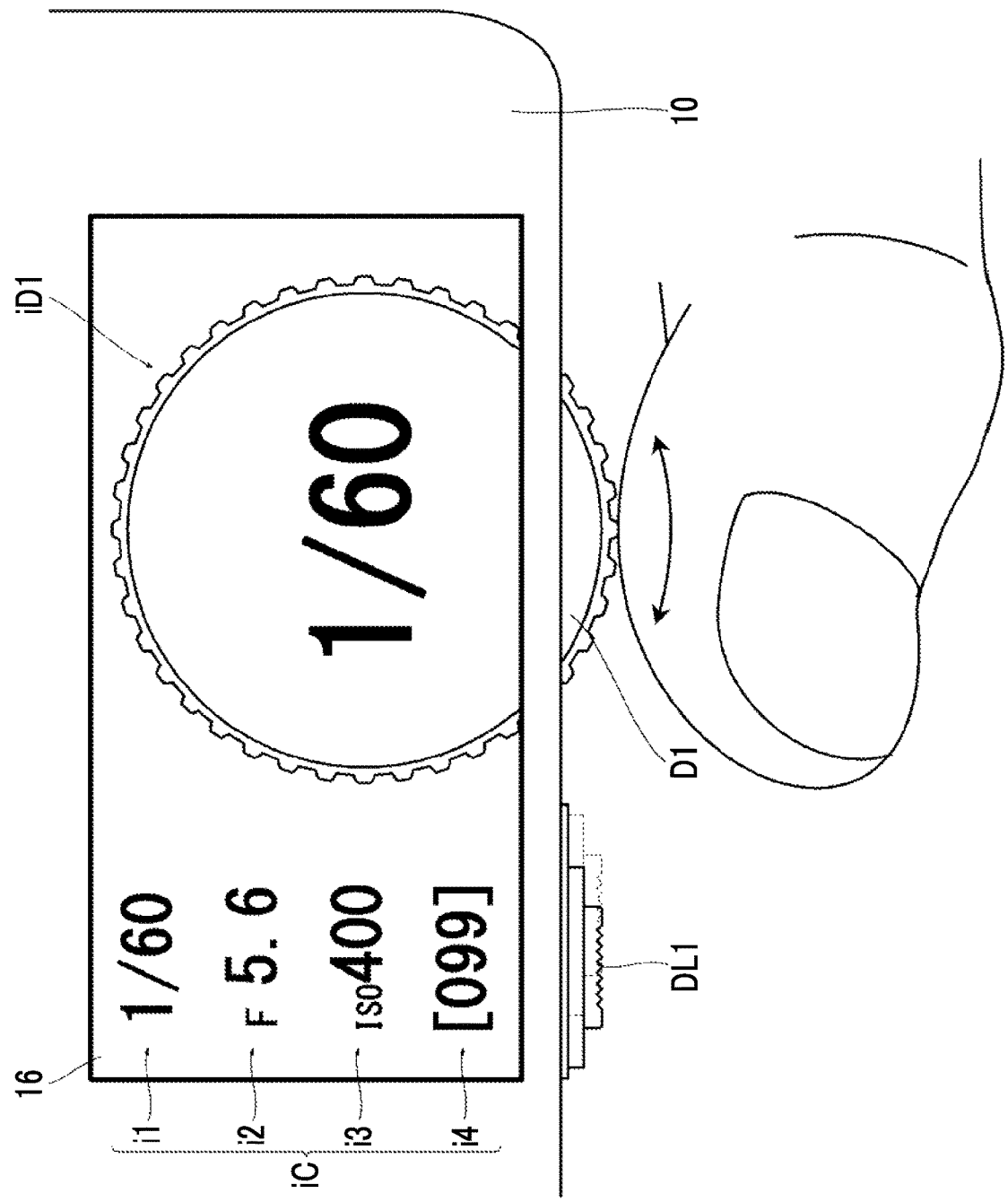
FIG. 32 is a plan view showing an example of the display on the sub-display in a case where the contact is continuously detected for the certain period of time or more and in a case where the rear command dial is rotationally operated.

FIG. 32 is a plan view showing an example of the display on the sub-display in the case where the contact is continuously detected for the certain period of time or more and in the case where the rear command dial is rotationally operated.

After the image picture iD1 of the rear command dial D1 appears, in the case where the rear command dial D1 is rotationally operated or the contact is continuously detected for the certain period of time or more, the image picture iD1 is enlarged and displayed in the second size.

Fourth Embodiment

In the digital camera of the embodiment, in the case where the lock of the rear command dial D1 is released, the image picture iD1 of the rear command dial D1 appears from the edge of the sub-display 16. In the case where the contact is detected in the state where the lock is released, the image picture iD1 of the rear command dial D1 appearing from the edge further advances from the edge and is displayed in a large size.

The configuration of the digital camera itself is the same as the configuration of the digital camera in the third embodiment except that the display manner on the sub-display 16 is different. Therefore, only the display manner (display control method) on the sub-display 16 will be described herein.

[Display on Sub-Display]

The display on the sub-display 16 is controlled by the sub-display display control unit 114. The sub-display display control unit 114 switches the display on the sub-display 16 based on the lock state of the rear command dial D1 and the detection result of the contact of the finger with the rear command dial D1.

(1) Display at Time of Lock

The display on the sub-display 16 in the case where the rear command dial D1 is locked is the same as the case of the digital camera of the third embodiment. That is, the sub-display 16 displays only the setting contents iC of the camera as shown in FIG. 25.

(2) Display at Time of Lock Release

Figure 33:
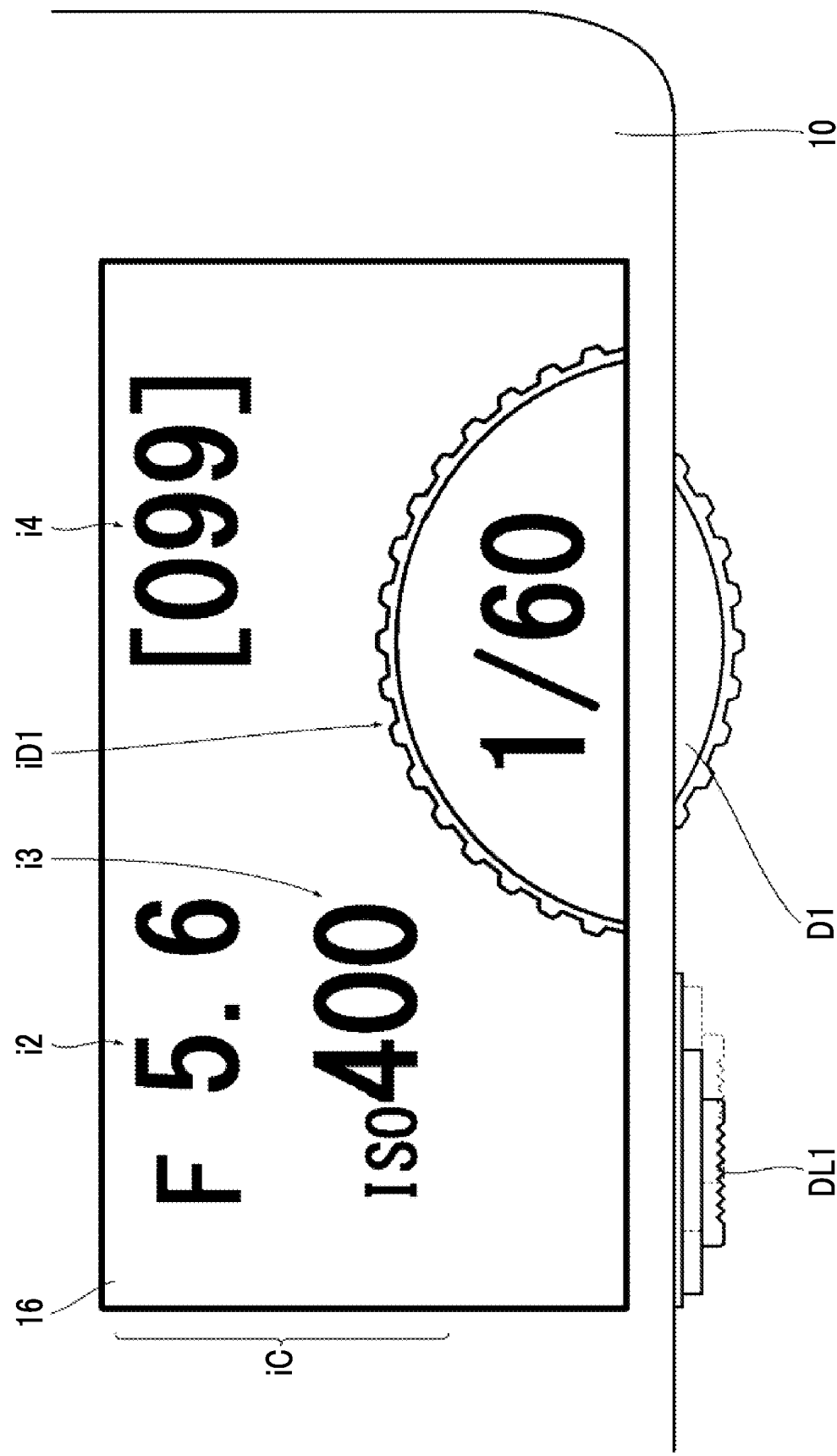
FIG. 33 is a plan view showing an example of the display on the sub-display in the case where the lock of the rear command dial is released.

FIG. 33 is a plan view showing an example of the display on the sub-display in the case where the lock of the rear command dial is released.

In the case where the lock of the rear command dial D1 is released, the part of the image picture iD1 of the rear command dial D1 appears from the edge of the sub-display 16 as shown in FIG. 33. This display form is the same as the display form of the sub-display 16 in the case where the contact with the rear command dial D1 is detected in the digital camera of the second embodiment.

(3) Display at Time of Contact

Figure 34:
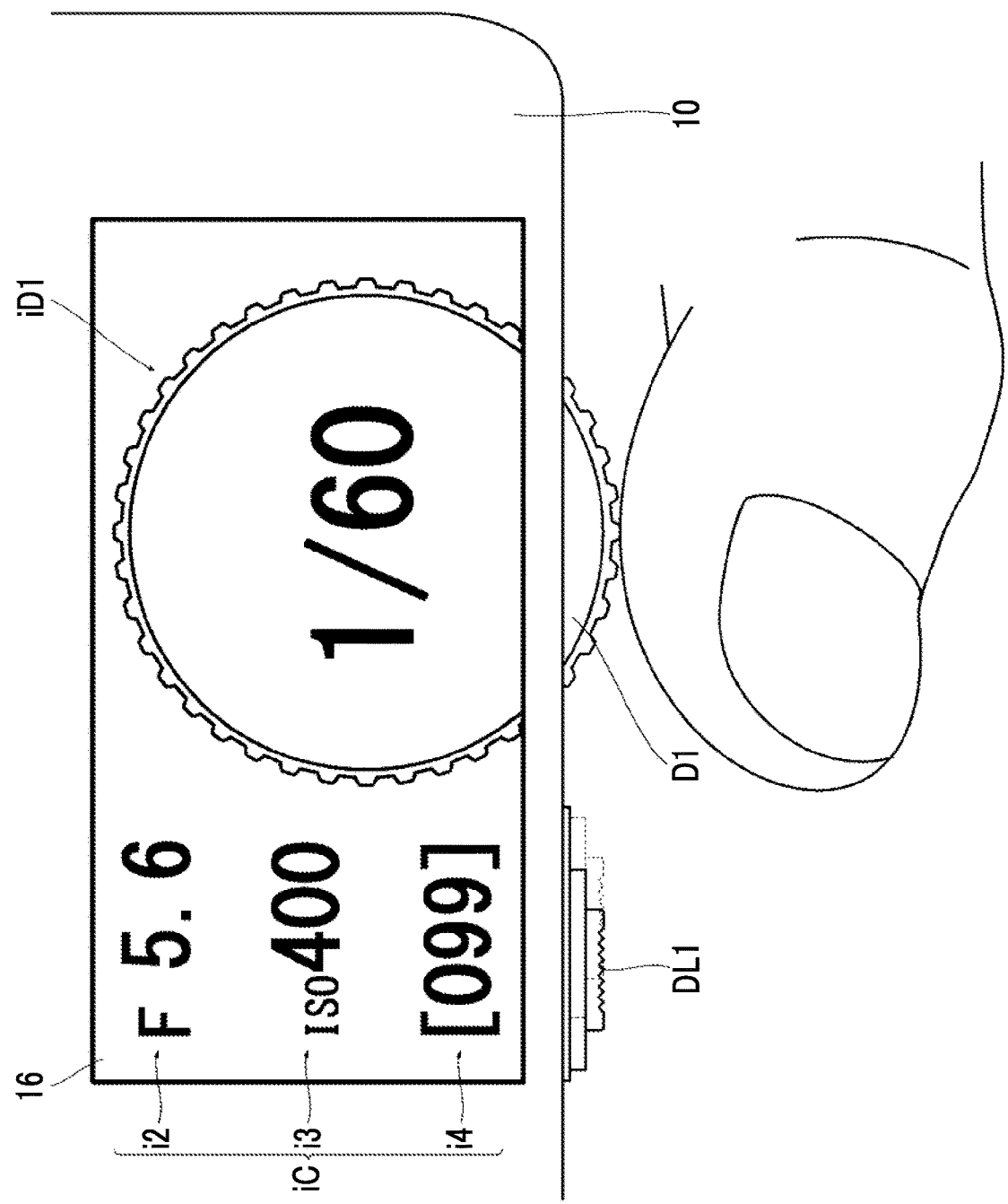
FIG. 34 is a plan view showing an example of the display on the sub-display in the case where the contact with the rear command dial is detected in the state where the lock of the rear command dial is released.

FIG. 34 is a plan view showing an example of the display on the sub-display in the case where the contact with the rear command dial is detected in the state where the lock of the rear command dial is released.

As shown in Fig. FIG. 34, in the case where the contact of the finger with the rear command dial D1 is detected in the state where the lock of the rear command dial D1 is released, the image picture iD1 of the rear command dial D1 appearing on the sub-display 16 further advances in the front direction and is displayed in a large size. This display form is the same as the display form of the sub-display 16 in the case where the rear command dial D1 is rotationally operated in the digital camera of the second embodiment.

In this manner, in the case where the lock of the rear command dial D1 is released, the image picture iD1 of the rear command dial D1 is displayed from the edge of the sub-display 16 in the digital camera of the embodiment. In this case, it is possible to ensure good visibility regarding the setting contents iC of the camera and thus to provide good operability similarly to the digital camera of the third embodiment.

Modification Example

Each modification example described in the digital cameras of the first to third embodiments may be applied to the digital camera of the embodiment.

Modification Example of Display on Sub-display at Time of Lock Release

In the case where the lock of the rear command dial D1 is released, the part of the outer periphery of the image picture iD1 of the rear command dial D1 may appear from the edge. In this case, in the case where the contact of the finger with the rear command dial D1 is detected, the image picture iD1 of the rear command dial D1 further advances and is displayed. Further, in this case, the image picture iD1 thereof may be displayed in the first display amount. In the case where the image picture iD1 of the rear command dial D1 appears in the first display amount in the case where the contact is detected, the image picture iD1 of the rear command dial D1 is displayed in the second display amount in the case where the contact is further continuously detected for the certain period of time or more, or the rear command dial D1 is rotationally operated. Hereinafter, in this case, display examples of the sub-display 16 will be described based on FIGS. 35 to 37.

Figure 35:
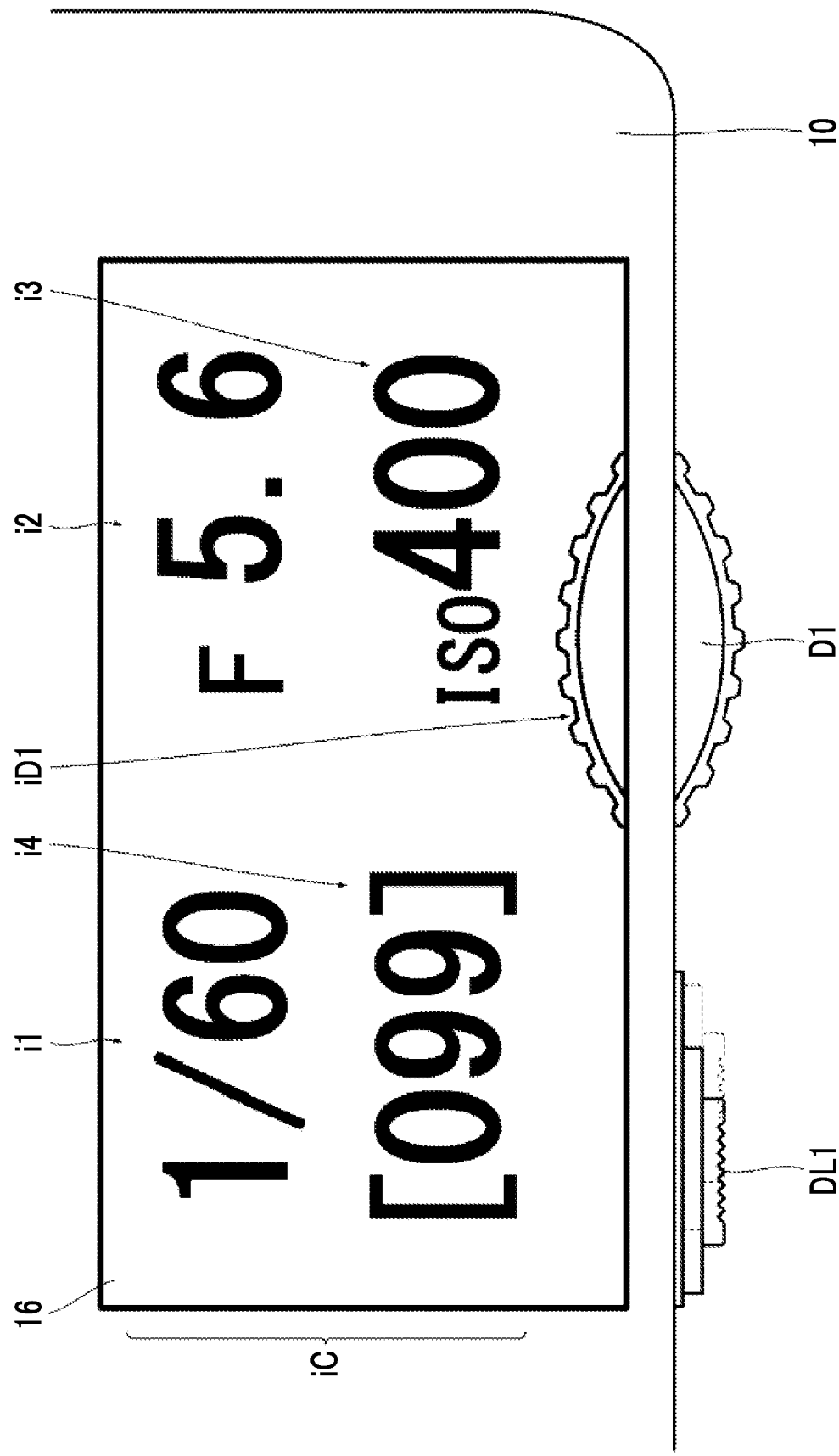
FIG. 35 is a plan view showing an example of the display on the sub-display in a case where a part of the outer periphery of the image picture of the rear command dial appears from an edge in the case where the lock of the rear command dial is released.

FIG. 35 is a plan view showing an example of the display on the sub-display in the case where the part of the outer periphery of the image picture of the rear command dial appears from the edge in the case where the lock of the rear command dial is released.

As shown in FIG. 35, in the case where the lock of the rear command dial D1 is released, the part of the outer periphery of the image picture iD1 of the rear command dial D1 appears from the edge of the sub-display 16.

Figure 36:
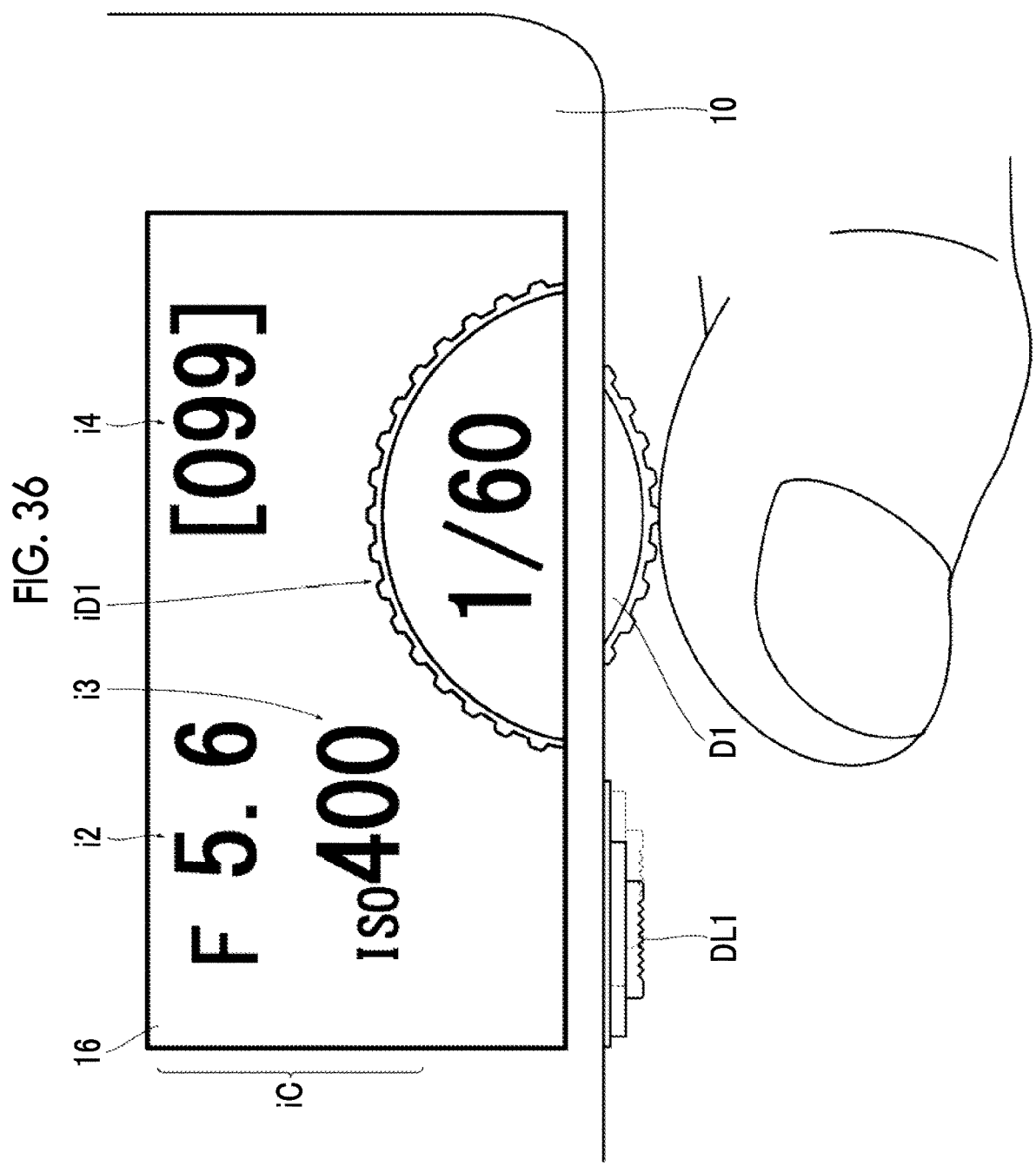
FIG. 36 is a plan view showing an example of the display on the sub-display in the case where the contact of the finger with the rear command dial is detected.

FIG. 36 is a plan view showing an example of the display on the sub-display in the case where the contact of the finger with the rear command dial is detected.

In the case where the contact is detected, the image picture iD1 of the rear command dial further advances from the edge and is displayed in the first display amount.

Figure 37:
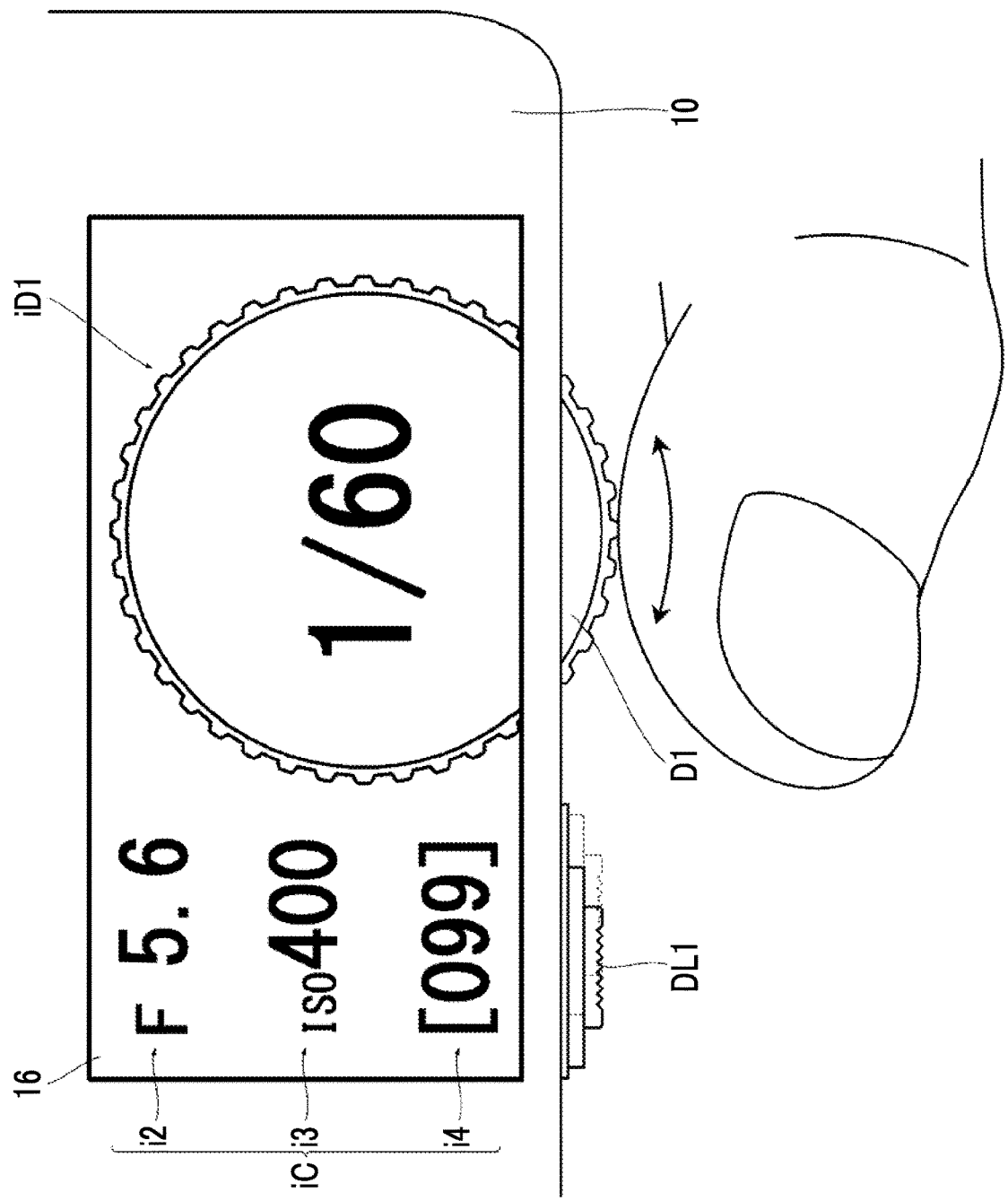
FIG. 37 is a plan view showing an example of the display on the sub-display in the case where the contact is continuously detected for the certain period of time or more and in the case where the rear command dial is rotationally operated.

FIG. 37 is a plan view showing an example of the display on the sub-display in the case where the contact is continuously detected for the certain period of time or more and in the case where the rear command dial is rotationally operated.

Thereafter, in the case where the rear command dial D1 is rotationally operated, or in the case where the contact is continuously detected for the certain period of time or more, the image picture iD1 of the rear command dial further advances from the edge and is displayed in the second display amount.

Fifth Embodiment

In a digital camera of an embodiment, the image picture of the rear command dial is displayed in advance on the sub-display. The display form of the image picture of the rear command dial can be switched between the case where the contact of the finger with the rear command dial is detected and the case where the contact of the finger with the rear command dial is not detected.

The configuration of the digital camera itself is the same as the configuration of the digital camera in the first embodiment except that the display manner on the sub-display 16 is different. Therefore, only the display manner (display control method) on the sub-display 16 will be described herein.

[Display on Sub-Display]

The display on the sub-display 16 is controlled by the sub-display display control unit 114. The sub-display display control unit 114 switches the display on the sub-display 16 based on the detection result of the contact of the finger with the rear command dial D1.

(1) Display at Time of Non-Contact

Figure 38:
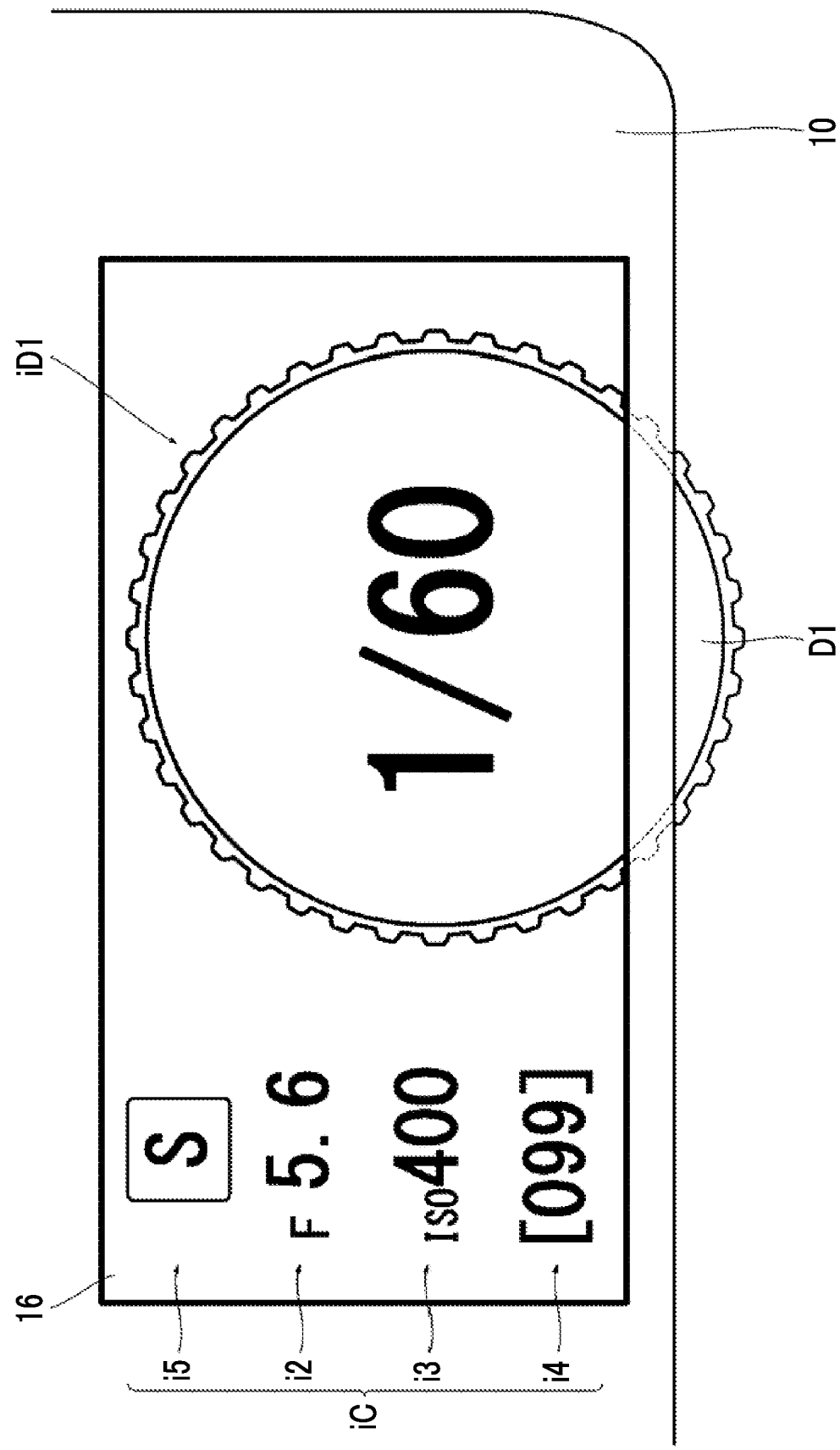
FIG. 38 is a plan view showing an example of the display on the sub-display in the case where the contact with the rear command dial is not detected.

FIG. 38 is a plan view showing an example of the display on the sub-display in the case where the contact with the rear command dial is not detected. FIG. 38 shows an example of the case where the item to be set by the rear command dial D1 is the shutter speed.

The sub-display 16 displays the information on the setting contents iC of the camera, and the image picture iD1 of the rear command dial D1 as shown in FIG. 38.

«Setting Contents of Camera»

In the digital camera of the embodiment, the currently set F-number information i2, the currently set ISO sensitivity information i3, the current number of capturable images information i4, and currently set imaging mode information i5 are displayed as the information on the setting contents iC of the digital camera 1.

A reason why the shutter speed information is not included in the information on the setting contents iC of the camera is that the item to be set by the rear command dial D1 is the shutter speed. The information on the items excluding the item to be set by the rear command dial D1 is displayed as the setting contents iC of the camera. Therefore, for example, in a case where the item to be set by the rear command dial D1 is the F-number, the information on the setting contents iC of the camera is displayed excluding the F-number information.

FIG. 38 shows an example in a case where the currently set imaging mode is the shutter speed priority, the F-number is F5.6, the ISO sensitivity is ISO400, and the number of capturable images is 99.

An icon prepared for each mode is displayed for the imaging mode information i5. As shown in FIG. 38, one alphabetic character representing each mode is displayed in a rectangular frame as the icon. The alphabet is displayed, for example, as P in the case of the program mode, S in the case of the shutter speed priority mode, A in the case of the aperture stop priority mode, and M in the case of the manual mode.

The setting contents iC of the camera are displayed in a defined layout at a margin position.

«Image Picture of Rear Command Dial»

The image picture iD1 of the rear command dial D1 is formed of the image having the arc-like external shape obtained by extending the part of the outer periphery of the rear command dial D1 exposed from the camera body 10. This image is an image complementing a hidden portion of the rear command dial D1.

The setting value of the item to be set by the rear command dial D1 is displayed inside the image picture iD1 of the rear command dial D1. In the example, since the item to be set by the rear command dial D1 is the shutter speed, the current setting value of the shutter speed is displayed. FIG. 38 shows an example of the case where the current setting value of the shutter speed is ⅟₆₀ second.

In this manner, it is possible to easily confirm the current setting of the item to be set by the rear command dial D1 by forming the image picture iD1 of the rear command dial D1 with the figure in the form in which the current setting value is displayed inside the figure forming the external shape.

(2) Display at Time of Contact

Figure 39:
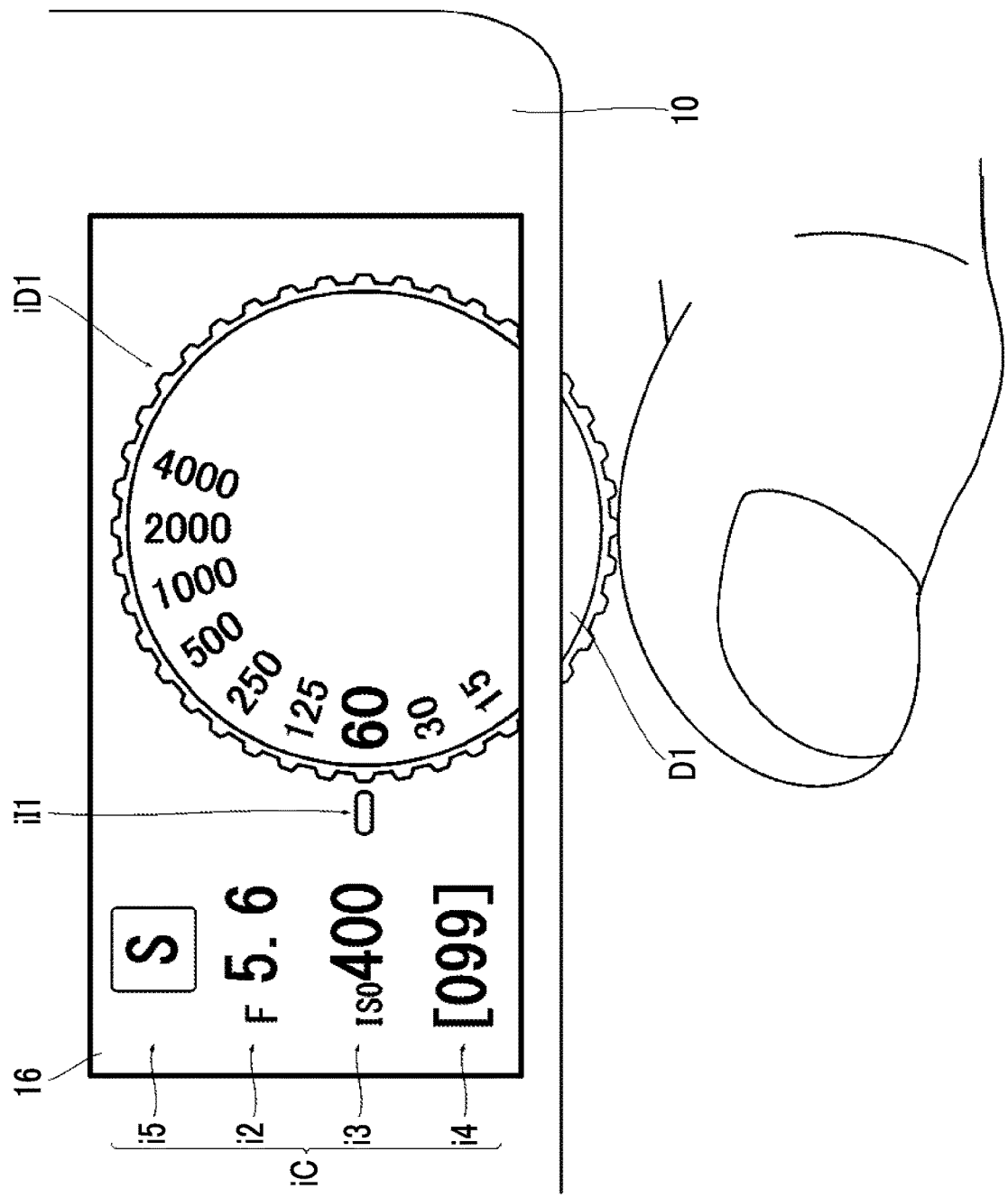
FIG. 39 is a plan view showing an example of the display on the sub-display in the case where the contact with the rear command dial is detected.

FIG. 39 is a plan view showing an example of the display on the sub-display in the case where the contact with the rear command dial is detected.

As shown in FIG. 39, in the case where the contact of the finger with the rear command dial D1 is detected, the display form of the image picture iD1 of the rear command dial D1 can be switched.

The image picture iD1 of the rear command dial D1 in the case where the contact of the finger with the rear command dial D1 is detected is formed of an image representing that a change in the setting is possible by operating the rear command dial D1.

In the example, the image picture iD1 thereof is formed of the image obtained by imitating the common shutter speed dial. That is, the image picture iD1 is formed of the image in which the common shutter speed dial is viewed in a plan view.

In this manner, it is possible for the user to grasp at a glance that the change in the setting is possible by operating the rear command dial D1 from the display on the sub-display 16, by forming the image picture iD1 with the image obtained by imitating the common shutter speed dial. Further, the attention of the user can be directed to the sub-display 16 by switching the display form.

In particular, in this example, since the outer diameter of the image picture iD1 of the rear command dial D1 substantially matches the outer diameter of the actual rear command dial D1, it is possible to easily grasp that the change in the setting is possible by operating the rear command dial D1 from the display on the sub-display 16.

In this manner, according to the digital camera 1 of the embodiment, in the case where the rear command dial D1 is touched, the display form of the image picture iD1 of the rear command dial D1 displayed on the sub-display 16 can be switched. Accordingly, it is possible to easily perform the setting while the sub-display 16 is used in the case where the rear command dial D1 is operated. Further, since the attention of the user is directed to the sub-display 16 by switching the display, it is possible to perform the operation without confusion even a user who uses the rear command dial D1 for the first time.

Modification Example

Modification Example of Image Picture of Rear Command Dial

Figure 40:
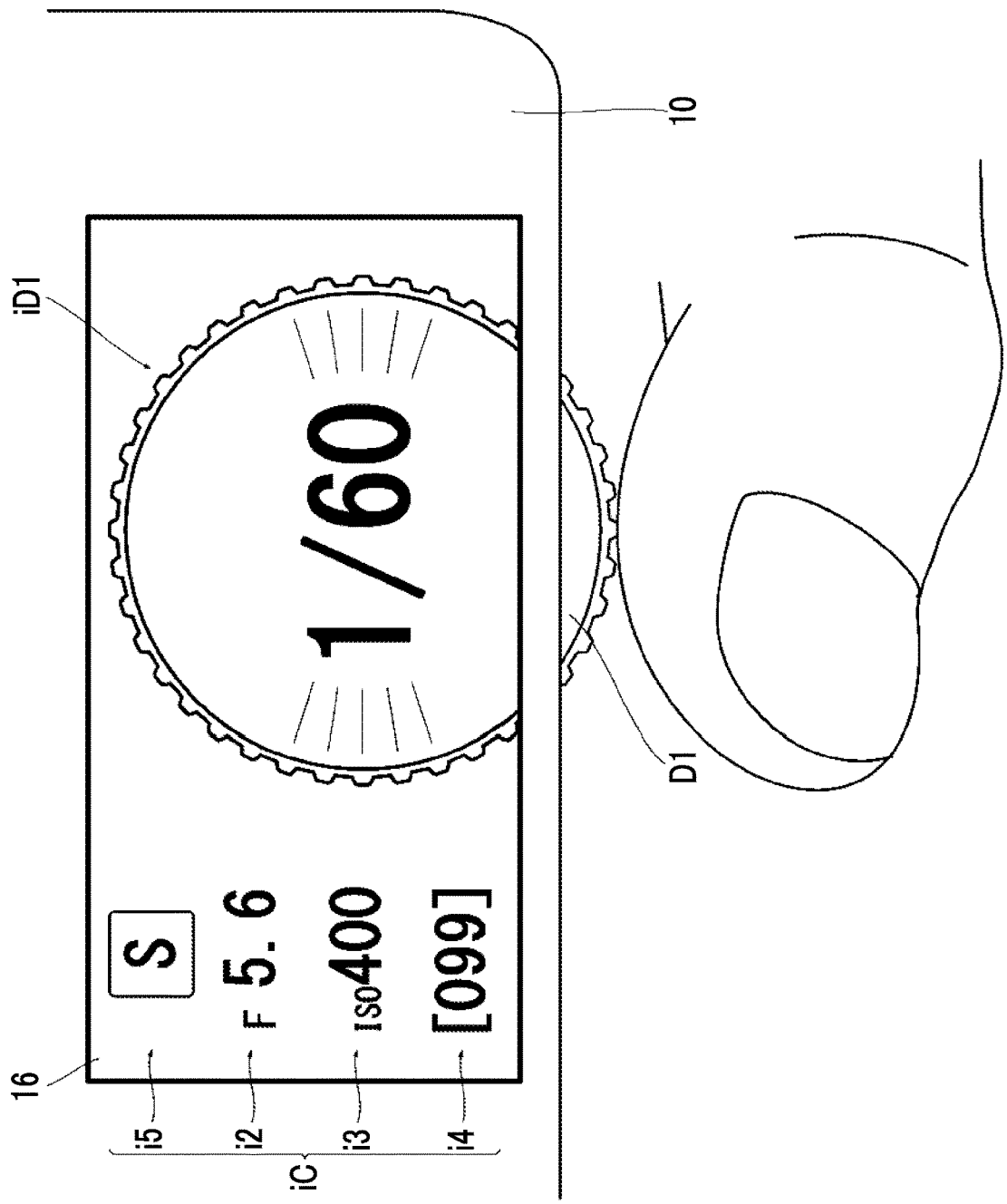
FIG. 40 is a plan view showing another example of the display on the sub-display in the case where the contact with the rear command dial is detected.

FIG. 40 is a plan view showing another example of the display on the sub-display in the case where the contact with the rear command dial is detected.

In the case of the example, in the case where the contact with the rear command dial is detected, the current setting value displayed inside the image picture iD1 of the rear command dial D1 is displayed to be turned on and off.

That is, in the case of the example, the internal setting value is displayed to be stationary in the case where the contact is not detected, and the internal setting value is displayed to be turned on and off in the case where the contact is detected.

Accordingly, it is possible to grasp that the setting change of the rear command dial D1 from the display on the sub-display 16 is possible.

Figure 41:
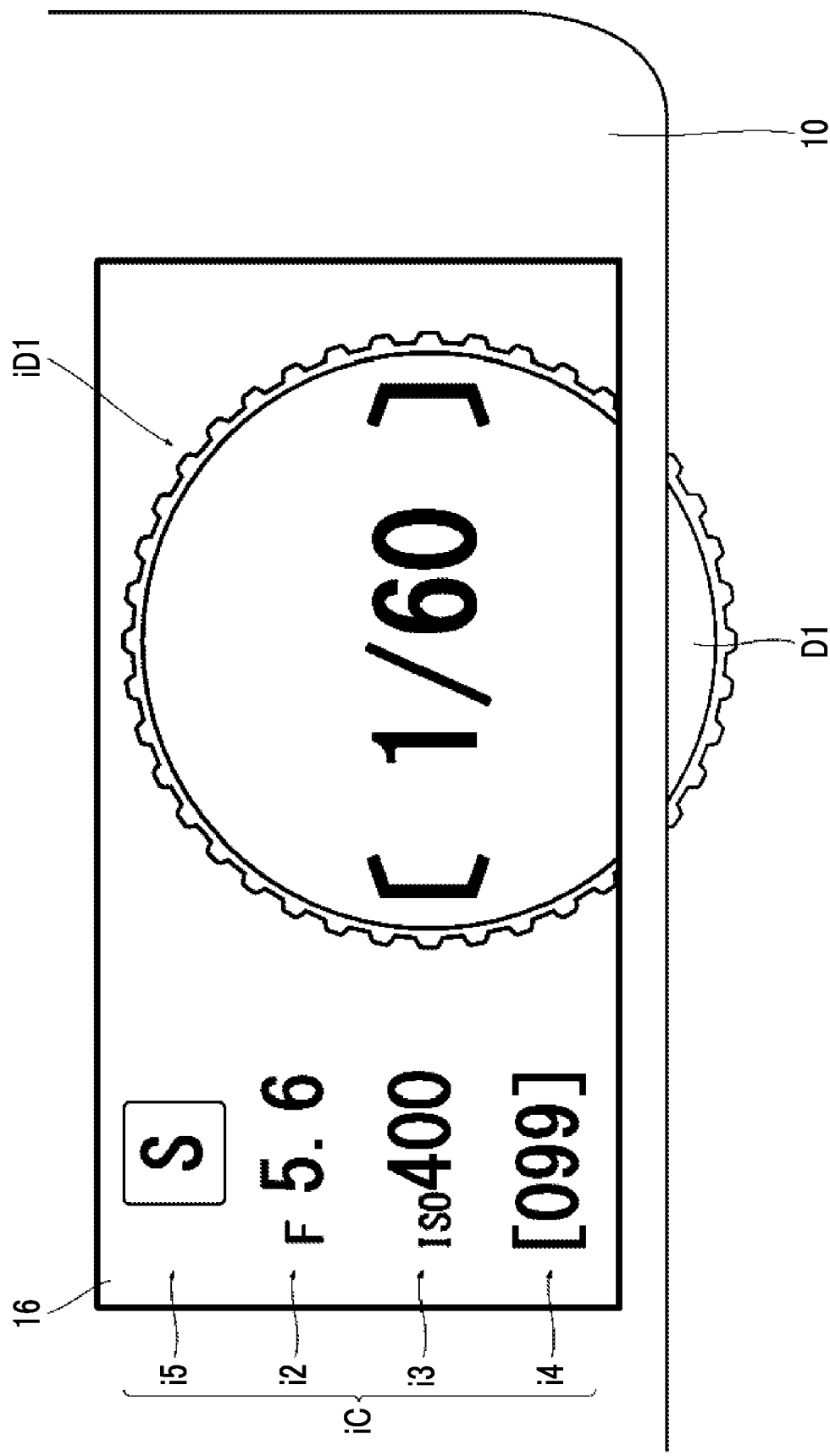
FIG. 41 is a plan view showing another example of the display on the sub-display in the case where the contact with the rear command dial is not detected.

FIG. 41 is a plan view showing another example of the display on the sub-display in the case where the contact with the rear command dial is not detected.

In the case of the example, the current setting value is displayed in parentheses inside the image picture iD1 of the rear command dial D1.

In this manner, it is possible to grasp that the setting is fixed by displaying the current setting value in parentheses.

In the case of the example, in the case where the contact with the rear command dial is detected, the parentheses are removed. That is, the image picture iD1 thereof becomes the display shown in FIG. 38.

Modification Example of Switching Operation

In the above-described embodiment, the display form of the image picture iD1 of the rear command dial D1 is switched in the case where the contact of the finger with the rear command dial D1 is detected. The display form of the image picture iD1 of the rear command dial D1 may be switched in the case where the rear command dial D1 is rotationally operated.

Sixth Embodiment

A plurality of operation dials can be provided. Hereinafter, an example of the case where the plurality of operation dials are provided in the camera body will be described.

«Configuration»

Figure 42:
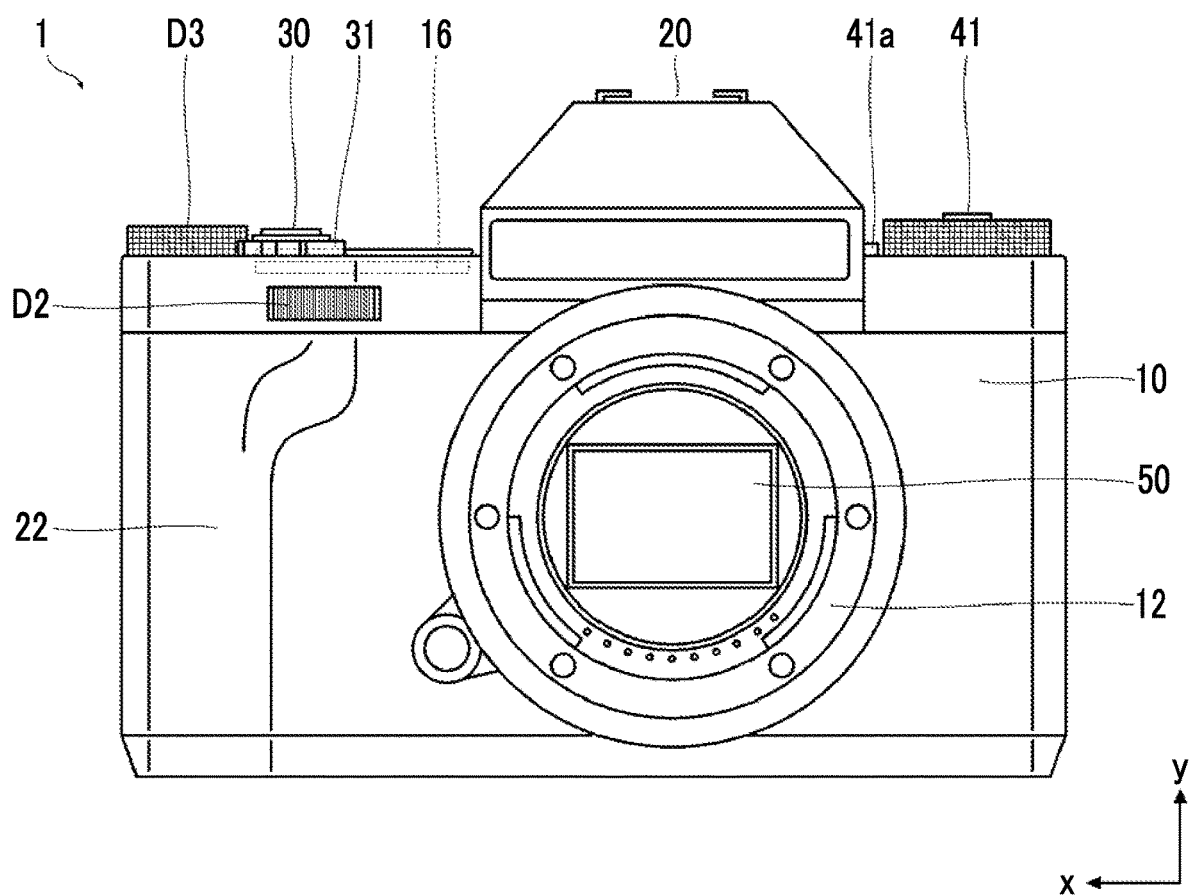
FIG. 42 is a front view of a digital camera of a sixth embodiment.
Figure 43:
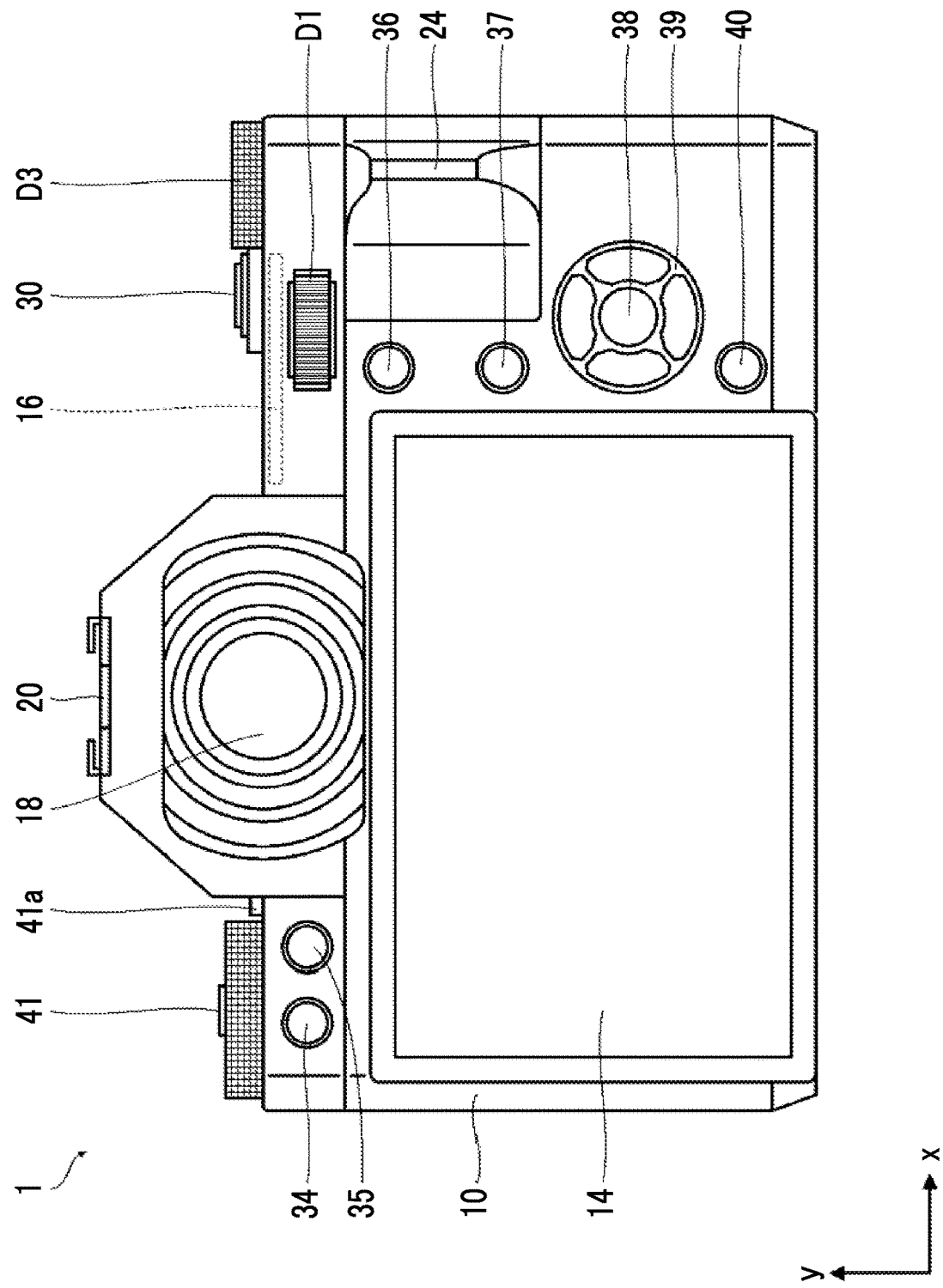
FIG. 43 is a back view of the digital camera of the sixth embodiment.
Figure 44:
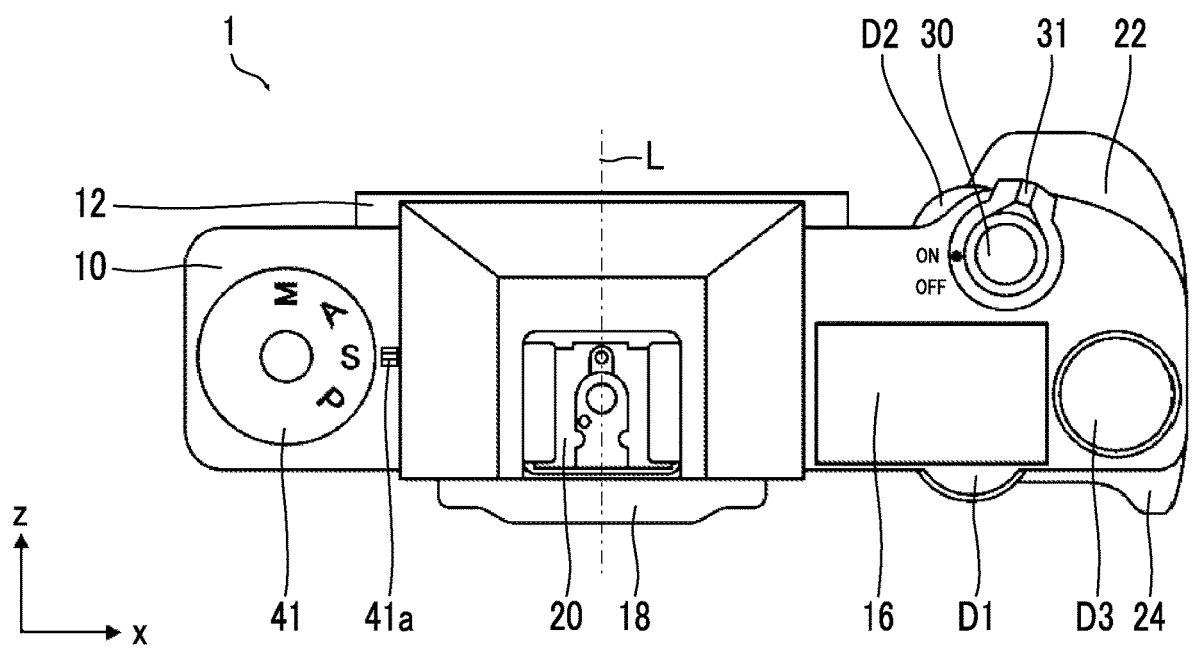
FIG. 44 is a plan view of the digital camera of the sixth embodiment.

FIGS. 42, 43, and 44 are a front view, a back view, and a plan view, respectively, of a digital camera of a sixth embodiment.

The digital camera 1 of the embodiment comprises the plurality of operation dials near the sub-display 16 as shown in FIGS. 42 to 44. Specifically, the rear command dial D1 is provided on the back surface of the camera body 10 as a first operation dial. Further, a front command dial D2 is provided on the front surface of the camera body 10 as a second operation dial. Furthermore, a top surface command dial D3 is provided on the top surface of the camera body 10 as a third operation dial. The above dials are provided near the sub-display 16.

Here, the "near" refers to a distance relationship to the extent that the sub-display 16 and the operation dials are disposed adjacent to each other as shown in FIGS. 42 to 44.

It is possible to provide good operability by disposing each operation dial near the sub-display 16 and thus improving the relationship between each dial and the sub-display 16. That is, since the setting can be confirmed in the immediate vicinity of the operation dials, it is possible to reduce the movement of the line of sight and thus to provide good operability without stress. Further, the intuitive operation can be realized.

The rear command dial D1 is the same as the rear command dial D1 of the first embodiment. The rear command dial D1 is provided on the rear side with respect to the sub-display 16.

The front command dial D2 is provided on the upper end portion of the grip 22. The front command dial D2 is provided on the front side with respect to the sub-display 16. The configuration of the front command dial D2 is the same as the configuration of the rear command dial D1. That is, the rear command dial D2 can be rotationally operated in both directions and comprises the click mechanism. Further, the contact with the rear command dial D2 is detected by the touch sensor.

The top surface command dial D3 is provided on the end portion of the grip portion side on the top surface of the camera body 10. The top surface command dial D3 is provided on the right side with respect to the sub-display 16. The configuration of top surface command dial D3 is the same as the configuration of the rear command dial D1 except that the entire top surface command dial D3 is provided in an exposed manner. That is, the top surface command dial D3 can be rotationally operated in both directions and comprises the click mechanism. Further, the contact with the top surface command dial D3 is detected by the touch sensor.

The configuration of the embodiment is the same as the configuration of the digital camera of the first embodiment except that the plurality of operation dials are provided.

«Display on Sub-Display»

The display on the sub-display 16 can be switched in response to the detection of the contact with each operation dial and the operation of each operation dial. Hereinafter, the switching of the display on the sub-display 16 will be described.

Hereinafter, an example of a case where the function of setting the shutter speed is assigned to the rear command dial D1, the function of setting the ISO sensitivity is assigned to the front command dial D2, and the function of setting the exposure correction amount is assigned to the top surface command dial D3 will be described.

(1) Display at Time of Non-Contact

Figure 45:
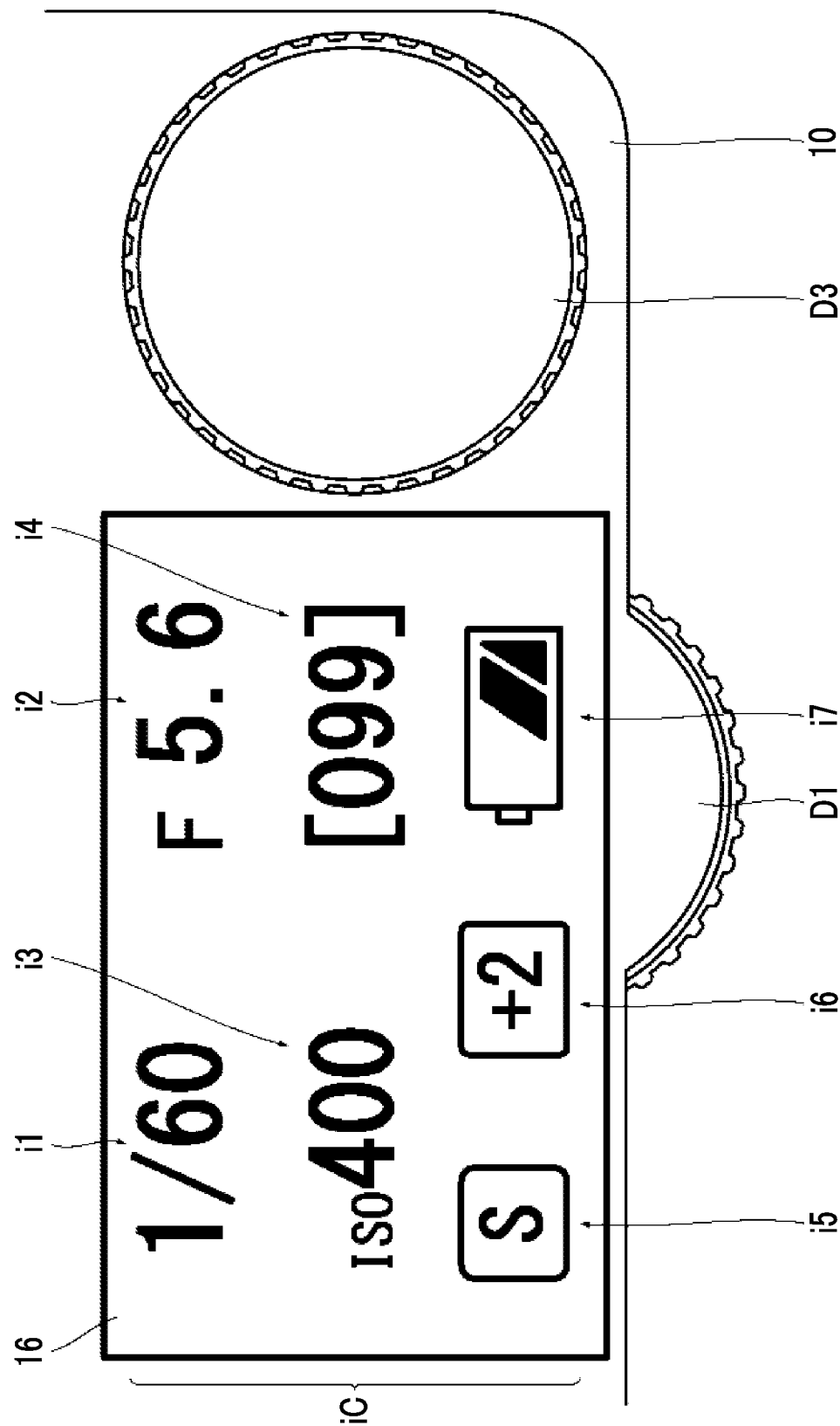
FIG. 45 is a plan view showing an example of the display on the sub-display in a case where the contact with any operation dial is not detected.

FIG. 45 is a plan view showing an example of the display on the sub-display in a case where the contact with any operation dial is not detected.

As described above, in the case where the contact of the finger with any operation dial is not detected, only the setting contents iC of the camera is displayed on the sub-display 16.

In the digital camera 1 of the embodiment, the currently set shutter speed information i1, the currently set F-number information i2, the currently set ISO sensitivity information i3, the current number of capturable images information i4, the currently set imaging mode information i5, currently set exposure correction amount information i6, and currently set battery remaining amount information i7 are displayed as the information on the setting contents iC of the digital camera 1.

These pieces of information are displayed in a defined layout. That is, each piece of information is displayed in a predetermined size at a predetermined position.

Figure 46:
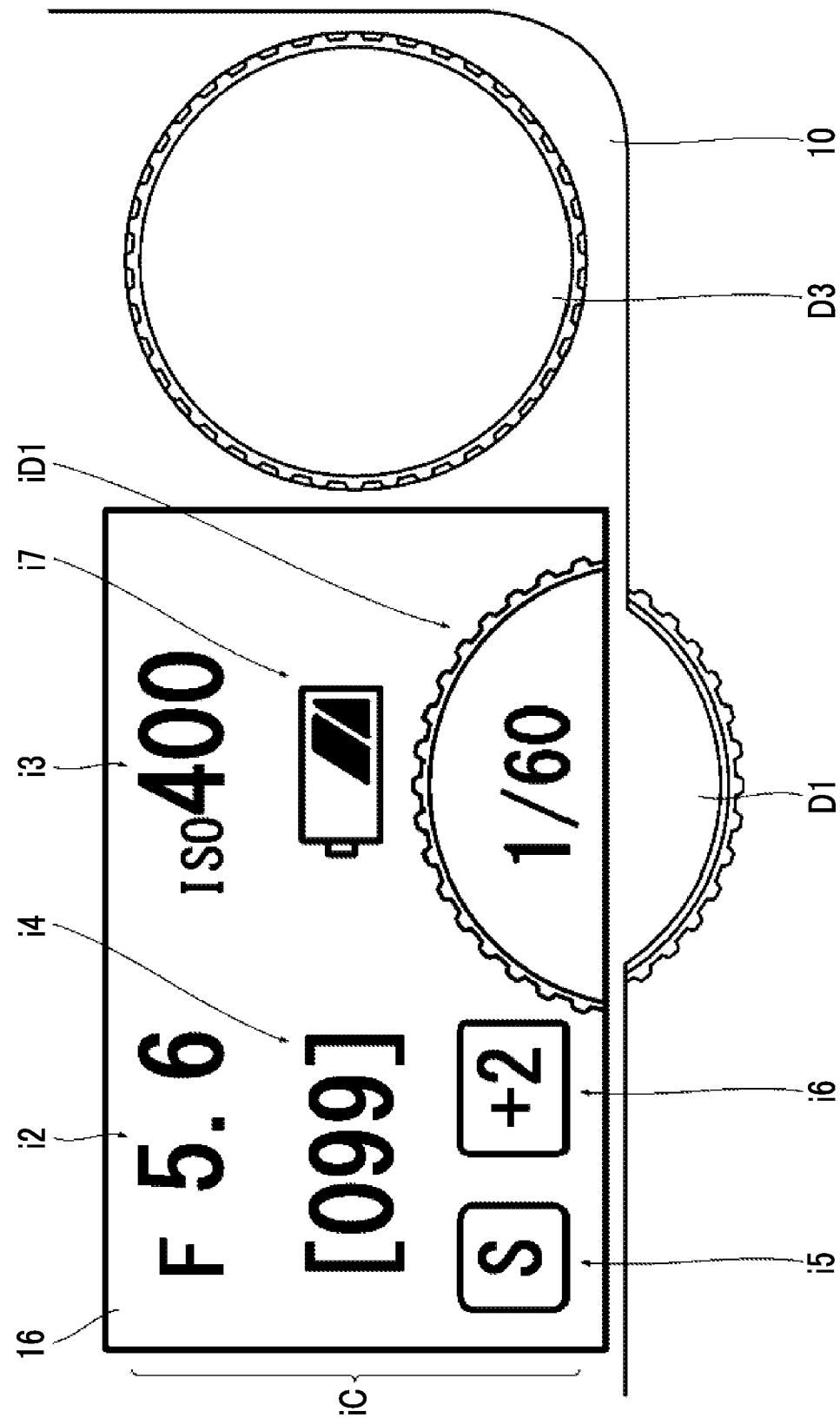
FIG. 46 is a plan view showing an example of the display on the sub-display in the case where the contact with the rear command dial is detected.

(2) Display in Case where Contact with Rear Command Dial is Detected (a) At Time of Contact Detection FIG. 46 is a plan view showing an example of the display on the sub-display in the case where the contact with the rear command dial is detected.

In the case where the contact of the finger with the rear command dial D1 is detected, the image picture iD1 of the rear command dial D1 appears on the sub-display 16.

The image picture iD1 of the rear command dial D1 is formed of an image obtained by imitating the rear command dial D1 and of a circular image. The setting value of the item to be changed in the setting by the rear command dial D1 is displayed inside the image picture iD1 of the rear command dial D1.

As described above, the function of setting the shutter speed is assigned to the rear command dial D1. Therefore, the currently set shutter speed is displayed inside the image picture iD1 of the rear command dial D1. FIG. 46 shows an example of the case where the currently set shutter speed is 1/60 second.

The image picture iD1 of the rear command dial D1 appears from the edge near the rear command dial D1. In the digital camera 1 of the embodiment, the rear command dial D1 is disposed on the rear side with respect to the sub-display 16. Therefore, the image picture iD1 of the rear command dial D1 appears from a rear edge (rear side) of the sub-display 16. The image picture iD1 of the rear command dial D1 appears in the first display amount from the rear edge. This display amount is an amount in which approximately 1/3 of the entire image picture iD1 is displayed.

In the case where the image picture iD1 of the rear command dial D1 appears on the sub-display 16, the display layout of the setting contents iC of the camera is changed so as to avoid the display of the image picture iD1 thereof. That is, the display positions and sizes of the setting contents iC of the camera are adjusted such that the information on each item is not displayed in an overlapped manner with the image picture iD1 of the rear command dial D1. Therefore, the setting contents iC of the camera are displayed in the margin region. At this time, the display positions and sizes of the setting contents iC of the camera are adjusted such that the information on each item is displayed as large as possible.

Further, in the case where the image picture iD1 of the rear command dial D1 appears from the edge of the sub-display 16, the item to be displayed as the setting contents iC of the camera can also be switched. That is, the setting contents iC of the camera are displayed excluding the information on the item to be set by the rear command dial D1. Therefore, in the case of the example, the setting contents iC of the camera are displayed excluding the information on the setting value of the shutter speed. Accordingly, it is possible to eliminate a redundant display.

(b) Display at Time of Operation

FIG. 47 is a plan view showing an example of the display on the sub-display in the case where the contact with the rear command dial is continuously detected for the certain period of time or more. The same display is made also in the case where the rear command dial D1 is rotationally operated.

After the contact of the finger with the rear command dial D1 is detected, in the case where the contact is continuously detected as it is or the rear command dial D1 is rotationally operated, the image picture iD1 of the rear command dial D1 appearing from the edge of the sub-display 16 further advances from the edge and is displayed in a large size.

Accordingly, it is possible to easily set the shutter speed by using the rear command dial D1 while the sub-display 16 is viewed.

(3) Display in Case where Contact with Front Command Dial is Detected (a) At Time of Contact Detection FIG. 48 is a plan view showing an example of the display on the sub-display in a case where the contact with a front command dial is detected.

In the case where the contact of the finger with the front command dial D2 is detected, an image picture iD2 of the front command dial D2 appears on the sub-display 16.

The image picture iD2 of the front command dial D2 is formed of an image obtained by imitating the front command dial D2 and of a circular image. The setting value of the item to be changed in the setting by the front command dial D2 is displayed inside the image picture iD2 of the front command dial D2.

As described above, the function of setting the ISO sensitivity is assigned to the front command dial D2. Therefore, the currently set ISO sensitivity is displayed inside the image picture iD2 of the front command dial D2. FIG. 48 shows an example of the case where the currently set ISO sensitivity is ISO400.

The image picture iD2 of the front command dial D2 appears from the edge near the front command dial D2. In the digital camera 1 of the embodiment, the front command dial D2 is disposed on the front side with respect to the sub-display 16. Therefore, the image picture iD2 of the front command dial D2 appears from a front edge (front side) of the sub-display 16. The image picture iD2 of the front command dial D2 appears in the first display amount from the front edge. This display amount is an amount in which approximately ⅓ of the entire image picture iD2 is displayed.

In a case where the image picture iD2 of the front command dial D2 appears on the sub-display 16, the display layout of the setting contents iC of the camera is changed so as to avoid the display of the image picture iD2 thereof. That is, the display positions and sizes of the setting contents iC of the camera are adjusted such that the information on each item is not displayed in an overlapped manner with the image picture iD2 of the front command dial D2. Therefore, the setting contents iC of the camera are displayed in the margin region. At this time, the display positions and sizes of the setting contents iC of the camera are adjusted such that the information on each item is displayed as large as possible.

Further, in the case where the image picture iD2 of the front command dial D2 appears from the edge of the sub-display 16, the item to be displayed as the setting contents iC of the camera can also be switched. That is, the setting contents iC of the camera are displayed excluding the information on the item to be set by the front command dial D2. Therefore, in the case of the example, the setting contents iC of the camera are displayed excluding the ISO sensitivity information. Accordingly, it is possible to eliminate a redundant display.

(b) Display at Time of Operation

FIG. 49 is a plan view showing an example of the display on the sub-display in a case where the contact with a front command dial is continuously detected for the certain period of time or more. The same display is made also in a case where the front command dial D2 is rotationally operated.

After the contact of the finger with the front command dial D2 is detected, in the case where the contact is continuously detected as it is or the front command dial D2 is rotationally operated, the image picture iD2 of the front command dial D2 appearing from the edge of the sub-display 16 further advances from the edge and is displayed in a large size.

Accordingly, it is possible to easily set the ISO sensitivity by using the front command dial D2 while the sub-display 16 is viewed.

(4) Display in Case Where Contact with Top Surface Command Dial is Detected (a) At Time of Contact Detection FIG. 50 is a plan view showing an example of the display on the sub-display in a case where the contact with the top surface command dial is detected.

In the case where the contact of the finger with the top surface command dial D3 is detected, an image picture iD3 of the top surface command dial D3 appears on the sub-display 16.

The image picture iD3 of the top surface command dial D3 is formed of an image obtained by imitating the top surface command dial D3 and of a circular image. The setting value of the item to be changed in the setting by the top surface command dial D3 is displayed inside the image picture iD3 of the top surface command dial D3.

As described above, the function of setting the exposure correction amount is assigned to the top surface command dial D3. Therefore, the currently set exposure correction amount is displayed inside the image picture iD3 of the top surface command dial D3. FIG. 50 shows an example of a case where the currently set exposure correction amount is +2.

The image picture iD3 of the top surface command dial D3 appears from the edge near the top surface command dial D3. In the digital camera 1 of the embodiment, the top surface command dial D3 is disposed on the right side with respect to the sub-display 16. Therefore, the image picture iD3 of the top surface command dial D3 appears from a right side edge (right side) of the sub-display 16. The image picture iD3 of the top surface command dial D3 appears in the first display amount from the right side edge. This display amount is an amount in which approximately ⅓ of the entire image picture iD3 is displayed.

In a case where the image picture iD3 of the top surface command dial D3 appears on the sub-display 16, the display layout of the setting contents iC of the camera is changed so as to avoid the display of the image picture iD3 thereof. That is, the display positions and sizes of the setting contents iC of the camera are adjusted such that the information on each item is not displayed in an overlapped manner with the image picture iD3 of the top surface command dial D3.

Therefore, the setting contents iC of the camera are displayed in the margin region. At this time, the display positions and sizes of the setting contents iC of the camera are adjusted such that the information on each item is displayed as large as possible.

Further, in the case where the image picture iD3 of the top surface command dial D3 appears from the edge of the sub-display 16, the item to be displayed as the setting contents iC of the camera can also be switched. That is, the setting contents iC of the camera are displayed excluding the information on the item to be set by the top surface command dial D3. Therefore, in the case of the example, the setting contents iC of the camera are displayed excluding the exposure correction amount information. Accordingly, it is possible to eliminate a redundant display.

(b) Display at Time of Operation

FIG. 51 is a plan view showing an example of the display on the sub-display in a case where the contact with the top surface command dial is continuously detected for the certain period of time or more. The same display is made also in a case where the top surface command dial D3 is rotationally operated.

After the contact of the finger with the top surface command dial D3 is detected, in the case where the contact is continuously detected as it is or the top surface command dial D3 is rotationally operated, the image picture iD3 of the top surface command dial D3 appearing from the edge of the sub-display 16 further advances from the edge and is displayed in a large size.

Accordingly, it is possible to easily set the exposure correction amount by using the top surface command dial D3 while the sub-display 16 is viewed.

In this manner, in the case where the camera body 10 comprises the plurality of operation dials, the display on the sub-display 16 is switched in response to the contact with each operation dial or the operation thereof.

The image picture of each operation dial appears from the edge in the above-described embodiment but may appear at a predetermined position. Further, the modification example described in each embodiment described above may be applied also to the embodiment.

OTHER EMBODIMENTS

Other Embodiments of Display Section

The sub-display forming the display section is formed of a reflective LCD in the above-described embodiment, but the display forming the dial display section is not limited thereto. In addition, the display may be formed of, for example, a self-luminous display such as electronic paper, a memory liquid crystal display, or an organic electroluminescent display (EL) or the like.

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the dial display section can be confirmed even in a case where the power supply of the camera is turned off.

Further, in a case where the sub-display is formed of the LCD, it is possible to ensure good visibility even in an environment where surroundings are bright by employing a reflective LCD as the display. In the case where the display is formed of the reflective LCD, it is preferable to comprise illumination.

[Another Example of Means for Locking Operation Dial]

The operation dial is electronically locked in the above-described embodiment but may be mechanically locked.

Further, in the case where the operation dial is electronically locked, a method of instructing the lock and the lock release of the operation dial is not limited to that of the above-described embodiment. For example, in a case of an operation dial capable of performing a pushing operation, the lock and the lock release of the operation dial may be instructed by the pushing operation.

Another Embodiment of Operation Dial

In a case where the operation dial is built in the camera body and the part of the outer periphery of the operation dial is disposed in an exposed manner from the camera body, the operation dial is provided with a function of a pressing operation. The pressing operation refers to an operation of pushing the operation dial in a direction orthogonal to the axis. In the case where the operation dial comprises the pressing operation function, the display on the sub-display may be switched in response to the pressing operation similarly to the case where the operation dial is rotationally operated.

[Another Example of Means for Detecting Contact]

The touch sensor is used as means for detecting the contact with the operation dial in the above-described embodiment, but the means for detecting the contact with the operation dial is not limited thereto. For example, a non-contact type sensor may detect that the finger approaches a certain distance with respect to the operation dial to indirectly detect the contact of the finger with the operation dial.

FIG. 52 is a back view of a digital camera comprising a sensor that detects approach of the finger with the rear command dial.

As shown in FIG. 52, a sensor SD1 that detects the approach of the finger is provided near the rear command dial D1. The sensor SD1 is formed of, for example, a proximity sensor. The proximity sensor may be any type such as an inductive type, a capacitive type, an ultrasonic type, an electromagnetic wave type, and an infrared type. In a case where the finger approaches a certain distance or more, the sensor SD1 is turned on. Therefore, it is possible to detect that the finger approaches the rear command dial D1 by detecting that the sensor SD1 is turned on.

Other Embodiments of Camera

Further, the case where the invention is applied to the digital camera is described in the above-mentioned embodiment, but the application of the invention is not limited thereto. The invention may be applied similarly to a camera that uses a silver halide film. In addition, the invention may also be applied to an electronic apparatus incorporating the rotary operation dial.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

EXPLANATION OF REFERENCES

1: digital camera
2: lens
2a: lens drive unit
10: camera body
12: lens mount
14: main-display
16: sub-display
18: electronic view finder
20: hot shoe
22: grip
24: thumb rest
30: shutter button
31: power supply lever
34: playback button
35: delete button
36: AF lock button
37: AE lock button
38: menu button
39: selector button
40: display button
41: mode dial
41a: indicator
50: image sensor
52: image sensor drive unit
54: shutter
56: shutter drive unit
58: analog signal processing section
60: image data input unit
62: work memory
64: data memory
66: digital signal processing section
68: recording control unit
70: main-display drive unit
72: sub-display drive unit
74: operation unit
78: memory card
80: system controller
110: operation target setting unit
112: setting change unit
114: sub-display display control unit
D1: rear command dial
D1a: operation detection unit of rear command dial
D1b: touch sensor of rear command dial
D1o: rotation axis of rear command dial
D2: front command dial
D3: top surface command dial
DL1: rear command dial lock switch
SD1: sensor
L: optical axis
i1: shutter speed information
i2: F-number information
i3: ISO sensitivity information
i4: number of capturable images information
i5: imaging mode information
i6: exposure correction amount information
i7: battery remaining amount information
iC: setting contents of camera
iD1: image picture of rear command dial
iD2: image picture of front command dial
iD3: image picture of top surface command dial
i1: image picture of indicator
mD1: mark
S10 to S19: processing procedure of display control of sub-display
S30 to S45: processing procedure of display control of sub-display

What is claimed is:

1. A camera comprising:
a display section;
a rotary operation dial provided near the display section;
a detection unit that detects contact or approach of a finger with the operation dial; and
a display control unit that controls a display on the display section,
wherein the display control unit displays setting contents of the camera on the display section,
causes an image picture of the operation dial to appear in a first size on the display section in a case where the contact or the approach of the finger with the operation dial is detected, and
enlarges the image picture of the operation dial made to appear on the display section to a second size and displays the enlarged image picture of the operation dial in a case where the contact or the approach of the finger with the operation dial is continuously detected for a certain period of time or more, or in a case where the operation dial is operated.

2. The camera according to claim 1,
wherein the display control unit displays a mark which is a base point on the display section in advance, and
enlarges the image picture of the operation dial with the mark as the base point and causes the enlarged image picture of the operation dial to appear in the first size on the display section in the case where the contact or the approach of the finger with the operation dial is detected.

3. A camera comprising:
a display section;
a rotary operation dial provided near the display section;
a detection unit that detects contact or approach of a finger with the operation dial;
a display control unit that controls a display on the display section; and
a lock unit that locks the operation dial,
wherein the display control unit displays setting contents of the camera on the display section,
causes an image picture of the operation dial to appear in a first size on the display section in a case where a lock of the operation dial is released, and
enlarges the image picture of the operation dial made to appear on the display section to a second size and displays the enlarged image picture of the operation dial in a case where the contact or the approach of the finger with the operation dial is detected in the state where the lock of the operation dial is released.

4. The camera according to claim 3,
wherein the display control unit displays a mark which is a base point on the display section in advance, and
enlarges the image picture of the operation dial with the mark as the base point and causes the enlarged image picture of the operation dial to appear in the first size on the display section in the case where the lock of the operation dial is released.

5. The camera according to claim 1,
wherein the operation dial is built in a camera body, and a part of an outer periphery of the operation dial is disposed on an outer surface of the camera body in an exposed manner,
wherein the display section is disposed on the operation dial in an overlapped manner, and wherein in the case where the image picture of the operation dial is enlarged to the second size and displayed, the image picture of the operation dial is formed of an image having an arc-like external shape obtained by extending the part of the outer periphery of the operation dial exposed from the camera body.

6. The camera according to claim 1,
wherein the display control unit gradually enlarges and displays the image picture of the operation dial in the case where the image picture of the operation dial is enlarged to the second size and displayed, and
causes the display of the image picture of the operation dial to be deleted or gradually be reduced to the first size in a case where the contact or the approach of the finger with the operation dial is no longer detected during the enlargement.

7. A camera comprising:
a display section;
a rotary operation dial provided near the display section;
a detection unit that detects contact or approach of a finger with the operation dial; and
a display control unit that controls a display on the display section,
wherein the display control unit displays setting contents of the camera on the display section,
causes an image picture of the operation dial to appear in a first display amount from an edge of the display section in a case where the contact or the approach of the finger with the operation dial is detected, and
displays the image picture of the operation dial made to appear in the first display amount from the edge of the display section in a second display amount larger than the first display amount in a case where the contact or the approach of the finger with the operation dial is continuously detected for a certain period of time or more, or in a case where the operation dial is operated.

8. A camera comprising:
a display section;
a rotary operation dial provided near the display section;
a detection unit that detects contact or approach of a finger with the operation dial;
a display control unit that controls a display on the display section; and
a lock unit that locks the operation dial,
wherein the display control unit displays setting contents of the camera on the display section,
causes an image picture of the operation dial to appear in a first display amount from an edge of the display section in a case where a lock of the operation dial is released, and
displays the image picture of the operation dial made to appear in the first display amount from the edge of the display section in a second display amount larger than the first display amount in a case where the contact or the approach of the finger with the operation dial is detected in the state where the lock of the operation dial is released.

9. The camera according to claim 7
wherein the operation dial is built in a camera body, and a part of an outer periphery of the operation dial is disposed on an outer surface of the camera body in an exposed manner,
wherein the display section is disposed on the operation dial in an overlapped manner, and
wherein in the case where the image picture of the operation dial is displayed in the second display amount, the image picture of the operation dial is formed of an image having an arc-like external shape obtained by extending the part of the outer periphery of the operation dial exposed from the camera body.

10. The camera according to claim 7,
wherein the display control unit gradually advances and displays the image picture of the operation dial from the edge of the display section in the case where the image picture of the operation dial is displayed in the second display amount, and
causes the display of the image picture of the operation dial to be deleted or gradually be retracted to the first display amount in a case where the contact or the approach of the finger with the operation dial is no longer detected during the advancement.

11. The camera according to claim 1,
wherein the setting contents of the camera include information on a setting value of an item to be set by the operation dial, and
wherein in the case where the image picture of the operation dial is displayed, the display control unit displays the setting contents of the camera on the display section excluding the information on the setting value of the item to be set by the operation dial.

12. The camera according to claim 1,
wherein in the case where the image picture of the operation dial is displayed, the display control unit changes a display layout of the setting contents of the camera to avoid displaying the setting contents of the camera and the image picture of the operation dial in an overlapped manner.

13. A camera comprising:
a display section;
a rotary operation dial provided near the display section;
a detection unit that detects contact or approach of a finger with the operation dial; and
a display control unit that controls a display on the display section,
wherein the display control unit displays setting contents of the camera and an image picture of the operation dial on the display section and switches a display form of the image picture of the operation dial according to a detection result of the detection unit,
wherein the operation dial is built in a camera body, and a part of an outer periphery of the operation dial is disposed on an outer surface of the camera body in an exposed manner,
wherein the display section is disposed on the operation dial in an overlapped manner,
wherein the image picture of the operation dial is formed of an image having an arc-like external shape obtained by extending the part of the outer periphery of the operation dial exposed from the camera body,
wherein a display form in a case where the contact or the approach of the finger with the operation dial is not detected is a form in which a current setting value is displayed inside the image having the arc-like external shape, and
wherein a display form in a case where the contact or the approach of the finger with the operation dial is detected is a form in which selectable setting values are displayed at regular pitches on the same circumference inside the image having the arc-like external shape.

14. A camera comprising:
a display section;
a rotary operation dial provided near the display section;
a detection unit that detects contact or approach of a finger with the operation dial; and a display control unit that controls a display on the display section, wherein the display control unit displays setting contents of the camera and an image picture of the operation dial on the display section and switches a display form of the image picture of the operation dial according to a detection result of the detection unit, wherein the operation dial is built in a camera body, and a part of an outer periphery of the operation dial is disposed on an outer surface of the camera body in an exposed manner, wherein the display section is disposed on the operation dial in an overlapped manner, wherein the image picture of the operation dial is formed of an image having an arc-like external shape obtained by extending the part of the outer periphery of the operation dial exposed from the camera body, wherein a display form in a case where the contact or the approach of the finger with the operation dial is not detected is a form in which a current setting value is displayed to be stationary inside the image having the arc-like external shape, and wherein a display form in a case where the contact or the approach of the finger with the operation dial is detected is a form in which the current setting value is displayed to be turned on and off inside the image having the arc-like external shape.

15. The camera according to claim 1 comprising:
an operation target setting unit that sets an operation target of the operation dial,
wherein the display control unit displays an image picture according to the operation target set by the operation target setting unit on the display section.

16. A display control method of a camera comprising:
displaying setting contents of the camera on the display section provided near an operation dial;
causing an image picture of the operation dial to appear in a first size on the display section in a case where the contact or the approach of the finger with the operation dial is detected; and
enlarging the image picture of the operation dial made to appear on the display section to a second size and displaying the enlarged image picture of the operation dial in a case where the contact or the approach of the finger with the operation dial is continuously detected for a certain period of time or more, or in a case where the operation dial is operated.

17. A display control method of a camera comprising:
displaying setting contents of the camera on the display section provided near an operation dial;
causing an image picture of the operation dial to appear in a first size on the display section in a case where a lock of the operation dial is released; and
enlarging the image picture of the operation dial made to appear on the display section to a second size and displaying the enlarged image picture of the operation dial in a case where the contact or the approach of the finger with the operation dial is detected in the state where the lock of the operation dial is released.

18. A display control method of a camera comprising:
displaying setting contents of the camera on the display section provided near an operation dial;
causing an image picture of the operation dial to appear in a first display amount from an edge of the display section in a case where the contact or the approach of the finger with the operation dial is detected; and
displaying the image picture of the operation dial made to appear in the first display amount from the edge of the display section in a second display amount larger than the first display amount in a case where the contact or the approach of the finger with the operation dial is continuously detected for a certain period of time or more, or in a case where the operation dial is operated.

19. A display control method of a camera comprising:
displaying setting contents of the camera on the display section provided near an operation dial;
causing an image picture of the operation dial to appear in a first display amount from an edge of the display section in a case where a lock of the operation dial is released; and
displaying the image picture of the operation dial made to appear in the first display amount from the edge of the display section in a second display amount larger than the first display amount in a case where the contact or the approach of the finger with the operation dial is detected in the state where the lock of the operation dial is released.

* * * * *